United States Patent
Takahashi et al.

(10) Patent No.: US 7,733,531 B2
(45) Date of Patent: Jun. 8, 2010

(54) IMAGE PROCESSING APPARATUS, IMAGE PROCESSING PROGRAM, AND IMAGE PROCESSING METHOD WITH ERROR DIFFUSION

(75) Inventors: Toru Takahashi, Matsumoto (JP); Atsushi Oshima, Suwa (JP)

(73) Assignee: Seiko Epson Corporation (JP)

( * ) Notice: Subject to any disclaimer, the term of this patent is extended or adjusted under 35 U.S.C. 154(b) by 1179 days.

(21) Appl. No.: 11/333,719

(22) Filed: Jan. 17, 2006

(65) Prior Publication Data

US 2006/0158693 A1   Jul. 20, 2006

(30) Foreign Application Priority Data

Jan. 18, 2005 (JP) .............................. 2005-009959
Sep. 27, 2005 (JP) .............................. 2005-279403

(51) Int. Cl.
    *G06K 15/00* (2006.01)
(52) U.S. Cl. ..................... 358/3.03; 358/1.9; 358/3.05; 358/3.06; 358/3.26; 382/252; 345/616
(58) Field of Classification Search ............... 358/3.03, 358/3.26; 347/15; 382/252
    See application file for complete search history.

(56) References Cited

U.S. PATENT DOCUMENTS

| | | | |
|---|---|---|---|
| 5,553,165 A * | 9/1996 | Webb et al. ................. 382/252 |
| 5,701,135 A * | 12/1997 | Aratani et al. ................ 345/89 |
| 6,283,571 B1 | 9/2001 | Zhou et al. | |
| 6,293,643 B1 | 9/2001 | Shimada et al. | |
| 6,328,404 B1 | 12/2001 | Fujimori | |
| 7,355,747 B2 * | 4/2008 | Pritchard ..................... 358/1.9 |
| 2002/0089685 A1 * | 7/2002 | Kakutani ..................... 358/1.14 |
| 2003/0151773 A1 * | 8/2003 | Ogawa et al. ............... 358/3.03 |
| 2004/0263910 A1 * | 12/2004 | Chang et al. ................ 358/3.03 |

FOREIGN PATENT DOCUMENTS

| JP | 01-235655 | 9/1989 |
|---|---|---|
| JP | 09-135351 | 5/1997 |
| JP | 11-151821 | 8/1999 |
| JP | 11-254662 | 9/1999 |
| JP | 2000-79710 | 3/2000 |
| JP | 2000-190470 | 7/2000 |
| JP | 2000-225716 | 8/2000 |

* cited by examiner

*Primary Examiner*—Twyler L Haskins
*Assistant Examiner*—Paul F Payer
(74) *Attorney, Agent, or Firm*—Harness, Dickey & Pierce, P.L.C.

(57) ABSTRACT

An image processing apparatus includes: an image data acquiring unit that acquires image data formed of plural pixel data having an M-ary (M≧3) gradation value; a grouping unit that divides the image data acquired into J (J≧2) image data areas and sections the J image data areas into K (2≦K≦J) groups; a pixel data selecting unit that selects, for each of the image data areas forming the respective groups, predetermined pixel data out of pixel data included in the image data area; an N-arization processing unit that applies the N-arization (M>N≧2) processing to the pixel data selected on the basis of a predetermined threshold value; and an error diffusing unit that diffuses a difference between a value of the selected pixel data and a value after the N-arization processing for the selected pixel data to pixel data not subjected to the N-arization processing, wherein the error diffusing unit diffuses the difference in directions different from one another in two or more groups of the K groups.

12 Claims, 34 Drawing Sheets

GROUPING INFORMATION AND N-ARIZATION INFORMATION

| SETTING NUMBER | DIVISION SYSTEM | GROUPING SYSTEM | PROCESSING SYSTEM | SELECTION SYSTEM | N VALUE & THRESHOLD VALUE & CONVERSION VALUE | DIFFUSING METHOD |
|---|---|---|---|---|---|---|
| 10 | UNIT OF ROW | CROSS 1 (2 GROUPS) | PARALLEL | SIMUL-TANEOUS | TYPE 1 | MATRIX 1 |
| 11 | UNIT OF ROW | CROSS 1 (2 GROUPS) | SPECIAL 1 | IN ORDER | TYPE 1 | MATRIX 2 |
| 20 | UNIT OF ONE PIXEL | CROSS 2 (2 GROUPS) | PARALLEL | SIMUL-TANEOUS | TYPE 1 | MATRIX 3 |
| 21 | UNIT OF ONE PIXEL | CROSS 2 (2 GROUPS) | SPECIAL 1 | IN ORDER | TYPE 1 | MATRIX 4 |

| | COLUMN | | | | | | | |
|---|---|---|---|---|---|---|---|---|
| ROW | 1 | 2 | 3 | 4 | 5 | 6 | 7 | 8 |
| 1 | 1 | 2 | 3 | 4 | 5 | 6 | 7 | 8 |
| 2 | 32' | 31' | 30' | 29' | 28' | 27' | 26' | 25' |
| 3 | 9 | 10 | 11 | 12 | 13 | 14 | 15 | 16 |
| 4 | 24' | 23' | 22' | 21' | 20' | 19' | 18' | 17' |
| 5 | 17 | 18 | 19 | 20 | 21 | 22 | 23 | 24 |
| 6 | 16' | 15' | 14' | 13' | 12' | 11' | 10' | 9' |
| 7 | 25 | 26 | 27 | 28 | 29 | 30 | 31 | 32 |
| 8 | 8' | 7' | 6' | 5' | 4' | 3' | 2' | 1' |

FIG. 9B

| | COLUMN | | | | | | | |
|---|---|---|---|---|---|---|---|---|
| ROW | 1 | 2 | 3 | 4 | 5 | 6 | 7 | 8 |
| 1 | 1 | 2 | 3 | 4 | 5 | 6 | 7 | 8 |
| 2 | 64 | 63 | 62 | 61 | 60 | 59 | 58 | 57 |
| 3 | 9 | 10 | 11 | 12 | 13 | 14 | 15 | 16 |
| 4 | 56 | 55 | 54 | 53 | 52 | 51 | 50 | 49 |
| 5 | 17 | 18 | 19 | 20 | 21 | 22 | 23 | 24 |
| 6 | 48 | 47 | 46 | 45 | 44 | 43 | 42 | 41 |
| 7 | 25 | 26 | 27 | 28 | 29 | 30 | 31 | 32 |
| 8 | 40 | 39 | 38 | 37 | 36 | 35 | 34 | 33 |

| PROC-ESSED PIXEL | SELECTED PIXEL | 7/16 |
|---|---|---|
| PIXEL BY GROUP | PIXEL BY GROUP | PIXEL BY GROUP |
| 3/16 | 5/16 | 1/16 |

FIG.10A

| 1/16 | 5/16 | 3/16 |
|---|---|---|
| PIXEL BY GROUP | PIXEL BY GROUP | PIXEL BY GROUP |
| 7/16 | SELECTED PIXEL | PROC-ESSED PIXEL |

FIG.10B

| PROC-ESSED PIXEL | SELECTED PIXEL | 1/7 |
|---|---|---|
| PIXEL BY GROUP 1/7 | PIXEL BY GROUP 1/7 | PIXEL BY GROUP 1/7 |
| 1/7 | 1/7 | 1/7 |

FIG.10C

| 1/16 | 5/16 | 3/16 |
|---|---|---|
| PIXEL BY GROUP | PIXEL BY GROUP | PIXEL BY GROUP |
| 7/16 | SELECTED PIXEL | PROC-ESSED PIXEL |

FIG.10D

COLUMN

|   | 1 | 2 | 3 | 4 | 5 | 6 | 7 | 8 |
|---|---|---|---|---|---|---|---|---|
| 1 | 32' | 1 | 31' | 2 | 30' | 3 | 29' | 4 |
| 2 | 5 | 28' | 6 | 27' | 7 | 26' | 8 | 25' |
| 3 | 24' | 9 | 23' | 10 | 22' | 11 | 21' | 12 |
| 4 | 13 | 20' | 14 | 19' | 15 | 18' | 16 | 17' |
| 5 | 16' | 17 | 15' | 18 | 14' | 19 | 13' | 20 |
| 6 | 21 | 12' | 22 | 11' | 23 | 10' | 24 | 9' |
| 7 | 8' | 25 | 7' | 26 | 6' | 27 | 5' | 28 |
| 8 | 29 | 4' | 30 | 3' | 31 | 2' | 32 | 1' |

ROW

FIG.14A

COLUMN

|   | 1 | 2 | 3 | 4 | 5 | 6 | 7 | 8 |
|---|---|---|---|---|---|---|---|---|
| 1 | 64 | 1 | 63 | 2 | 62 | 3 | 61 | 4 |
| 2 | 5 | 60 | 6 | 59 | 7 | 58 | 8 | 57 |
| 3 | 56 | 9 | 55 | 10 | 54 | 11 | 53 | 12 |
| 4 | 13 | 52 | 14 | 51 | 15 | 50 | 16 | 49 |
| 5 | 48 | 17 | 47 | 18 | 46 | 19 | 45 | 20 |
| 6 | 21 | 44 | 22 | 43 | 23 | 42 | 24 | 41 |
| 7 | 40 | 25 | 39 | 26 | 38 | 27 | 37 | 28 |
| 8 | 29 | 36 | 30 | 35 | 31 | 34 | 32 | 33 |

ROW

FIG.14B

| PIXEL BY GROUP | SELECTED PIXEL | PIXEL BY GROUP | 1/3 |
|---|---|---|---|
| 1/3 | PIXEL BY GROUP | 1/3 | |

FIG.15A

| 1/3 | PIXEL BY GROUP | 1/3 |
|---|---|---|
| 1/3 | PIXEL BY GROUP | SELECTED PIXEL | PIXEL BY GROUP |

FIG.15B

| PIXEL BY GROUP | SELECTED PIXEL | PIXEL BY GROUP 1/6 | 1/6 |
|---|---|---|---|
| 1/6 | PIXEL BY GROUP 1/6 | 1/6 | PIXEL BY GROUP 1/6 |

FIG.15C

| 1/3 | PIXEL BY GROUP | 1/3 |
|---|---|---|
| 1/3 | PIXEL BY GROUP | SELECTED PIXEL | PIXEL BY GROUP |

IMAGE PROCESSING APPARATUS, IMAGE PROCESSING PROGRAM, AND IMAGE PROCESSING METHOD WITH ERROR DIFFUSION

RELATED APPLICATIONS

This application claims priority to Japanese Patent Application Nos. 2005-009959 filed Jan. 18, 2005 and 2005-279403 filed Sep. 27, 2005 which are hereby expressly incorporated by reference herein in their entirety.

BACKGROUND

1. Technical Field

The present invention relates to image processing for converting image data represented by an M-ary (M≧3) gradation value into N-arized (M>N≧2) image data, and, in particular to an image processing apparatus, an image processing program, and an image processing method that are suitable for reducing deterioration in an image quality caused by error diffusion processing, and a printing apparatus, a printing apparatus control program, a printing apparatus control method, a print data generating apparatus, a print data generating program, a print data generating method, a display apparatus, a display apparatus control program, and a display apparatus control method to which an image processing technique of any one of the image processing apparatus, the image processing program, and the image processing method is applied.

2. Related Art

In the past, a threshold method was used as a method of converting image data represented by an M-ary (M≧3) gradation value into N-ary (M>N≧2) image data with a certain threshold value as a boundary. In this threshold method, each pixel value of N-ary image data and a predetermined threshold value are compared and the pixel value is converted into any one of N kinds of values depending on whether the pixel value is equal to or larger than the threshold value or smaller than the threshold value. However, in the threshold value, since a difference between the pixel value and a value after conversion is discarded, N-ary image data without information equivalent to the discarded value is generated. As a result, depending on an image, deterioration of an image quality is noticeable. For example, most parts of the image lose gradations.

In the past, to solve the problem of the threshold value, a technique called an error diffusing method of, in N-arizing an M-ary image data, rather than discarding a difference between a pixel value and a value after conversion as in the threshold value, diffusing the difference to plural unprocessed pixels as an error and utilizing the difference was devised. By using this error diffusing method, information that is completely lost in the past is diffused in peripheral pixels and remains. Thus, it is possible to improve image quality after n-arization compared with the threshold value in the past. However, for example, in an error diffusing method of the Floyd & Steinberg type in the past, pixels are subjected to binarization processing in order for each row or each column and an error that has occurred in the binarization processing is diffused to unprocessed pixels in the same direction in all the pixels. Thus, a diffusion range of the error becomes unique and deterioration in an image quality is conspicuous, in particular, in an image in which a gradation changes stepwise such as a gradation image.

Therefore, as a technique for solving the problem in the error diffusing method of performing error diffusion in a regular direction such as the Floyd & Steinberg type, there is an image processing apparatus described in JP-A-9-135351.

This image processing apparatus has an object of creating, in image processing using the error diffusing method, a pseudo halftone image with the occurrence of an eyesore pattern controlled. The image processing apparatus divides a halftone image into plural areas consisting of n image lines and, in each of the areas, sequentially performs binarization processing tracing adjacent pixels in a zigzag shape in such a manner as to traverse the n image lines from a top of the image lines to an end of the image lines. Consequently, unlike the error diffusing method in the past, even if regular binarization processing is performed, the processing is divided for each of the areas. Thus, continuity of a pattern is lost in boundary parts of the areas and the eyesore and regular pattern become less conspicuous.

However, in the image processing apparatus described in JP-A-9-135351, a moving direction of processed pixels is simply switched for each of the lines. A direction in which an error is diffused is a direction of unprocessed pixels nearly in one direction of each of the lines (e.g., a downward direction (a direction from a start line (a first row from the top) to an end line (a bottom row) of the error diffusion processing in lines of pixels of plural rows). A diffusion property of the error is not improved much. Therefore, the image processing apparatus is not sufficient for improving an image quality of an image susceptible to deterioration of an image quality because of error diffusion.

SUMMARY

An advantage of some aspects of the invention is to provide an image processing apparatus, an image processing program, and an image processing method that are suitable for reducing deterioration in image quality caused by error diffusion processing and a printing apparatus, a printing apparatus control program, a printing apparatus control method, a print data generating apparatus, a print data generating program, a print data generating method, a display apparatus, a display apparatus control program, and a display apparatus control method to which an image processing technique of any one of the image processing apparatus, the image processing program, and the image processing method is applied.

An image processing apparatus according to a first aspect of the invention includes: an image data acquiring unit that acquires image data formed of plural pixel data having an M-ary (M≧3) gradation value; a grouping unit that divides the image data acquired into J (J≧2) image data areas and sections the J image data areas into K (2≦K≦J) groups; a pixel data selecting unit that selects, for each of the image data areas forming the respective groups, predetermined pixel data out of pixel data included in the image data area; an N-arization processing unit that applies the N-arization (M>N≧2) processing to the pixel data selected on the basis of a predetermined threshold value; and an error diffusing unit that diffuses a difference between a value of the selected pixel data and a value after the N-arization processing for the selected pixel data to pixel data not subjected to the N-arization processing. The error diffusing unit diffuses the difference in directions different from one another in two or more groups of the K groups.

With such a constitution, it is possible to acquire image data formed of plural pixel data having an M (M≧3) gradation value with the image data acquiring unit. It is possible to divide the image data acquired into J (J≧2) image data areas and section the J image data areas into K (2≦K≦J) groups with the grouping unit. It is possible to select, for each of the image data areas forming the respective groups, predetermined pixel data out of pixel data included in the image data area with the data selecting unit. It is possible to apply the N-arization (M>N≧2) processing to the image data selected on the basis of a predetermined threshold value with the N-arization processing unit. It is possible to diffuse a difference between the selected pixel data and a value after the N-arization processing for the selected pixel data to pixel data not subjected to the n-arization processing with the error diffusing unit.

The error diffusing unit is also capable of diffusing the difference in directions different from one another in two or more groups of the K groups.

Therefore, since image data is divided into groups of plural image data, the N-arization processing is performed for each of the groups, and a diffusing direction of a difference (an error) that occurs in each of the groups is set in directions different from one another in two or more groups, the difference (the error) is propagated in multiple directions. Thus, there is an advantage that it is possible to improve image quality after the N-arization processing compared with the techniques in the past in which a difference is diffused substantially in one direction.

The image data acquiring unit acquires image data inputted from an optical reading unit or the like such as a scanner unit, passively or actively acquires image data stored in an external device via a network such as a LAN or a WAN, acquires image data from a recording medium such as a CD-ROM or a DVD-ROM via a driving device such as a CD drive or a DVD drive provided in a printing apparatus, or acquires image data stored in a storage provided in an image processing apparatus. In other words, the acquisition includes at least input, obtainment, reception, and readout. The same holds true for an image processing program and an image processing method, a printing apparatus, a printing apparatus control program, and a printing apparatus control method, a print data generating apparatus, a print data generating program, and a print data generating method, and a display apparatus, a display apparatus control program, and a display apparatus control method according to other aspects of the invention.

The image data area means each area obtained by dividing image data into plural (J) pieces by a unit of an area formed of one or more pixel data. The group means an image data area belonging to each section obtained by sectioning J image data areas into plural (K) pieces in one or more image data areas. The same holds true for the image processing program and the image processing method, the printing apparatus, the printing apparatus control program, and the printing apparatus control method, the print data generating apparatus, the print data generating program, and the print data generating method, and the display apparatus, the display apparatus control program, and the display apparatus control method according to other aspects of the invention.

Dividing in the above description means dividing image data into data for each area obtained by dividing an image into J (J≧2) areas. Sectioning in the above description means grouping data for each of the areas into K (2≦K≦J) groups. For example, when image data is divided into four image data areas and the image data areas are sectioned into two groups, an image is divided into four areas and image data is divided into a set of pixel data (an image data area) corresponding to each of the four areas. The four image data areas are sectioned into two groups, each of which includes the two image data areas, or sectioned into two groups, one of which includes the three image data areas and the other of which includes the remaining one image data area. The same holds true for the image processing program and the image processing method, the printing apparatus, the printing apparatus control program, and the printing apparatus control method, the print data generating apparatus, the print data generating program, and the print data generating method, and the display apparatus, the display apparatus control program, and the display apparatus control method according to other aspects of the invention.

As the predetermined threshold value, for example, when image processing is applied to image data used for a printing apparatus, a range of a concentration value (or a luminance value) of the image data is equally divided by the number of kinds of sizes of dots formed by a print head provided in the printing apparatus to be set for each of the sizes of the dots. Besides, it is possible to use a publicly-known dot occurrence probability set in advance for each of the types of sizes of dots formed by the print head as the predetermined threshold value. In other words, the predetermined threshold value is set according to an application of image data subjected to the image processing. The same holds true for the image processing program and the image processing method, the printing apparatus, the printing apparatus control program, and the printing apparatus control method, the print data generating apparatus, the print data generating program, and the print data generating method, and the display apparatus, the display apparatus control program, and the display apparatus control method according to other aspects of the invention.

As the directions different from one another, for example, directions of two or more groups are different from one another or directions of adjacent two groups in two or more groups are different from one another and directions of groups not adjacent to each other in the two or more groups are not different from one another. Note that, concerning an oblique direction, for example, even if there are two or more groups in the same obliquely right upward direction, if angles in an oblique direction from a reference position of the respective groups are slightly different, the groups are in directions different from one another. The same holds true for the image processing program and the image processing method, the printing apparatus, the printing apparatus control program, and the printing apparatus control method, the print data generating apparatus, the print data generating program, and the print data generating method, and the display apparatus, the display apparatus control program, and the display apparatus control method according to other aspects of the invention.

It is preferable that the grouping unit sections the J image data areas into the K groups such that images in the respective image data areas forming the K groups cross one another in the respective groups.

With such a constitution, it is possible to diffuse a difference (an error) to unprocessed pixel data such that diffusing directions of the difference (the error) are different in two or more groups, respectively, with respect to image data that are grouped such that the respective image data areas cross one another in the respective groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve image quality after the N-arization processing compared with the techniques in the past in which an error is diffused substantially in one direction.

Crossing the images in the respective image data area means arranging the images in the respective image data areas forming the K groups to be alternate with one another among the respective groups. For example, in the case of two groups, images in one image data area of the respective groups and images in the other image data area are arranged side by side alternately. The same holds true for the image processing program and the image processing method, the printing apparatus, the printing apparatus control program, and the printing apparatus control method, the print data generating apparatus, the print data generating program, and the print data generating method, and the display apparatus, the display apparatus control program, and the display apparatus control method according to other aspects of the invention.

It is preferable that the grouping unit divides the image data into four or more image data areas and sections the four or more image data areas into the K groups such that images in the image data areas forming the K groups, respectively, cross one another in a lattice shape in two groups.

With such a constitution, in images after grouping, the respective image data areas are arranged alternately with one another to form a lattice in two groups. It is possible to propagate a difference (an error) to the image data grouped in this way such that diffusing directions of the difference (the error) are different from one another in two or more groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve image quality after the N-arization processing compared with the techniques in the past in which an error is diffused substantially in one direction.

It is preferable that the grouping unit divides the image data into plural image data areas for each of pixel groups located in a specific arrangement direction of images formed by the image data or each of pixel groups orthogonal to the pixel groups located in the specific arrangement direction.

With such a constitution, in an image after grouping, for example, image data areas by a unit of a row or a unit of a column are arranged alternately among two groups. It is possible to propagate a difference (an error) to the image data grouped in this way such that diffusing directions of the difference (the error) are different from one another in two or more groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve image quality after the N-arization processing compared with the techniques in the past in which an error is diffused substantially in one direction.

It is preferable that the grouping unit sections the J image data areas into two groups and the error diffusing unit diffuses the difference in directions in which diffusing directions of the difference are opposite to one another in the two groups.

With such a constitution, it is possible to diffuse a difference (an error) to pixel data in directions opposite to one another in two groups. It is possible to set propagation directions of the difference (the error) in multiple directions and not to overlap each other in the two groups. Thus, there is an advantage that it is possible to improve image quality after the N-arization processing compared with the techniques in the past in which an error is diffused substantially in one direction.

The diffusing direction means, for example, a direction of a weight vector of a pixel of attention (a selected pixel) based on an error diffusion matrix. The "error diffusion matrix" is a matrix including information (relative position information, etc.) indicating, when the M-ary pixel data is converted into N-ary pixel data in the N-arization processing, in diffusing (distributing) a difference (an error) between N values after conversion and M values before conversion to pixel data not subjected to the N-arization processing around the pixel data (this is generally referred to as an error diffusing method), a position (a diffusing direction) of diffusion object pixel data with respect to pixel data of the diffusion source, information on a diffusion ratio of the diffusion object with respect to the respective pixel data, and the like. There are various kinds of error diffusion matrixes with different shapes of matrixes, different sizes (numbers of diffusion objects) of matrixes, diffusion ratios, and the like.

First, in order to explain the weight vector, a basic vector is set. As shown in FIG. 39A, when coordinates of a pixel of attention are set as an origin (0,0), coordinates of a pixel on the right side of the pixel of attention are set as (1,0), and coordinates of a pixel below the pixel of attention are set as (0,1), it is possible to represent a basic vector of the pixel of attention with Expressions (1) and (2) below (the basic vector is shown in FIG. 39A).

$$\vec{a} = (1,0) \quad (1)$$

$$\vec{b} = (0,1) \quad (2)$$

When the pixel of attention shown in FIG. 39A is N-arized on the basis of an error diffusion matrix in FIG. 39B, a difference between a pixel value of the pixel of attention after the N-arization and a pixel value of the pixel of attention before the N-arization is calculated as an error. This error is diffused to peripheral pixels corresponding to positions defined by the error diffusion matrix in accordance with weights defined by the error diffusion matrix in FIG. 39B (numerical values in a box on the right of, a box below, a box on the left obliquely below, and a box on the right obliquely below a box of the pixel of attention in FIG. 39B).

The weight vectors are vectors calculated by multiplying the basic vector by the respective weights. Weight vectors for pixels 1 to 4 shown in FIG. 39C are calculated as represented by Expressions (3) to (6) below. A weight vector in Expression (3) is calculated by multiplying the basic vector by a weight "7/16" of the pixel 1 shown in FIG. 39B. Similarly, a weight vector in Expression (4) is calculated by multiplying the basic vector by a weight "3/16" of the pixel 2. A weight vector in Expression (5) is calculated by multiplying the basic vector by a weight "5/16" of the pixel 3. A weight vector in Expression (6) is calculated by multiplying the basic vector by a weight "1/16"of the pixel 4.

$$\vec{①} = 7/16\vec{a} \quad (3)$$

$$\vec{②} = 3/16(-\vec{a}+\vec{b}) \quad (4)$$

$$\vec{③} = 5/16\vec{b} \quad (5)$$

$$\vec{④} = 1/16(\vec{a}+\vec{b}) \quad (6)$$

A direction represented by a sum of the weight vectors in Expressions (3) to (6) above (a weight vector of the error diffusion matrix) represented by Expression (7) below is the diffusing direction.

$$\vec{M} = \vec{①} + \vec{②} + \vec{③} + \vec{④} \quad (7)$$
$$= 5/16\vec{a} + 9/16\vec{b}$$

Note that the directions opposite to one another are directions in which directions represented by the weight vector of the entire error diffusion matrix represented by Expression (7) are exactly opposite. In the directions, a relation of Expression (8) below is established between the weight, vector of the entire error diffusion matrix with respect to the pixel of attention and a weight vector exactly opposite to the weight vector.

$$\vec{M}' = \alpha \vec{M} \text{ ($\alpha$ is a negative constant)} \qquad (8)$$

The weight vector in the exactly opposite direction is calculated by multiplying the weight vector in Expression (7) by the negative constant $\alpha$.

The same holds true for the image processing program and the image processing method, the printing apparatus, the printing apparatus control program, and the printing apparatus control method, the print data generating apparatus, the print data generating program, and the print data generating method, and the display apparatus, the display apparatus control program, and the display apparatus control method according to other aspects of the invention.

It is preferable that the error diffusing unit diffuses the difference that occurs in the predetermined group to pixel data not subjected to the N-arization processing in the predetermined group and pixel data not subjected to the N-arization processing in another group different from the predetermined group.

With such a constitution, a difference (an error) that occurs in a predetermined group is diffused to pixel data of another group in addition to pixel data in the same group. Thus, a diffusion property of a local difference (error) is improved. Consequently, there is an advantage that it is possible to improve image quality after the N-arization processing compared with the techniques in the past in which a difference is diffused substantially in one direction.

It is preferable that processing for selecting the pixel data in the pixel data selecting unit, the N-arization processing in the N-arization unit, and processing for diffusing the error in the error diffusing unit are applied to the K groups in parallel to one another.

With such a constitution, it is possible to perform the processing in the respective groups in parallel. It is possible to select plural pixel data in parallel and apply the N-arization processing and the error diffusion processing to the plural selected pixel data in parallel. Thus, there is an advantage that it is possible to increase processing speed compared with the techniques in the past in which pixel data are selected in order pixel by pixel and the N-arization processing and the error diffusion processing are performed.

Performing processing in parallel in the above description means performing two kinds of processing simultaneously or substantially simultaneously. The same holds true for the image processing program and the image processing method, the printing apparatus, the printing apparatus control program, and the printing apparatus control method, the print data generating apparatus, the print data generating program, and the print data generating method, and the display apparatus, the display apparatus control program, and the display apparatus control method according to other aspects of the invention.

An image processing program according to a second aspect of the invention that includes a program used for causing a computer to execute processing including: acquiring image data formed of plural pixel data having an M-ary ($M \geq 3$) gradation value; dividing the image data acquired into J ($J \geq 2$) image data areas and sectioning the J image data areas into K ($2 \leq K \leq J$) groups; selecting, for each of the image data areas forming the respective groups, predetermined pixel data out of pixel data included in the image data area; applying N-arization ($M > N \geq 2$) processing to the pixel data selected on the basis of a predetermined threshold value; and diffusing a difference between a value of the selected pixel data and a value after the N-arization processing for the selected pixel data to pixel data not subjected to the N-arization processing. In the error diffusing step, the difference is diffused in directions different from one another in two or more groups of the K groups.

With such a constitution, when the program is read by the computer and the computer executes the processing in accordance with the program read, actions and advantages equivalent to those in the image processing apparatus according to first aspect of the invention are obtained.

It is preferable that, in the grouping step, the J image data areas are sectioned into the K groups such that images in the respective image data areas forming the K groups cross one another in the respective groups.

With such a constitution, when the program is read by the computer and the computer executes the processing in accordance with the program read, actions and advantages equivalent to those in the image processing apparatus according to another aspect of the invention are obtained.

It is preferable that, in the grouping step, the image data is divided into four or more image data areas and the four or more image data areas are divided into the K groups such that images in the image data areas forming the K groups, respectively, cross one another in a lattice shape in two groups.

With such a constitution, when the program is read by the computer and the computer executes the processing in accordance with the program read, actions and advantages equivalent to those in the image processing apparatus according to still another aspect of the invention are obtained.

It is preferable that, in the grouping step, the image data is divided into plural image data areas for each of pixel groups located in a specific arrangement direction of images formed by the image data or each of pixel groups orthogonal to the pixel groups located in the specific arrangement direction.

With such a constitution, when the program is read by the computer and the computer executes the processing in accordance with the program read, actions and advantages equivalent to those in the image processing apparatus according to, still another aspect of the invention are obtained.

It is preferable that, in the grouping step, the J image data areas are sectioned into two groups and, in the error diffusing step, the difference is diffused in directions in which diffusing directions of the difference are opposite to one another in the two groups.

With such a constitution, when the program is read by the computer and the computer executes the processing in accordance with the program read, actions and advantages equivalent to those in the image processing apparatus according to still another aspect of the invention are obtained.

It is preferable that, in the error diffusing step, the difference that occurs in the predetermined group is diffused to pixel data not subjected to the N-arization processing in the predetermined group and pixel data not subjected to the N-arization processing in another group different from the predetermined group.

With such a constitution, when the program is read by the computer and the computer executes the processing in accordance with the program read, actions and advantages equivalent to those in the image processing apparatus according to still another aspect of the invention are obtained.

It is preferable that, processing for selecting the pixel data in the pixel data selecting step, the N-arization processing in the N-arization step, and processing for diffusing the error in the error diffusing step are applied to the K groups in parallel to one another.

With such a constitution, when the program is read by the computer and the computer executes the processing in accordance with the program read, actions and advantages equivalent to those in the image processing apparatus according to still another aspect of the invention are obtained.

An image processing method according to a third aspect of the invention includes: acquiring image data formed of plural pixel data having an M-ary ($M \geq 3$) gradation value; dividing the image data acquired into J ($J \geq 2$) image data areas and sectioning the J image data areas into K ($2 \leq K \leq J$) groups; selecting, for each of the image data areas forming the respective groups, predetermined pixel data out of pixel data included in the image data area; applying N-arization ($M > N \geq 2$) processing to the pixel data selected on the basis of a predetermined threshold value; and diffusing a difference between a value of the selected pixel data and a value after the N-arization processing for the selected pixel data to pixel data not subjected to the N-arization processing. In the error diffusing step, the difference is diffused in directions different from one another in two or more groups of the K groups.

Specifically, the respective steps are realized, for example, when a system program such as BIOS stored in a ROM or the like loads various dedicated computer programs stored in a ROM in advance to a RAM or loads various dedicated computer programs installed in storages to the RAM via a storage medium such as a CD-ROM, a DVD-ROM, or a flexible disk (FD) or via a communication network such as the Internet and a CPU performs arithmetic processing making full use of various resources in accordance with instructions described in the program loaded to the RAM. Consequently, actions and advantages equivalent to those in the image processing apparatus according to first of the invention are obtained.

It is preferable that, in the grouping step, the J image data areas are sectioned into the K groups such that images in the respective image data areas forming the K groups cross one another in the respective groups. Consequently, actions and advantages equivalent to those in the image processing apparatus according to another aspect of the invention are obtained.

It is preferable that, in the grouping step, the image data is divided into four or more image data areas and the four or more image data areas are divided into the K groups such that images in the image data areas forming the K groups, respectively, cross one another in a lattice shape in two groups. Consequently, actions and advantages equivalent to those in the image processing apparatus according to still another aspect of the invention are obtained.

It is preferable that, in the grouping step, the image data is divided into plural image data areas for each of pixel groups located in a specific arrangement direction of images formed by the image data or each of pixel groups orthogonal to the pixel groups located in the specific arrangement direction. Consequently, actions and advantages equivalent to those in the image processing apparatus according to still another aspect of the invention are obtained.

It is preferable that, in the grouping step, the J image data areas are sectioned into two groups and, in the error diffusing step, the difference is diffused in directions in which diffusing directions of the difference are opposite to one another in the two groups. Consequently, actions and advantages equivalent to those in the image processing apparatus according to still another aspect of the invention are obtained.

It is preferable that, in the error diffusing step, the difference that occurs in the predetermined group is diffused to pixel data not subjected to the N-arization processing in the predetermined group and pixel data not subjected to the N-arization processing in another group different from the predetermined group. Consequently, actions and advantages equivalent to those in the image processing apparatus according to still another aspect of the invention are obtained.

It is preferable that, processing for selecting the pixel data in the pixel data selecting step, the N-arization processing in the N-arization step, and processing for diffusing the error in the error diffusing step are applied to the K groups in parallel to one another. Consequently, actions and advantages equivalent to those in the image processing apparatus according to still another aspect of the invention are obtained.

A printing apparatus according to a fourth aspect of the invention is a printing apparatus that is adapted to print an image on a medium used for printing using a print head having a nozzle capable of forming a dot, the printing apparatus including: an image data acquiring unit that acquires image data formed of plural pixel data having an M-ary ($M \geq 3$) gradation value; a grouping unit that divides the image data acquired into J ($J \geq 2$) image data areas and sections the J image data areas into K ($2 \leq K \leq J$) groups; a pixel data selecting unit that selects, for each of the image data areas forming the respective groups, predetermined pixel data out of pixel data included in the image data area; an N-arization processing unit that applies N-arization ($M > N \geq 2$) processing to the pixel data selected on the basis of a predetermined threshold value; an error diffusing unit that diffuses a difference between a value of the selected pixel data and a value after the N-arization processing for the selected pixel data to pixel data not subjected to the N-arization processing; a print data generating unit that generates print data defining information on a content of dot formation of the nozzle corresponding to the image data after the error diffusion processing; and a printing unit that prints the image on the medium using the print head on the basis of the print data. The error diffusing unit diffuses the difference in directions different from one another in two or more groups of the K groups.

With such a constitution, it is possible to acquire image data formed of plural pixel data having an M-ary ($M \geq 3$) gradation value with the image data acquiring unit. It is possible to divide the image data acquired into J ($J \geq 2$) image data areas and section the J image data areas into K ($2 \leq K \leq J$) groups with the grouping unit. It is possible to select, for each of the image data areas forming the respective groups, predetermined pixel data out of pixel data included in the image data area with the data selecting unit. It is possible to apply the N-arization ($M > N \geq 2$) processing to the image data selected on the basis of a predetermined threshold value with the N-arization processing unit. It is possible to diffuse a difference between the selected pixel data and a value after the N-arization processing for the selected pixel data to pixel data not subjected to the N-arization processing with the error diffusing unit. It is possible to generate print data defining information on contents of dot formation of the nozzle corresponding to the image data after the error diffusion processing with the print data generating unit. It is possible to print the image on the medium using the print head on the basis of the print data with the printing unit.

Moreover, the error diffusing unit is capable of diffusing the difference in directions different from one another in two or more groups of the K groups.

Therefore, image data is grouped into plural image data areas, the N-arization processing is performed for each of the groups, and diffusing directions of a difference (an error) that occurs in each of the groups are set as directions different from one another in two or more groups. Thus, the propagation directions of the difference (the error) are in multiple directions. There is an advantage that it is possible to improve a print image quality compared with a print result at the time when the techniques in the past in which a difference is diffused substantially in one direction are applied.

A dot means one area that is formed when ink jetted from one or plural nozzles reaches a medium used for printing. It goes without saying that an area of the "dot" is not "zero" and the "dot" has a fixed size (area). Plural kinds of dots are present for each size. However, a dot formed by jetting an ink is not always formed in a complete round shape. For example, when dot are formed in a shape other than the complete round shape such as an elliptical shape, an average diameter of the dots may be treated as a dot diameter. Alternatively, assuming an equivalent dot of a complete round shape having an area equal to an area of a dot formed by jetting a certain quantity of ink, a diameter of the equivalent dot may be treated as a dot diameter. As a method of separately forming dots with different concentrations, for example, a method of forming dots with the same size and different concentrations, a method of forming dots with the same concentration and different sizes, a method of forming dots with the same concentration and different discharge amounts of ink and varying concentration by superimposed formation of dots, and the like are conceivable. When one ink droplet jetted from one nozzle separately is separated and reaches a medium, it is assumed that one dot is formed. However, when two or more dots formed by ink from two nozzles or formed by ink from one nozzle at different times stick to each other, it is assumed that two dots are formed. The same holds true for the printing apparatus control program and the printing apparatus control method, and the print data generating apparatus, the print data generating program, and the print data generating method according to other aspects of the invention.

The information on contents of dot formation is formed by information necessary in forming dots with nozzles such as information on presence or absence of dots (whether dots are formed by nozzles) corresponding to respective pixel values of image data after the N-arization and information on sizes (e.g., any one of three kinds of large, medium, and small) of dots at the time when dots are formed. For example, when there is only one kinds of formation size, the information may be formed by only the information on presence or absence of dots. The same holds true for the printing apparatus control program and the printing apparatus control method, and the print data generating apparatus, the print data generating program, and the print data generating method according to other aspects of the invention.

It is preferable that the grouping unit sections the J image data areas into the K groups such that images in the respective image data areas forming the K groups cross one another in the respective groups.

With such a constitution, it is possible to diffuse a difference (an error) to unprocessed pixel data such that diffusing directions of the difference (the error) are different in two or more groups, respectively, with respect to image data that are grouped such that the respective image data areas cross one another in the respective groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve a print image quality compared with a print result at the time when the techniques in the past in which a difference is diffused substantially in one direction are applied.

It is preferable that the grouping unit divides the image data into four or more image data areas and sections the four or more image data areas into the K groups such that images in the image data areas forming the K groups, respectively, cross one another in a lattice shape in two groups.

With such a constitution, in images after grouping, the respective image data areas are arranged alternately with one another to form a lattice in two groups. It is possible to propagate a difference (an error) to the image data grouped in this way such that diffusing directions of the difference (the error) are different from one another in two or more groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve a print image quality compared with a print result at the time when the techniques in the past in which a difference is diffused substantially in one direction are applied.

It is preferable that the grouping unit divides the image data into plural image data areas for each of pixel groups located in a specific arrangement direction of images formed by the image data or each of pixel groups orthogonal to the pixel groups located in the specific arrangement direction.

With such a constitution, in an image after grouping, for example, image data areas by a unit of a row or a unit of a column are arranged alternately among two groups. It is possible to propagate a difference (an error) to the image data grouped in this way such that diffusing directions of the difference. (the error) are different from one another in two or more groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve a print image quality compared with a print result at the time when the techniques in the past in which a difference is diffused substantially in one direction are applied.

It is preferable that the grouping unit sections the J image data areas into two groups and the error diffusing unit diffuses the difference in directions in which diffusing directions of the difference are opposite to one another in the two groups.

With such a constitution, it is possible to diffuse a difference (an error) to pixel data in directions opposite to one another in two groups. It is possible to set propagation directions of the difference (the error) in multiple directions and not to overlap each other in the two groups. Thus, there is an advantage that it is possible to improve a print image quality compared with a print result at the time when the techniques in the past in which a difference is diffused substantially in one direction are applied.

It is preferable that the error diffusing unit diffuses the difference that occurs in the predetermined group to pixel data not subjected to the N-arization processing in the predetermined group and pixel data not subjected to the N-arization processing in another group different from the predetermined group.

With such a constitution, a difference (an error) that occurs in a predetermined group is diffused to pixel data of another group in addition to pixel data in the same group. Thus, a diffusion property of a local difference (error) is improved. Consequently, there is an advantage that it is possible to improve a print image quality compared with a print result at the time when the techniques in the past in which a difference is diffused substantially in one direction are applied.

It is preferable that processing for selecting the pixel data in the pixel data selecting unit, the N-arization processing in the N-arization unit, and processing for diffusing the error in the error diffusing unit are applied to the K groups in parallel to one another.

With such a constitution, it is possible to perform the processing in the respective groups in parallel. It is possible to select plural pixel data in parallel and apply the N-arization processing and the error diffusion processing to the plural selected pixel data in parallel. Thus, there is an advantage that it is possible to increase processing speed compared with the techniques in the past in which pixel data are selected in order pixel by pixel and the N-arization processing and the error diffusion processing are performed.

A printing apparatus control program according to a fifth aspect of the invention is a printing apparatus control program that is used to control a printing apparatus adapted to print an image on a medium used for printing using a print head having a nozzle capable of forming a dot, the printing apparatus control program including a program used for causing a computer to execute processing including: acquiring image data formed of plural pixel data having an M-ary (M≧3) gradation value; dividing the image data acquired into J (J≧2) image data areas and sectioning the J image data areas into K (2≦K≦J) groups; selecting, for each of the image data areas forming the respective groups, predetermined pixel data out of pixel data included in the image data area; applying N-arization (M>N≧2) processing to the pixel data selected on the basis of a predetermined threshold value; diffusing a difference between a value of the selected pixel data and a value after the N-arization processing for the selected pixel data to pixel data not subjected to the N-arization processing; generating print data defining information on a content of dot formation of the nozzle corresponding to the image data after the error diffusion processing; and printing the image on the medium using the print head on the basis of the print data. In the error diffusing step, the difference is diffused in directions different from one another in two or more groups of the K groups.

With such a constitution, when the program is read by the computer and the computer executes the processing in accordance with the program read, actions and advantages equivalent to those in the printing apparatus according to the fourth aspect of the invention are obtained.

It is preferable that, in the grouping step, the J image data areas are sectioned into the K groups such that images in the respective image data areas forming the K groups cross one another in the respective groups.

With such a constitution, when the program is read by the computer and the computer executes the processing in accordance with the program read, actions and advantages equivalent to those in the printing apparatus according to another aspect of the invention are obtained.

It is preferable that, in the grouping step, the image data is divided into four or more image data areas and the four or more image data areas are sectioned into the K groups such that images in the image data areas forming the K groups, respectively, cross one another in a lattice shape in two groups.

With such a constitution, when the program is read by the computer and the computer executes the processing in accordance with the program read, actions and advantages equivalent to those in the printing apparatus according to still another aspect of the invention are obtained.

It is preferable that, in the grouping step, the image data is divided into plural image data areas for each of pixel groups located in a specific arrangement direction of images formed by the image data or each of pixel groups orthogonal to the pixel groups located in the specific arrangement direction.

With such a constitution, when the program is read by the computer and the computer executes the processing in accordance with the program read, actions and advantages equivalent to those in the printing apparatus according to still another aspect of the invention are obtained.

It is preferable that, in the grouping step, the J image data areas are sectioned into two groups and, in the error diffusing step, the difference is diffused in directions in which diffusing directions of the difference are opposite to one another in the two groups.

With such a constitution, when the program is read by the computer and the computer executes the processing in accordance with the program read, actions and advantages equivalent to those in the printing apparatus according to still another aspect of the invention are obtained.

It is preferable that, in the error diffusing step, the difference that occurs in the predetermined group is diffused to pixel data not subjected to the N-arization processing in the predetermined group and pixel data not subjected to the N-arization processing in another group different from the predetermined group.

With such a constitution, when the program is read by the computer and the computer executes the processing in accordance with the program read, actions and advantages equivalent to those in the printing apparatus according to still another aspect of the invention are obtained.

It is preferable that processing for selecting the pixel data in the pixel data selecting step, the N-arization processing in the N-arization step, and processing for diffusing the error in the error diffusing step are applied to the K groups in parallel to one another.

With such a constitution, when the program is read by the computer and the computer executes the processing in accordance with the program read, actions and advantages equivalent to those in the printing apparatus according to still another aspect of the invention are obtained.

A printing apparatus control method according to a sixth aspect of the invention is a printing apparatus control method that is used to control a printing apparatus adapted to print an image on a medium used for printing using a print head having a nozzle capable of forming a dot, the printing apparatus control method including: acquiring image data formed of plural pixel data having an M-ary (M≧3) gradation value; dividing the image data acquired into J (J≧2) image data areas and sectioning the J image data areas into K (2≦K≦J) groups; selecting, for each of the image data areas forming the respective groups, predetermined pixel data out of pixel data included in the image data area; applying N-arization (M>N≧2) processing to the pixel data selected on the basis of a predetermined threshold value; diffusing a difference between a value of the selected pixel data and a value after the N-arization processing for the selected pixel data to pixel data not subjected to the N-arization processing; generating print data defining information on a content of dot formation of the nozzle corresponding to the image data after the error diffusion processing; and printing the image on the medium using the print head on the basis of the print data. In the error diffusing step, the difference is diffused in directions different from one another in two or more groups of the K groups.

Specifically, the respective steps are realized, for example, when a system program such as BIOS stored in a ROM or the like loads various dedicated computer programs stored in a ROM in advance to a RAM or loads various dedicated computer programs installed in storages to the RAM via a storage medium such as a CD-ROM, a DVD-ROM, or a flexible disk (FD) or via a communication network such as the Internet and a CPU performs arithmetic processing making full use of various resources in accordance with instructions described in the program loaded to the RAM. Consequently, actions and advantages equivalent to those in the printing apparatus according to the fourth aspect of the invention are obtained.

It is preferable that, in the grouping step, the J image data areas are sectioned into the K groups such that images in the respective image data areas forming the K groups cross one another in the respective groups. Consequently, actions and advantages equivalent to those in the printing apparatus according to another aspect of the invention are obtained.

It is preferable that, in the grouping step, the image data is divided into four or more image data areas and the four or more image data areas are sectioned into the K groups such that images in the image data areas forming the K groups, respectively, cross one another in a lattice shape in two groups. Consequently, actions and advantages equivalent to those in the printing apparatus according to still another aspect of the invention are obtained.

It is preferable that, in the grouping step, the image data is divided into plural image data areas for each of pixel groups located in a specific arrangement direction of images formed by the image data or each of pixel groups orthogonal to the pixel groups located in the specific arrangement direction. Consequently, actions and advantages equivalent to those in the printing apparatus according to still another aspect of the invention are obtained.

It is preferable that, in the grouping step, the J image data areas are sectioned into two groups and, in the error diffusing step, the difference is diffused in directions in which diffusing directions of the difference are opposite to one another in the two groups. Consequently, actions and advantages equivalent to those in the printing apparatus according to still another aspect of the invention are obtained.

It is preferable that, in the error diffusing step, the difference that occurs in the predetermined group is diffused to pixel data not subjected to the N-arization processing in the predetermined group and pixel data not subjected to the N-arization processing in another group different from the predetermined group. Consequently, actions and advantages equivalent to those in the printing apparatus according to still another aspect of the invention are obtained.

It is preferable that processing for selecting the pixel data in the pixel data selecting step, the N-arization processing in the N-arization step, and processing for diffusing the error in the error diffusing step are applied to the K groups in parallel to one another. Consequently, actions and advantages equivalent to those in the printing apparatus according to still another aspect of the invention are obtained.

A print data generating apparatus according to a seventh aspect of the invention is a print data generating apparatus that generates print data used in a printing apparatus adapted to print an image on a medium used for printing using a print head having a nozzle capable of forming a dot, the print data generating apparatus including: an image data acquiring unit that acquires image data formed of plural pixel data having-an M-ary ($M \geq 3$) gradation value; a grouping unit that divides the image data acquired into J ($J \geq 2$) image data areas and sections the J image data areas into K ($2 \leq K \leq J$) groups; a pixel data selecting unit that selects, for each of the image data areas forming the respective groups, predetermined pixel data out of pixel data included in the image data area; an N-arization processing unit that applies N-arization ($M > N \geq 2$) processing to the pixel data selected on the basis of a predetermined threshold value; an error diffusing unit that diffuses a difference between a value of the selected pixel data and a value after the N-arization processing for the selected pixel data to pixel data not subjected to the N-arization processing; and a print data generating unit that generates print data defining information on a content of dot formation of the nozzle corresponding to the image data after the error diffusion processing. The error diffusing unit diffuses the difference in directions different from one another in two or more groups of the K groups.

In the seventh aspect of the invention, the print data generating apparatus does not include a printing unit for actually executing printing as in the printing apparatus. The print data generating apparatus generates print data corresponding to a characteristic of a print head on the basis of M-ary image data.

Therefore, it is possible to obtain actions and advantages same as those in the printing apparatus according to the fourth aspect. In addition, for example, it is possible to execute print processing in the printing apparatus simply by sending print data generated in the print data generating apparatus to the printing apparatus. With such a constitution, it is possible to directly use, for example, an existing ink-jet printing apparatus without preparing a dedicated printing apparatus.

Since it is possible to use a general-purpose information processing apparatus such as a personal computer, it is possible to directly use, for example, an existing printing system including a print instructing apparatus such as a personal printer and an ink-jet printer.

It is preferable that the grouping unit sections the J image data areas into the K groups such that images in the respective image data areas forming the K groups cross one another in the respective groups. Consequently, actions and advantages equivalent to those in the printing apparatus according to another aspect of the invention are obtained.

It is preferable that the grouping unit divides the image data into four or more image data areas and sections the four or more image data areas into the K groups such that images in the image data areas forming the K groups, respectively, cross one another in a lattice shape in two groups. Consequently, actions and advantages equivalent to those in the printing apparatus according to still another aspect of the invention are obtained.

It is preferable that the grouping unit divides the image data into plural image data areas for each of pixel groups located in a specific arrangement direction of images formed by the image data or each of pixel groups orthogonal to the pixel groups located in the specific arrangement direction. Consequently, actions and advantages equivalent to those in the printing apparatus according to still another aspect of the invention are obtained.

It is preferable that the grouping unit sections the J image data areas into two groups and the error diffusing unit diffuses the difference in directions in which diffusing directions of the difference are opposite to one another in the two groups. Consequently, actions and advantages equivalent to those in the printing apparatus according to still another aspect of the invention are obtained.

It is preferable that the error diffusing unit diffuses the difference that occurs in the predetermined group to pixel data not subjected to the N-arization processing in the predetermined group and pixel data not subjected to the N-arization processing in another group different from the predetermined group. Consequently, actions and advantages equivalent to those in the printing apparatus according to still another aspect of the invention are obtained.

It is preferable that processing for selecting the pixel data in the pixel data selecting unit, the N-arization processing in the N-arization unit, and processing for diffusing the error in the error diffusing unit are applied to the K groups in parallel to one another. Consequently, actions and advantages equivalent to those in the printing apparatus according to still another aspect of the invention are obtained.

A print data generating program according to an eighth aspect of the invention is a print data generating program that is used to generate print data used in a printing apparatus adapted to print an image on a medium used for printing using a print head having a nozzle capable of forming a dot, the print data generating program including a program used for causing a computer to execute processing including: acquiring image data formed of plural pixel data having an M-ary ($M \geq 3$) gradation value; dividing the image data acquired into J ($J \geq 2$) image data areas and sectioning the J image data areas into K ($2 \leq K \leq J$) groups; selecting, for each of the image data areas forming the respective groups, predetermined pixel data out of pixel data included in the image data area; applying N-arization ($M > N \geq 2$) processing to the pixel data selected on the basis of a predetermined threshold value; diffusing a difference between a value of the selected pixel data and a value after the N-arization processing for the selected pixel data to pixel data not subjected to the N-arization processing; generating print data defining information on a content of dot formation of the nozzle corresponding to the image data after the error diffusion processing; and printing the image on the medium using the print head on the basis of the print data. In the error diffusing step, the difference is diffused in directions, different from one another in two or more groups of the K groups.

With such a constitution, when the program is read by the computer and the computer executes the processing in accordance with the program read, actions and advantages equivalent to those in the image processing apparatus according to the fourth aspect of the invention are obtained.

It is preferable that, in the grouping step, the J image data areas are sectioned into the K groups such that images in the respective image data areas forming the K groups cross one another in the respective groups.

With such a constitution, when the program is read by the computer and the computer executes the processing in accordance with the program read, actions and advantages equivalent to those in the printing apparatus according to another aspect of the invention are obtained.

It is preferable that, in the grouping step, the image data is divided into four or more image data areas and the four or more image data areas are sectioned into the K groups such that images in the image data areas forming the K groups, respectively, cross one another in a lattice shape in two groups.

With such a constitution, when the program is read by the computer and the computer executes the processing in accordance with the program read, actions and advantages equivalent to those in the printing apparatus according to still another aspect of the invention are obtained.

It is preferable that, in the grouping step, the image data is divided into plural image data areas for each of pixel groups located in a specific arrangement direction of images formed by the image data or each of pixel groups orthogonal to the pixel groups located in the specific arrangement direction.

With such a constitution, when the program is read by the computer and the computer executes the processing in accordance with the program read, actions and advantages equivalent to those in the printing apparatus according to still another aspect of the invention are obtained.

It is preferable that, in the grouping step, the J image data areas are sectioned into two groups and, in the error diffusing step, the difference is diffused in directions in which diffusing directions of the difference are opposite to one another in the two groups.

With such a constitution, when the program is read by the computer and the computer executes the processing in accordance with the program read, actions and advantages equivalent to those in the printing apparatus according to still another aspect of the invention are obtained.

It is preferable that, in the error diffusing step, the difference that occurs in the predetermined group is diffused to pixel data not subjected to the N-arization processing in the predetermined group and pixel data not subjected to the N-arization processing in another group different from the predetermined group.

With such a constitution, when the program is read by the computer and the computer executes the processing in accordance with the program read, actions and advantages equivalent to those in the printing apparatus according to still another aspect of the invention are obtained.

It is preferable that processing for selecting the pixel data in the pixel data selecting step, the N-arization processing in the N-arization step, and processing for diffusing the error in the error diffusing step are applied to the K groups in parallel to one another.

With such a constitution, when the program is read by the computer and the computer executes the processing in accordance with the program read, actions and advantages equivalent to those in the printing apparatus according to still another aspect of the invention are obtained.

A print data generating method according to a ninth aspect of the invention is a print data generating method that is used to generate print data used in a printing apparatus adapted to print an image on a medium used for printing using a print head having a nozzle capable of forming a dot, the print data generating method including: acquiring image data formed of plural pixel data having an M-ary ($M \geq 3$) gradation value; dividing the image data acquired into J ($J \geq 2$) image data areas and sectioning the J image data areas into K ($2 \leq K \leq J$) groups; selecting, for each of the image data areas forming the respective groups, predetermined pixel data out of pixel data included in the image data area; applying N-arization ($M > N \geq 2$) processing to the pixel data selected on the basis of a predetermined threshold value; diffusing a difference between a value of the selected pixel data and a value after the N-arization processing for the selected pixel data to pixel data not subjected to the N-arization processing; generating print data defining information on a content of dot formation of the nozzle corresponding to the image data after the error diffusion processing; and printing the image on the medium using the print head on the basis of the print data. In the error diffusing step, the difference is diffused in directions different from one another in two or more groups of the K groups.

Specifically, the respective steps are realized, for example, when a system program such as BIOS stored in a ROM or the like loads various dedicated computer programs stored in a ROM in advance to a RAM or loads various dedicated computer programs installed in storages to the RAM via a storage medium such as a CD-ROM, a DVD-ROM, or a flexible disk (FD) or via a communication network such as the Internet and a CPU performs arithmetic processing making full use of various resources in accordance with instructions described in the program loaded to the RAM. Consequently, actions and advantages equivalent to those in the printing apparatus according to the fourth aspect of the invention are obtained.

It is preferable that, in the grouping step, the J image data areas are sectioned into the K groups such that images in the respective image data areas forming the K groups cross one another in the respective groups. Consequently, actions and advantages equivalent to those in the printing apparatus according to another aspect of the invention are obtained.

It is preferable that, in the grouping step, the image data is divided into four or more image data areas and the four or more image data areas are sectioned into the K groups such that images in the image data areas forming the K groups, respectively, cross one another in a lattice shape in two groups. Consequently, actions and advantages equivalent to those in the printing apparatus according to still another aspect of the invention are obtained.

It is preferable that, in the grouping step, the image data is divided into plural image data areas for each of pixel groups located in a specific arrangement direction of images formed by the image data or each of pixel groups orthogonal to the pixel groups located in the specific arrangement direction. Consequently, actions and advantages equivalent to those in the printing apparatus according to still another aspect of the invention are obtained.

It is preferable that, in the grouping step, the J image data areas are sectioned into two groups and, in the error diffusing step, the difference is diffused in directions in which diffusing directions of the difference are opposite to one another in the two groups. Consequently, actions and advantages equivalent to those in the printing apparatus according to still another aspect of the invention are obtained.

It is preferable that, in the error diffusing step, the difference that occurs in the predetermined group is diffused to pixel data not subjected to the N-arization processing in the predetermined group and pixel data not subjected to the N-arization processing in another group different from the predetermined group. Consequently, actions and advantages equivalent to those in the printing apparatus according to still another aspect of the invention are obtained.

It is preferable that processing for selecting the pixel data in the pixel data selecting step, the N-arization processing in the N-arization step, and processing for diffusing the error in the error diffusing step are applied to the K groups in parallel to one another. Consequently, actions and advantages equivalent to those in the printing apparatus according to still another aspect of the invention are obtained.

A display apparatus according to a tenth aspect of the invention is a display apparatus that displays an image on a display unit on the basis of image data, the display apparatus including: an image data acquiring unit that acquires the image data formed of plural pixel data having an M-ary ($M \geq 3$) gradation value; a grouping unit that divides the image data acquired into J ($J \geq 2$) image data areas and sections the J image data areas into K ($2 \leq K \leq J$) groups; a pixel data selecting unit that selects, for each of the image data areas forming the respective groups, predetermined pixel data out of pixel data included in the image data area; an N-arization processing unit that applies N-arization ($M > N \geq 2$) processing to the pixel data selected on the basis of a predetermined threshold value; an error diffusing unit that diffuses a difference between a value of the selected pixel data and a value after the N-arization processing for the selected pixel data to pixel data not subjected to the N-arization processing; and a displaying unit that displays the image on the display unit on the basis of image data after the error diffusion processing. The error diffusing unit diffuses the difference in directions different from one another in two or more groups of the K groups.

With such a constitution, it is possible to acquire image data formed of plural pixel data having an M-ary ($M \geq 3$) gradation value with the image data acquiring unit. It is possible to divide the image data acquired into J ($J \geq 2$) image data areas and section the J image data areas into K ($2 \leq K \leq J$) groups with the grouping unit. It is possible to select, for each of the image data areas forming the respective groups, predetermined pixel data out of pixel data included in the image data area with the data selecting unit. It is possible to apply the N-arization ($M > N \geq 2$) processing to the image data selected on the basis of a predetermined threshold value with the N-arization processing unit. It is possible to diffuse a difference between the selected pixel data and a value after the N-arization processing for the selected pixel data to pixel data not subjected to the N-arization processing with the error diffusing unit. It is possible to display the image on the display unit on the basis of image data after the error diffusion processing.

The error diffusing unit is also capable of diffusing the difference in directions different from one another in two or more groups of the K groups.

Therefore, since image data is divided into groups of plural image data, the N-arization processing is performed for each of the groups, and a diffusing direction of a difference (an error) that occurs in each of the groups is set in directions different from one another in two or more groups, the difference (the error) is propagated in multiple directions. Thus, there is an advantage that it is possible to improve a display image quality compared with a display result at the time when the techniques in which a difference is diffused substantially in one direction are applied.

It is preferable that the grouping unit sections the J image data areas into the K groups such that images in the respective image data areas forming the K groups cross one another in the respective groups.

With such a constitution, it is possible to diffuse a difference (an error) to unprocessed pixel data such that diffusing directions of the difference (the error) are different in two or more groups, respectively, with respect to image data that are grouped such that the respective image data areas cross one another in the respective groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve a display image quality compared with a display result as the time when the techniques in the past in which an error is diffused substantially in one direction are applied.

It is preferable that the grouping unit divides the image data into four or more image data areas and sections the four or more image data areas into the K groups such that images in the image data areas forming the K groups, respectively, cross one another in a lattice shape in two groups.

With such a constitution, in images after grouping, the respective image data areas are arranged alternately with one another to form a lattice in two groups. It is possible to propagate a difference (an error) to the image data grouped in this way such that diffusing directions of the difference (the error) are different from one another in two or more groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve a display image quality compared with a display result at the time when the techniques in the past in which an error is diffused substantially in one direction are applied.

It is preferable that the grouping unit divides the image data into plural image data areas for each of pixel groups located in a specific arrangement direction of images formed by the image data or each of pixel groups orthogonal to the pixel groups located in the specific arrangement direction are applied.

With such a constitution, in an image after grouping, for example, image data areas by a unit of a row or a unit of a column are arranged alternately among two groups. It is possible to propagate a difference (an error) to the image data grouped in this way such that diffusing directions of the difference (the error) are different from one another in two or more groups. In a crossing part of the image data areas, the diffusing directions of the difference (the error) are in multiple directions and do not overlap the diffusing directions of other adjacent groups. It is possible to make image quality uniform. Thus, there is an advantage that it is possible to improve a display image quality compared with a display result at the time when the techniques in the past in which an error is diffused substantially in one direction are applied.

It is preferable that the grouping unit sections the J image data areas into two groups and the error diffusing unit diffuses the difference in directions in which diffusing directions of the difference are opposite to one another in the two groups.

With such a constitution, it is possible to diffuse a difference (an error) to pixel data in directions opposite to one another in two groups. It is possible to set propagation directions of the difference (the error) in multiple directions and not to overlap each other in the two groups. Thus, there is an advantage that it is possible to improve a display image quality compared with a display result at the time when the techniques in the past in which an error is diffused substantially in one direction are applied.

It is preferable that the error diffusing unit diffuses the difference that occurs in the predetermined group to pixel data not subjected to the N-arization processing in the predetermined group and pixel data not subjected to the N-arization processing in another group different from the predetermined group.

With such a constitution, a difference (an error) that occurs in a predetermined group is diffused to pixel data of another group in addition to pixel data in the same group. Thus, a diffusion property of a local difference (error) is improved. Consequently, there is an advantage that it is possible to improve a display image quality compared with a display result at the time when the techniques in the past in which a difference is diffused substantially in one direction are applied.

It is preferable that processing for selecting the pixel data in the pixel data selecting unit, the N-arization processing in the N-arization unit, and processing for diffusing the error in the error diffusing unit are applied to the K groups in parallel to one another.

With such a constitution, it is possible to perform the processing in the respective groups in parallel. It is possible to select plural pixel data in parallel and apply the N-arization processing and the error diffusion processing to the plural selected pixel data in parallel. Thus, there is an advantage that it is possible to increase processing speed compared with the techniques in the past in which pixel data are selected in order pixel by pixel and the N-arization processing and the error diffusion processing are performed.

A display apparatus control program according to an eleventh aspect of the invention is a display apparatus control program that is used to control a display apparatus that displays an image on a display unit on the basis of image data, the display apparatus control program including a program used for causing a computer to execute processing including: acquiring the image data formed of plural pixel data having an M-ary ($M \geq 3$) gradation value; dividing the image data acquired into J ($J \geq 2$) image data areas and sectioning the J image data areas into K ($2 \leq K \leq J$) groups; selecting, for each of the image data areas forming the respective groups, predetermined pixel data out of pixel data included in the image data area; applying N-arization ($M > N \geq 2$) processing to the pixel data selected on the basis of a predetermined threshold value; diffusing a difference between a value of the selected pixel data and a value after the N-arization processing for the selected pixel data to pixel data not subjected to the N-arization processing; and displaying the image on the display unit on the basis of image data after the error diffusion processing. In the error diffusing step, the difference is diffused in directions different from one another in two or more groups of the K groups.

With such a constitution, when the program is read by the computer and the computer executes the processing in accordance with the program read, actions and advantages equivalent to those in the display apparatus according to the tenth aspect of the invention are obtained.

It is preferable that, in the grouping step, the J image data areas are sectioned into the K groups such that images in the respective image data areas forming the K groups cross one another in the respective groups.

With such a constitution, when the program is read by the computer and the computer executes the processing in accordance with the program read, actions and advantages equivalent to those in the display apparatus according to another aspect of the invention are obtained.

It is preferable that, in the grouping step, the image data is divided into four or more image data areas and the four or more image data areas are sectioned into the K groups such that images in the image data areas forming the K groups, respectively, cross one another in a lattice shape in two groups.

With such a constitution, when the program is read by the computer and the computer executes the processing in accordance with the program read, actions and advantages equivalent to those in the display apparatus according to still another aspect of the invention are obtained.

It is preferable that, in the grouping step, the image data is divided into plural image data areas for each of pixel groups located in a specific arrangement direction of images formed by the image data or each of pixel groups orthogonal to the pixel groups located in the specific arrangement direction.

With such a constitution, when the program is read by the computer and the computer executes the processing in accordance with the program read, actions and advantages equivalent to those in the display apparatus according to still another aspect of the invention are obtained.

It is preferable that, in the grouping step, the J image data areas are sectioned into two groups and, in the error diffusing step, the difference is diffused in directions in which diffusing directions of the difference are opposite to one another in the two groups.

With such a constitution, when the program is read by the computer and the computer executes the processing in accordance with the program read, actions and advantages equivalent to those in the display apparatus according to still another aspect of the invention are obtained.

It is preferable that, in the error diffusing step, the difference that occurs in the predetermined group is diffused to pixel data not subjected to the N-arization processing in the predetermined group and pixel data not subjected to the N-arization processing in another group different from the predetermined group.

With such a constitution, when the program is read by the computer and the computer executes the processing in accordance with the program read, actions and advantages equivalent to those in the display apparatus according to still another aspect of the invention are obtained.

It is preferable that processing for selecting the pixel data in the pixel data selecting step, the N-arization processing in the N-arization step, and processing for diffusing the error in the error diffusing step are applied to the K groups in parallel to one another.

With such a constitution, when the program is read by the computer and the computer executes the processing in accordance with the program read, actions and advantages equivalent to those in the display apparatus according to still another aspect of the invention are obtained.

A display apparatus control method according to a twelfth aspect of the invention is a display apparatus control method that is used to control a display apparatus that displays an image on a display unit on the basis of image data, the display apparatus control method including: acquiring the image data formed of plural pixel data having an M-ary (M≧3) gradation value; dividing the image data acquired into J (J≧2) image data areas and sectioning the J image data areas into K (2≦K≦J) groups; selecting, for each of the image data areas forming the respective groups, predetermined pixel data out of pixel data included in the image data area; applying N-arization (M>N≧2) processing to the pixel data selected on the basis of a predetermined threshold value; diffusing a difference between a value of the selected pixel data and a value after the N-arization processing for the selected pixel data to pixel data not subjected to the N-arization processing; and displaying the image on the display unit on the basis of image data after the error diffusion processing. In the error diffusing step, the difference is diffused in directions different from one another in two or more groups of the K groups.

Specifically, the respective steps are realized, for example, when a system program such as BIOS stored in a ROM or the like loads various dedicated computer programs stored in a ROM in advance to a RAM or loads various dedicated computer programs installed in storages to the RAM via a storage medium such as a CD-ROM, a DVD-ROM, or a flexible disk (FD) or via a communication network such as the Internet and a CPU performs arithmetic processing making full use of various resources in accordance with instructions described in the program loaded to the RAM. Consequently, actions and advantages equivalent to those in the display apparatus according to the tenth aspect of the invention are obtained.

It is preferable that, in the grouping step, the J image data areas are sectioned into the K groups such that images in the respective image data areas forming the K groups cross one another in the respective groups. Consequently, actions and advantages equivalent to those in the display apparatus according to another aspect of the invention are obtained.

It is preferable that, in the grouping step, the image data is divided into four or more image data areas and the four or more image data areas are sectioned into the K groups such that images in the image data areas forming the K groups, respectively, cross one another in a lattice shape in two groups. Consequently, actions and advantages equivalent to those in the display apparatus according to still another aspect of the invention are obtained.

It is preferable that, in the grouping step, the image data is divided into plural image data areas for each of pixel groups located in a specific arrangement direction of images formed by the image data or each of pixel groups orthogonal to the pixel groups located in the specific arrangement direction. Consequently, actions and advantages equivalent to those in the display apparatus according to still another aspect of the invention are obtained.

It is preferable that, in the grouping step, the J image data areas are sectioned into two groups and, in the error diffusing step, the difference is diffused in directions in which diffusing directions of the difference are opposite to one another in the two groups. Consequently, actions and advantages equivalent to those in the display apparatus according to still another aspect of the invention are obtained.

It is preferable that, in the error diffusing step, the difference that occurs in the predetermined group is diffused to pixel data not subjected to the N-arization processing in the predetermined group and pixel data not subjected to the N-arization processing in another group different from the predetermined group. Consequently, actions and advantages equivalent to those in the display apparatus according to still another aspect of the invention are obtained.

It is preferable that processing for selecting the pixel data in the pixel data selecting step, the N-arization processing in the N-arization step, and processing for diffusing the error in the error diffusing step are applied to the K groups in parallel to one another. Consequently, actions and advantages equivalent to those in the display apparatus according to still another aspect of the invention are obtained.

BRIEF DESCRIPTION OF THE DRAWINGS

The invention will be described with reference to the accompanying drawings, wherein like numbers reference like elements.

FIG. 6 is a table showing an example of grouping information and N-arization information corresponding to N-arization instruction information (number information).

FIGS. 9A and 9B are diagrams showing an example of a selection order for pixel data and an example in which image data areas by a unit of a row are grouped and showing a part of M-ary image data is shown.

FIGS. 10A to 10D are diagrams showing an error diffusion matrix 1 and an error diffusion matrix 2.

FIGS. 14A and 14B are diagrams showing an example of a selection order for pixel data and an example in which image data areas by a unit of one pixel are grouped.

FIGS. 15A to 15D are diagrams showing an error diffusion matrix 3 and an error diffusion matrix 4.

Figure 18:
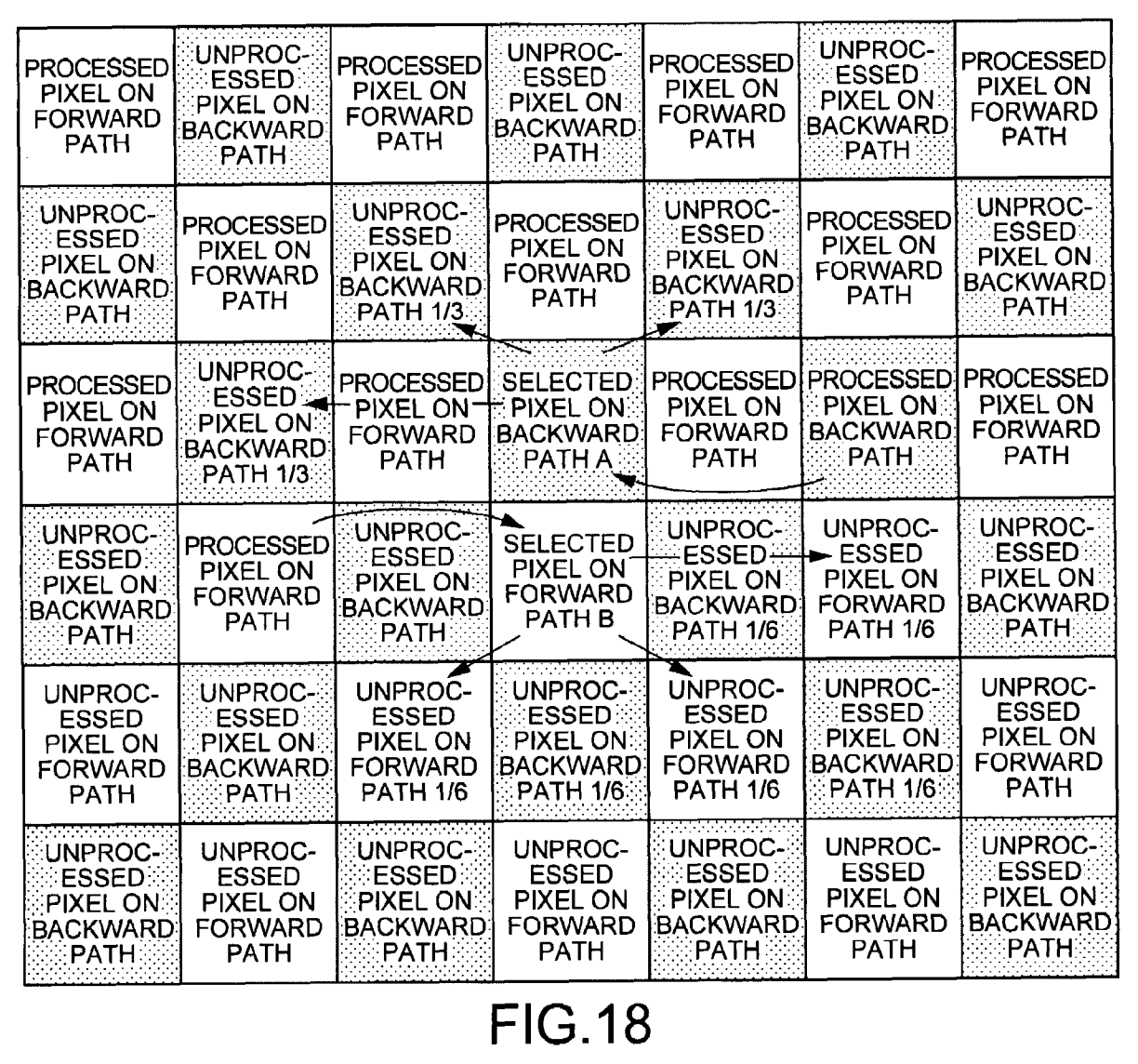

FIG. 18 is a diagram showing error diffusion processing using the error diffusion matrix 4.

FIG. 29 is a diagram showing an example of a selection pattern for selecting pixel data for each column of each group in image data grouped in a lattice shape.

FIG. 30 is a diagram showing an example of a selection pattern for selecting pixel data of each group in an oblique direction in image data grouped in a lattice shape.

DESCRIPTION OF EXEMPLARY EMBODIMENTS

Embodiments of the invention will be hereinafter explained with reference to the accompanying drawings. FIGS. 1 to 18 are diagrams showing an image processing apparatus, an image processing program, and an image processing method according to the embodiments of the invention.

Figure 1:
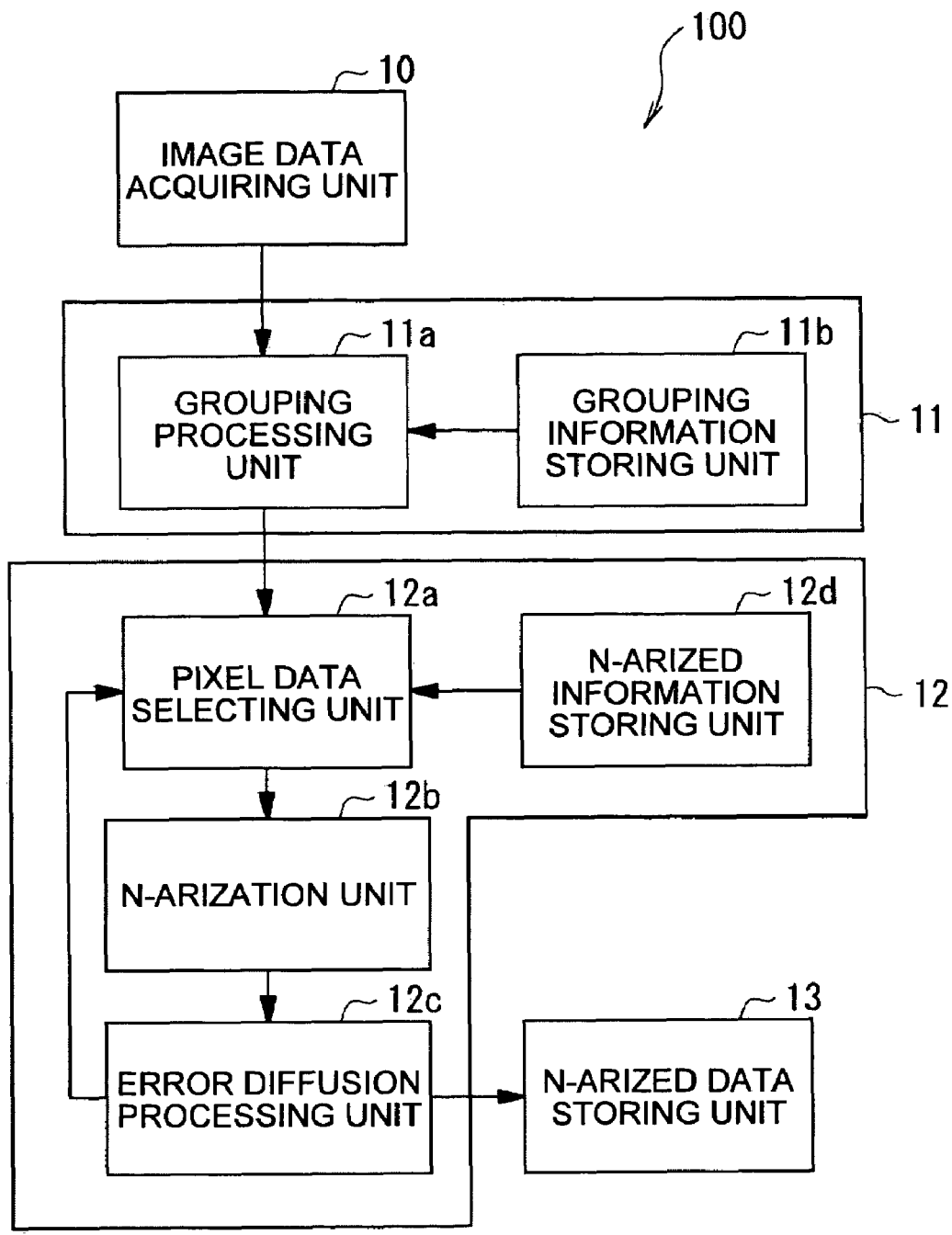
FIG. 1 is a block diagram showing a functional constitution of an image processing apparatus 100 according to an aspect of the invention.

First, a constitution of an image processing apparatus according to an embodiment of the invention will be explained with reference to FIG. 1. FIG. 1 is a block diagram showing a functional constitution of an image processing apparatus 100 according to the embodiment of the invention.

As shown in FIG. 1, the image processing apparatus 100 includes an image data acquiring unit 10 that acquires M-ary ($M \geq 3$) image data from an external apparatus, a storage medium, or the like, a group generating unit 11 that divides the image data acquired from the image data acquiring unit 10 into plural image data areas including a predetermined number of pixel data and sections the plural image data areas into plural groups, an N-arization processing unit 12 that applies N-arization ($M > N \geq 2$) processing to the image data grouped by the group generating unit 11 (hereinafter referred to as grouped image data), and an N-arized data storing unit 13 that stores the data N-arized in the N-arization processing unit 12 (hereinafter referred to as N-arized data).

The image data acquiring unit 10 has, for example, a function of acquiring M-ary image data (in this case, $256 \geq M \geq 3$) in which a gradation (a luminance value) of each of colors (R, G, and B) per one pixel is represented by 8 bits (0 to 255). The image data acquiring unit 10 acquires such image data from an external apparatus via a network such as a LAN or a WAN, acquires the image data from a recording medium such as a CD-ROM or a DVD-ROM via a not-shown driving device such as a CD drive or a DVD drive provided in the own apparatus, or acquires the image data from a storage 70 described later provided in the own apparatus.

The group generating unit 11 includes a grouping processing unit 11a and a grouping information storing unit 11b. The grouping processing unit 11a reads out, for example, grouping information of a system corresponding to instruction information from a user via a connection apparatus such as an external apparatus, an auxiliary input device such as a mouse or a keyboard, or the like or grouping information of a system set in advance in association with a type or the like of image data from the grouping information storing unit 11b. The grouping information storing unit 11b stores information on plural kinds of grouping systems (hereinafter referred as grouping information). The group generating unit 11 divides the image data acquired by the image data acquiring unit 10 into J ($J \geq 2$) image data areas and sections the J image data areas into K ($2 \leq K \leq J$) groups on the basis of the grouping information read out.

The grouping information is information including a dividing method and a sectioning method applied to image data.

The dividing method includes a method of dividing the image data by a unit of a pixel row or by a unit of a pixel column, a method of dividing the image data by a unit of a rectangular pixel formed of a predetermined number of pixels, and a method dividing the image data by a unit of each pixel (i.e., the number of divided pixels is 1).

The sectioning method includes, for example, a method of sectioning image data such that images of respective image data areas forming respective groups cross among the respective groups on an image. Specifically, the sectioning method includes a sectioning method of dividing image data into image data areas by a unit of a pixel row (or a pixel column) and, in sectioning the image data areas into two kinds of groups, sectioning the image data areas such that pixel rows (or pixel columns) of one of the two kinds of groups are alternate to pixel rows (or pixel columns) of the other every one row (or one column) and a sectioning method of dividing image data into image data areas by a unit of one pixel and, in sectioning the image data areas into two kinds of groups, sectioning the image data areas such that pixels of one of the two kinds of groups and pixels of the other form a lattice.

The N-arization processing unit 12 includes an image data selecting unit 12a, an N-arization unit 12b, an error diffusion processing unit 12c, and an N-arization information storing unit 12d.

The pixel data selecting unit 12a reads out, for example, N-arization information corresponding to N-arization instruction information from a user via a connecting apparatus such as an external apparatus, an auxiliary input device such as a mouse or a keyboard, or the like or N-arization information set in advance in association with a system for grouping applied to grouped image data or a type of image data. The pixel data selecting unit 12a selects predetermined pixel data from respective groups of the grouped image data on the basis of a selection method indicated by the N-arization information read out.

The N-arizing unit 12b N-arizes the pixel data selected by the pixel data selecting unit 12a on the basis of threshold values for N-arization indicated by the read-out N-arization information and numerical values after conversion corresponding the respective threshold values.

The N-arization is processing for converting M-ary (M≧3) image data (having M kinds of pixel values (pixel data)) into N-ary (M>N≧2) data (having N kinds of numerical values). For example, when image data is binarized, a pixel value of a conversion source and a threshold value are compared and the pixel value of the conversion source is converted into one of two kinds of numerical values set in advance. For example, the pixel value of the conversion source is converted into a numerical value "1" when the pixel value is equal to or larger than the threshold value and pixel value of the conversion source is converted into a numerical value "0" if the pixel value is smaller than the threshold value. Therefore, in the N-arization, an M-ary pixel value is compared with N kinds of threshold values and is converted into any one of the N kinds of numerical values according to a result of the comparison. For example, when the N value corresponds to the pixel value, the N-arized data becomes image data. When the N value is represented by a numerical value for forming one of dots of N kinds of sizes or a numerical value for not forming a dot for print nozzles (e.g., nozzles of an ink-jet printing apparatus) corresponding to respective colors (when the N value is represented by data that the printing apparatus is capable of interpreting), the N-arized data becomes print data. In this embodiment, a user can select whether one or both of image data and print data are formed.

The error diffusion processing unit 12c performs error diffusion processing for diffusing an N-arization error that has occurred in the N-arization unit 12b to pixel data not subjected to the N-arization yet in a diffusion system (e.g., an error diffusion matrix) indicated by the read-out N-arization information.

The diffusion system defines a direction in which an error of selected pixel data is diffused. In this embodiment, a diffusion system for an error is set for each of the groups such that diffusing directions for an error are different among the respective groups. For example, when image data is sectioned into two groups, if a system for diffusing an error in two directions, "up" and "left", is selected for one group, a system for diffusing an error in directions, "down" and "right", is selected for the other group.

In the error diffusion processing, an error is diffused in the same principle as the error diffusing method in the past. For example, in the case of binarization processing for converting the N-ary image data into "0" if a pixel value is smaller than "128" and converting the N-ary image data into "255" if a pixel value is equal to or larger than "128", when a pixel value of a selected pixel is "101", "101" is converted into "0" and a difference "101" between "0" after the conversion and "101" before the conversion is diffused to plural unprocessed pixels around the pixel as an error in accordance with a predetermined diffusion system. For example, only with usual binary processing, a pixel on the right of the selected pixel (e.g., a pixel value "101") is converted into "0" because the pixel value is less than the threshold value like the selected pixel. However, since the pixel value is increased to "128" with an addition of an error of the selected pixel, for example, "27", the pixel value is larger than the threshold value "127". Consequently, the pixel data is converted into "1".

The N-arization information storing unit 12d stores N-arization information including a processing system for the N-arization processing, a selection method for pixel data for respective groups, a threshold value for the N-arization corresponding to a purpose and a numerical value after conversion corresponding to the threshold value, and a diffusion method for an error that occurs because of the N-arization.

The processing system for the N-arization processing (including the error diffusion processing) includes several processing systems such as a system for performing the N-arization processing in respective groups in parallel, a system for performing the N-arization processing in order for each of groups and pixel by pixel, and a system for performing the N-arization processing group by group in such a manner that, after end of the N-arization processing for all pixels in a previous group, the N-arization processing for the next group is performed.

The processing system for the N-arization processing and the selection method for pixel data form a pair. For example, in the system for performing the N-arization processing in parallel, a method of selecting pixel data from respective groups one by one simultaneously is applied. In the system for performing the N-arization processing in order for each of the groups and pixel by pixel, a method of selecting pixel group in order from the respective groups one by one is applied. In the system for performing the N-arization processing group by group, a method of selecting pixel data in order for the groups pixel by pixel for all the pixels is applied. Moreover, the selection method also includes information on a selection start position and a selecting direction.

The N-arized data storing unit 13 stores N-arized data (image data and print data) generated by the N-arization processing unit 12.

Figure 2:
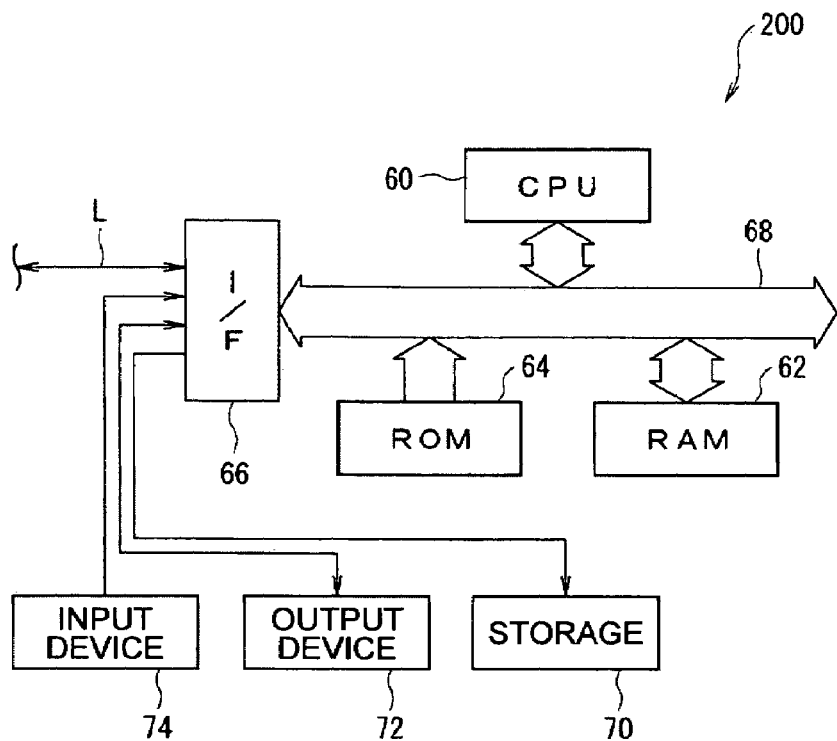
FIG. 2 is a diagram showing a hardware configuration of a computer system.

The image processing apparatus 100 includes a computer system 200 for realizing the functions of the image data acquiring unit 10, the group generating unit 11, the N-arization processing unit 12, the N-arized data storing unit 13, and the like using software and executing software for controlling hardware necessary for realization of the respective functions. As a hardware configuration of the computer system 200, as shown in FIG. 2, a Central Processing Unit (CPU) 60 serving as a central processing unit for performing various kinds of control and arithmetic processing, a Random Access Memory (RAM) 62 forming a main storage, and a Read Only Memory (ROM) 64 serving as a storage dedicated for readout are connected by a bus 68 including a Peripheral Component Interconnect (PCI) bus and an Industrial Standard Architecture (ISA) bus. An external storage (a secondary storage) 70 such as an HDD, an output device 72 such as a CRT or an LCD monitor, an input device 74 such as an operation panel, a mouse, a keyboard, or a scanner, a network cable L for communicating with a not-shown information processing apparatus, and the like are connected to the bus 68 via an input/output interface (I/F) 66.

When a power supply is turned on, a system program such as BIOS stored in the ROM 64 or the like loads various dedicated computer programs stored in the ROM 64 in advance to the RAM 62 or loads various dedicated computer programs installed in the storage 70 to the RAM 62 via a storage medium such as a CD-ROM, a DVD-ROM, or a flexible disk (FD) or via a communication network such as the Internet. The CPU 60 performs predetermined control and arithmetic processing making full use of various resources in accordance with instructions described in the program loaded to the RAM 62 to realize the functions on the software.

The grouping information storing unit 11b, the N-arization information storing unit 12d, and the N-arized data storing unit 13 are constituted to store various data in a predetermined area of the storage 70. The various data are stored in storage areas allocated for each of the storing units in the storage 70, respectively.

The image data acquiring unit 10, the grouping processing unit 11a, the pixel data selecting unit 12a, the N-arization unit 12b, and the error diffusion processing unit 12c are mainly formed of programs. The programs are stored in a storage medium such as the ROM 64 and loaded to the RAM 62. The CPU 60 executes the programs to realize the functions of the respective units.

Figure 3:
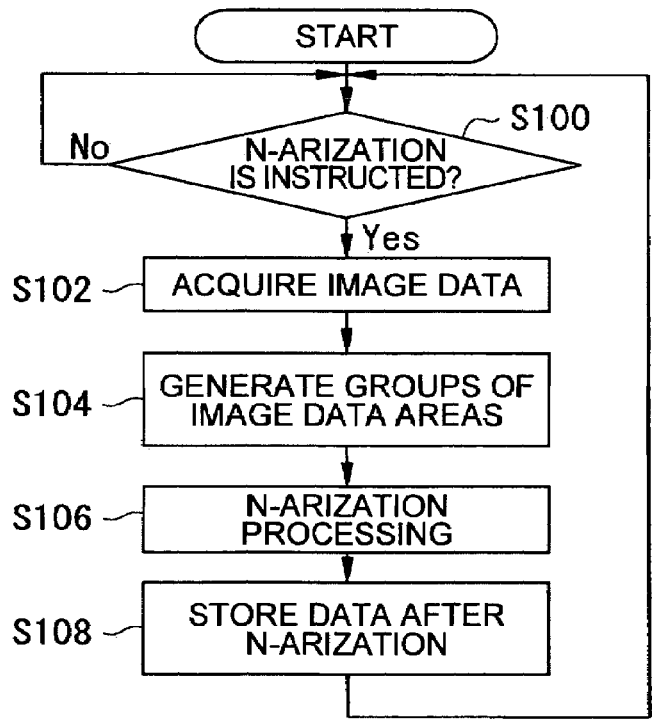
FIG. 3 is a flowchart showing image processing in the image processing apparatus 100.

The image processing apparatus 100 starts a predetermined program stored in a predetermined area of the ROM 64 with the CPU 60 and executes image processing shown in a flowchart in FIG. 3 in accordance with the program.

FIG. 3 is a flowchart showing the image processing in the image processing apparatus 100. When the image processing is executed by the CPU 60, as shown in FIG. 3, first the image processing apparatus 100 shifts to step S100.

In step S100, when N-arization instruction information for image data is sent to the image data acquiring unit 10 from an external apparatus connected via a network cable L or N-arization instruction information is inputted to the image data acquiring unit 10 via the input device 74, the image processing apparatus 100 judges whether an N-arization instruction is received. When it is judged that an N-arization instruction is received (Yes), the process shifts to step S102. When it is judged that an N-arization instruction is not received (No), the image processing apparatus 100 repeats the judgment processing until an N-arization instruction is received.

In this embodiment, the N-arization instruction information includes user setting information concerning generation of N-arized data such as a type of N-arized data to be generated (for an image or for printing), a division system, a grouping system, a value to which data is N-arized, an N-arization processing system, and an error diffusing system. The user setting information may be managed in association with a setting number or the like on the image processing apparatus 100 side. For example, setting number information is included in the N-arization instruction information as user setting information. On the image processing apparatus 100 side, grouping information and N-arization information of contents corresponding to the setting number information are stored in the grouping information storing unit 11b and the N-arization information storing unit 12d in advance in association with numbers, respectively. When N-arization instruction information is acquired, the image processing apparatus 100 reads out grouping information and N-arization information corresponding to setting number information stored in the N-arization instruction information from the storage units, respectively.

When the process shifts to step S102, in the image data acquiring unit 10, the image processing apparatus 100 performs processing for acquiring image data corresponding to the N-arization instruction from the recording medium such as an external apparatus, a CD-ROM, or a DVD-ROM, the storage 70 such as an HDD, or the like as described above. The image processing apparatus 100 judges whether image data is acquired. When it is judged that image data is acquired (Yes), the image processing apparatus 100 transfers the image data acquired to the group generating unit 11 and shifts to step S104. When it is judged that image data is not acquired (No), the image processing apparatus 100 responds to an N-arization instruction source that image processing is impossible and, then, abandons the image processing for the N-arization instruction and shifts to step S100. Image data in this embodiment is data in which plural pixel data area arranged regularly in a matrix shape. Respective kinds of processing will be explained below with this as a premise.

In step S104, in the group generating unit 11, the image processing apparatus 100 divides the image data into J (J≧2) image data areas and sections the J image data areas into K (2≦K<J) groups to generate grouped image data. The image processing apparatus 100 transfers the grouped image data to the N-arization processing unit 12 and the process shifts to step S106.

In step S106, in the N-arization processing unit 12, the image processing apparatus 100 applies the N-arization processing to the grouped image data to generate N-arized data. The image processing apparatus 100 transfers the N-arized data generated to the N-arized data storing unit 13 and the process shifts to step S108.

In step S108, in the N-arized data storing unit 13, the image processing apparatus 100 stores the N-arized data and the process shifts to step S100.

Figure 4:
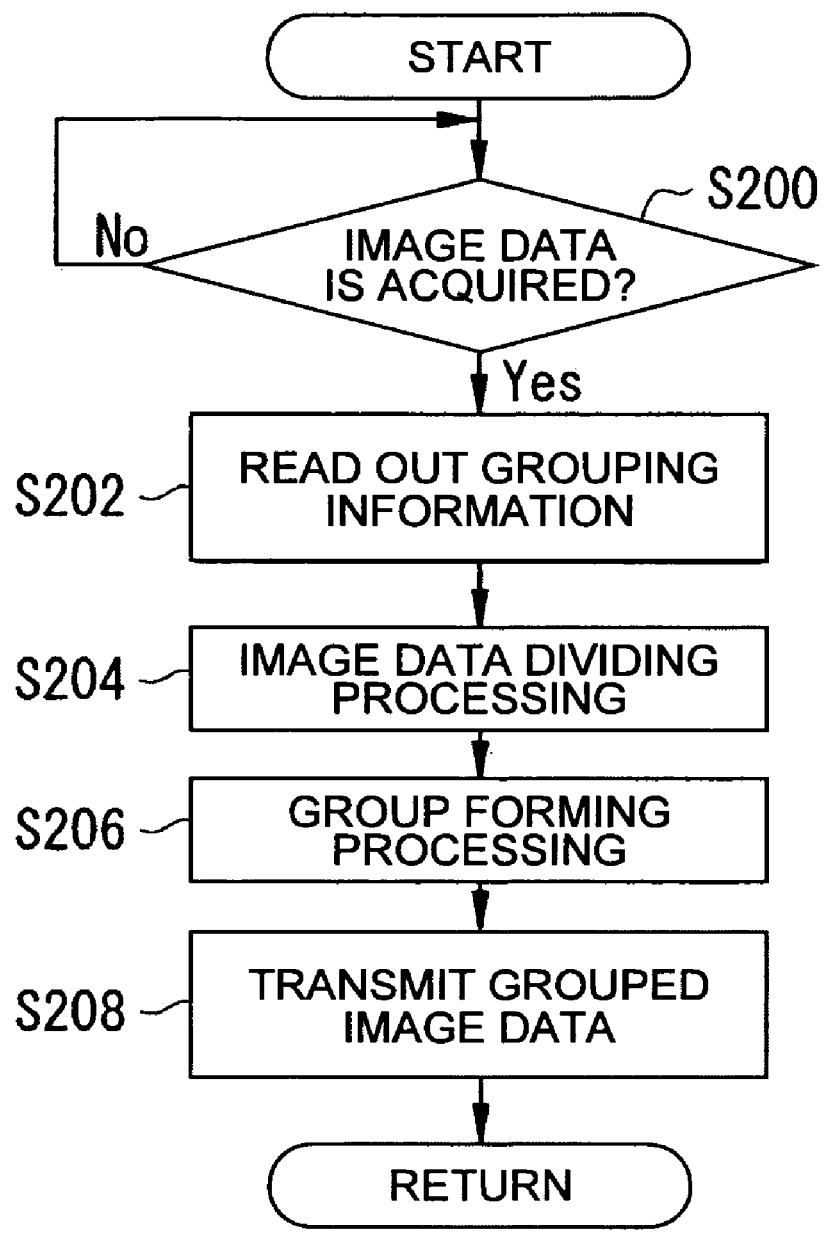
FIG. 4 is a flowchart showing group generation processing in the image processing apparatus 100.

The group generation processing in step S104 will be explained with reference to FIG. 4. FIG. 4 is a flowchart showing the group generation processing in the image processing apparatus 100.

As described above, the group generation processing is processing for dividing M-ary image data acquired from the image data acquiring unit 10 into J (J≧2) image data areas including one or more pixel data and sectioning the J image data areas into K (2≦K<J) groups on the basis of a division system and a grouping system corresponding to N-arization instruction information. When the group generation processing is executed in step S104, as shown in FIG. 4, first, the process shifts to step S200.

In step S200, the image processing apparatus 100 judges whether M-ary image data transmitted from the image data acquiring unit 10 is acquired. When it is judged that the M-ary image data is acquired (Yes), the process shifts to step S202. When it is judged that M-ary image data is not received (No), the image processing apparatus 100 repeats the judgment processing until M-ary image data is acquired.

When the process shifts to step S202, the image processing apparatus 100 reads out grouping information (a division system and a grouping system) from the grouping information storing unit 11b on the basis of the N-arization instruction information and shifts to step S204.

In step S204, the image processing apparatus 100 divides the image data into J image data areas including one or more pixel data on the basis of the division system read out and the process shifts to step S206. In division processing, the image processing apparatus 100 adds attribute information to the respective pixel data such that the pixel data having the same attribute information belong to the same image data area.

In step S206, the image processing apparatus 100 sections the J image data areas generated by the division into K groups on the basis of the grouping system read out to generate grouped image data and the process shifts to step S208. In section processing, as in the division processing, the image processing apparatus 100 adds attribute information to the respective image data areas such that the image data areas having the same attribute information belong to the same group. Image data added with attributes of the image data area and attributes of the group in this way is grouped image data.

In step S208, the image processing apparatus 100 transfers the grouped image data generated to the N-arized data storing unit 13, ends the series of processing, and returns to the original processing.

Figure 5:
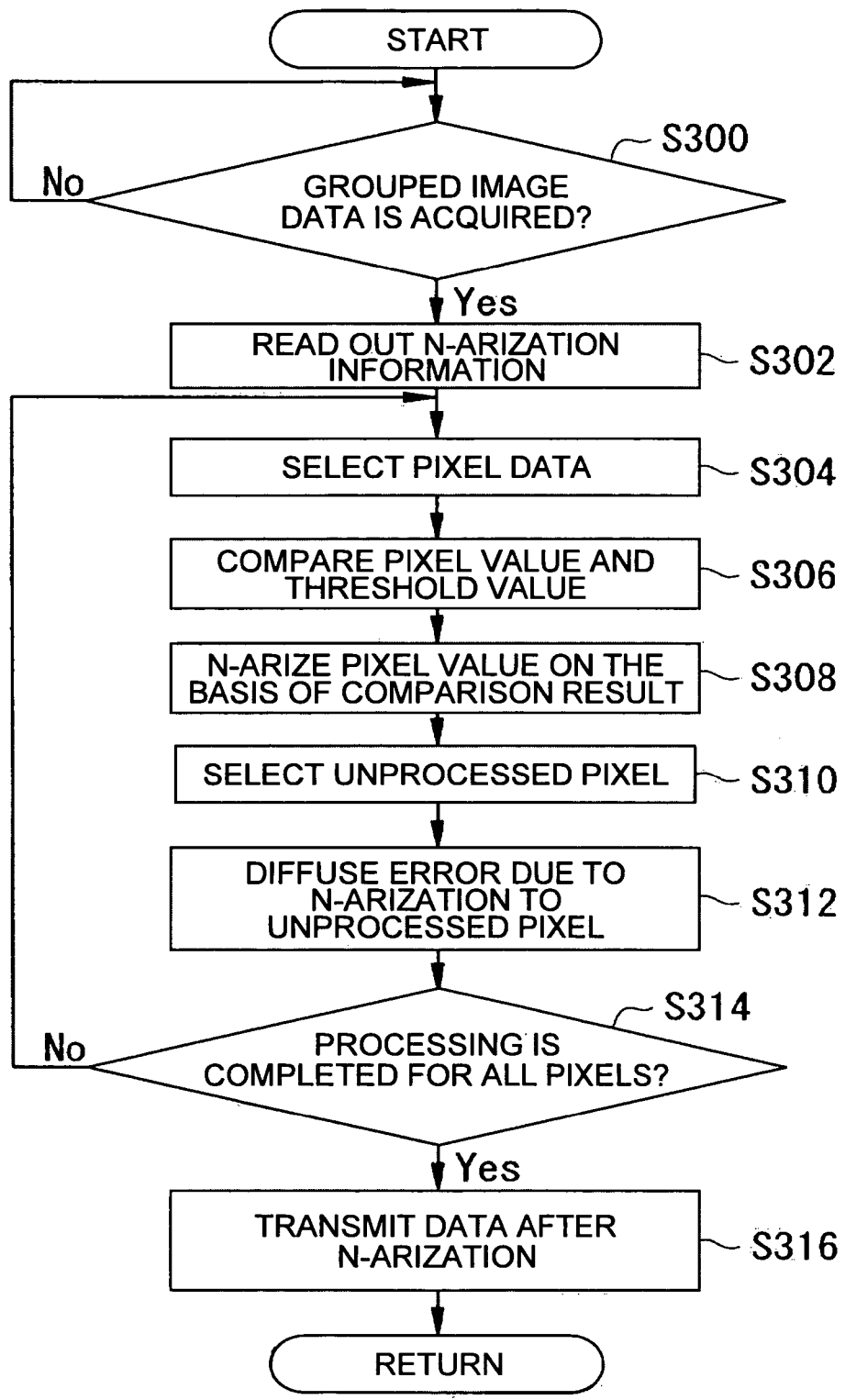
FIG. 5 is a flowchart showing N-arization processing in the image processing apparatus 100.

The N-arization processing in step S106 will be explained in detail with reference to FIG. 5. FIG. 5 is a flowchart showing the N-arization processing in the image processing apparatus 100.

As described above, the N-arization processing is processing for applying the N-arization to grouped image data acquired from the group generating unit 11 on the basis of N-arization information corresponding to N-arization instruction information. When the N-arization processing is executed in step S106, as shown in FIG. 5, first, the process sifts to step S300.

In step S300, the image processing apparatus 100 judges whether groped image data transmitted from the group generating unit 11 is acquired. When it is judged that the grouped image data is acquired (Yes), the process shifts to step S302. When it is judged that the grouped image data is not acquired (No), the image processing apparatus 100 repeats the judgment until the grouped image data is acquired.

When the process shifts to step S302, the image processing apparatus 100 reads out N-arization information (a processing system for the N-arization processing, a selection method for pixel data for respective groups, a threshold value for the N-arization corresponding to a purpose and a numerical value after conversion corresponding to the threshold value, and a diffusion method for an error that occurs because of the N-arization) corresponding to the N-arization instruction information and the process shifts to step S304.

In step S304, the image processing apparatus 100 selects pixel data from the grouped image data on the basis of the selection method read out and the process shifts to step S306.

In step S306, the image processing apparatus 100 compares a pixel value of the pixel data selected in step S304 and the threshold value for the N-arization read out and the process shifts to step S308.

In step S308, the image processing apparatus 100 converts the pixel value of the pixel data selected in step S304 into a numerical value after conversion corresponding to the threshold value on the basis of a result of the comparison in step S306 and the process shifts to step S310.

In step S310, the image processing apparatus 100 selects unprocessed pixel data of a diffusion object from the grouped image data on the basis of the diffusion method for an error read out and the process shifts to step S312.

In step S312, the image processing apparatus 100 calculates an error between a value of the pixel data after conversion in step S308 and a value before conversion and diffuses the error calculated to the unprocessed pixel data selected in step S310 using a predetermined error diffusion matrix on the basis of the diffusion method for an error read out and the process shifts to step S314.

In step S314, the image processing apparatus 100 judges whether the processing has been completed for all the pixel data of the grouped image data. When it is judged that the processing has been completed (Yes), the process shifts to step S316. When it is judged that the processing has not been completed (No), the process shifts to step S304.

When the process shifts to step S316, in the error diffusion processing unit 12c, the image processing apparatus 100 transmits data after the N-arization to the N-arized data storing unit 13, ends the series of processing, and returns to the original processing.

Figure 7:
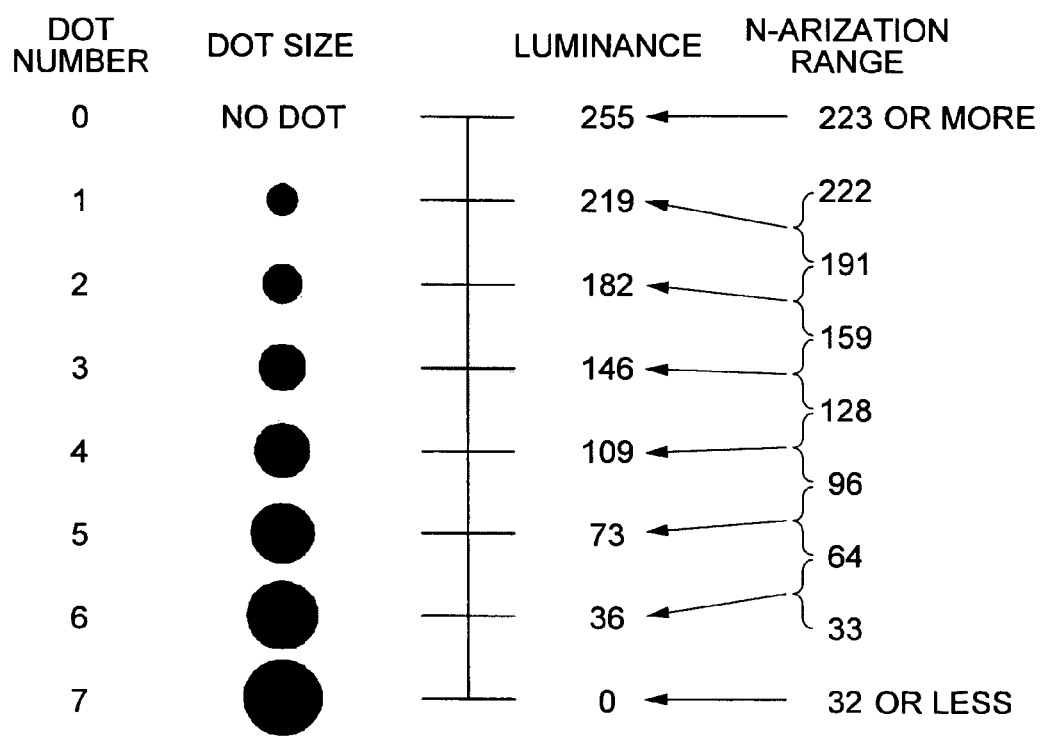
FIG. 7 is a diagram showing an example of information on N values and information on threshold values corresponding to the respective N values in the case in which print data is generated (in the case of a type 1).
Figure 8:
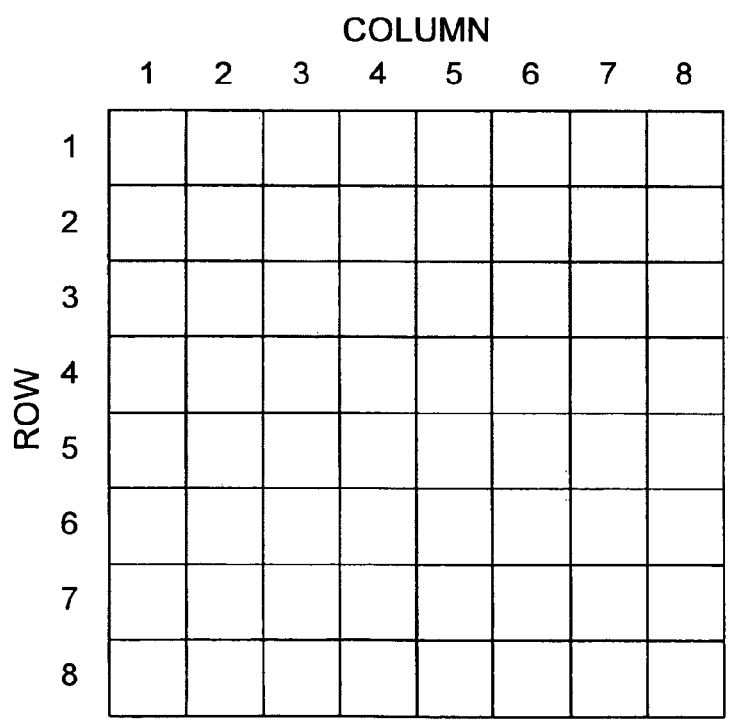
FIG. 8 is a diagram showing an example of a constitution of image data.
Figure 11A:
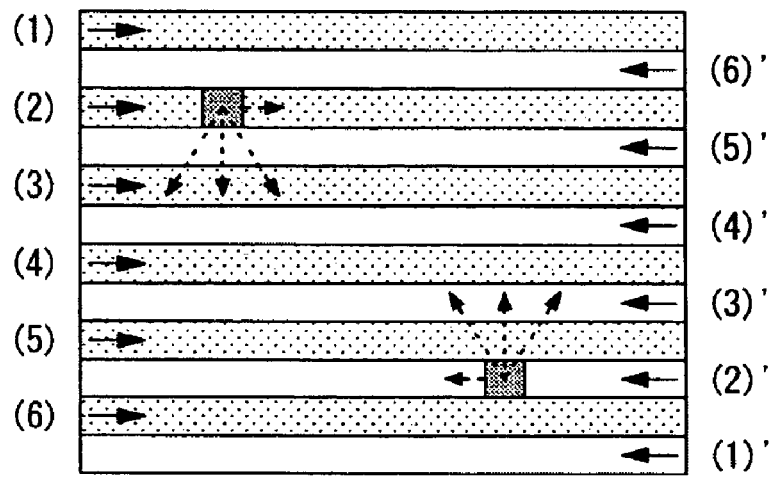
FIGS. 11A and 11B are diagrams showing a processing system for the error diffusion matrix 1 and the error diffusion matrix 2.
Figure 11B:
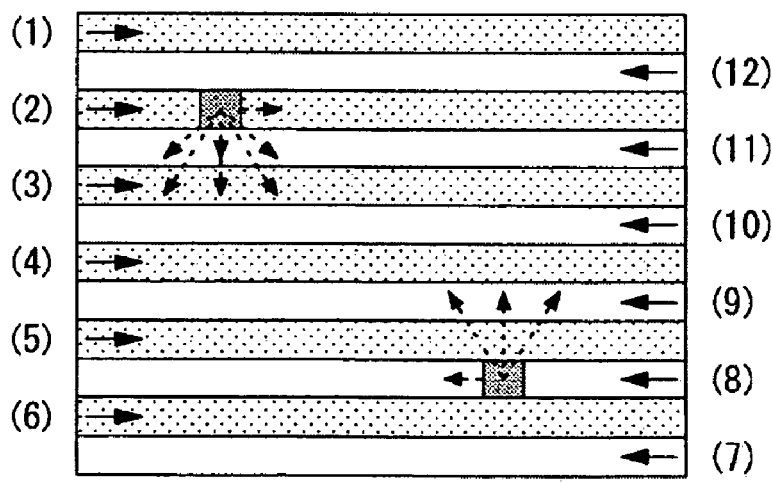
Figure 12:
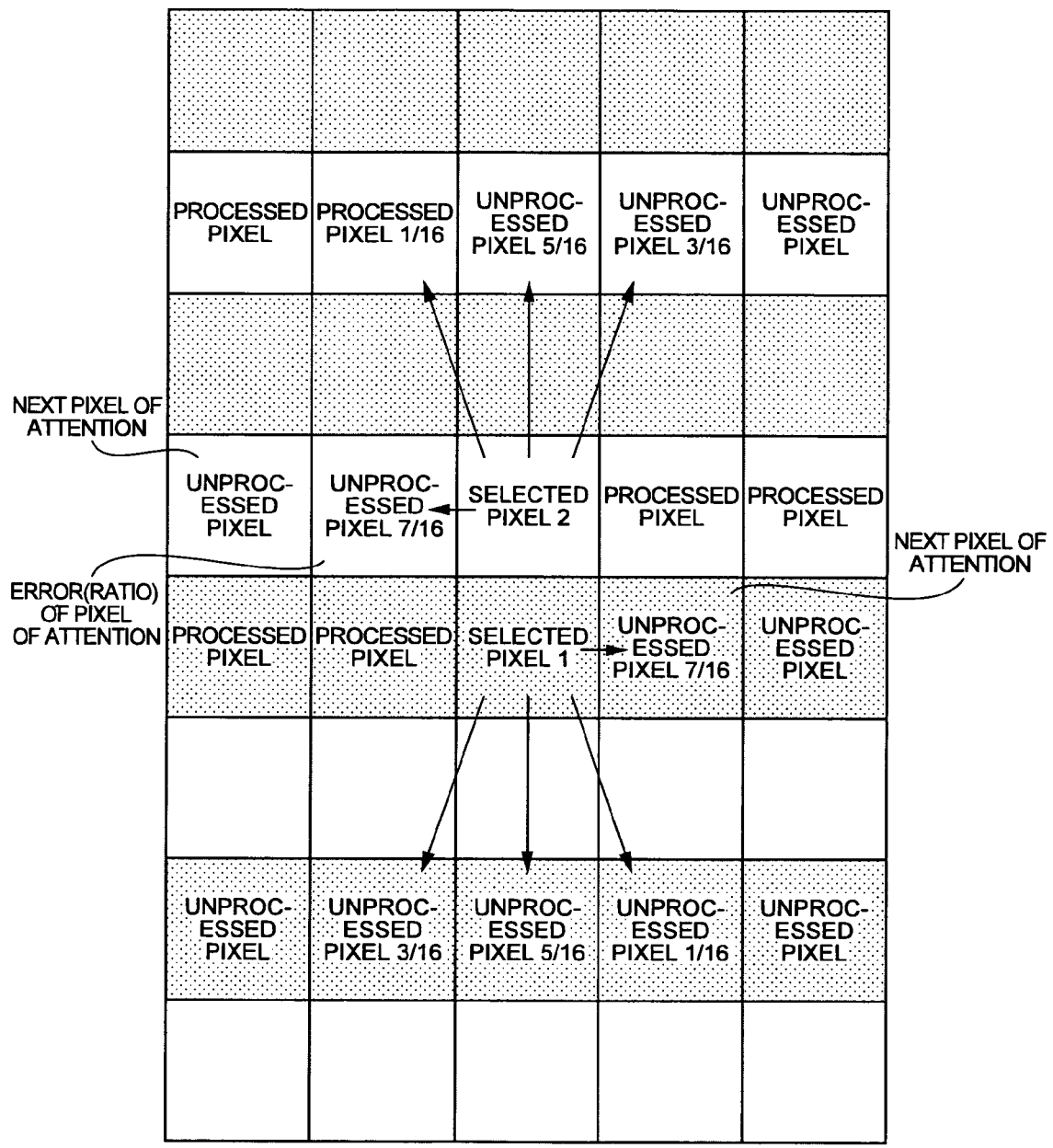
FIG. 12 is a diagram showing error diffusion processing using the error diffusion matrix 1.
Figure 13:
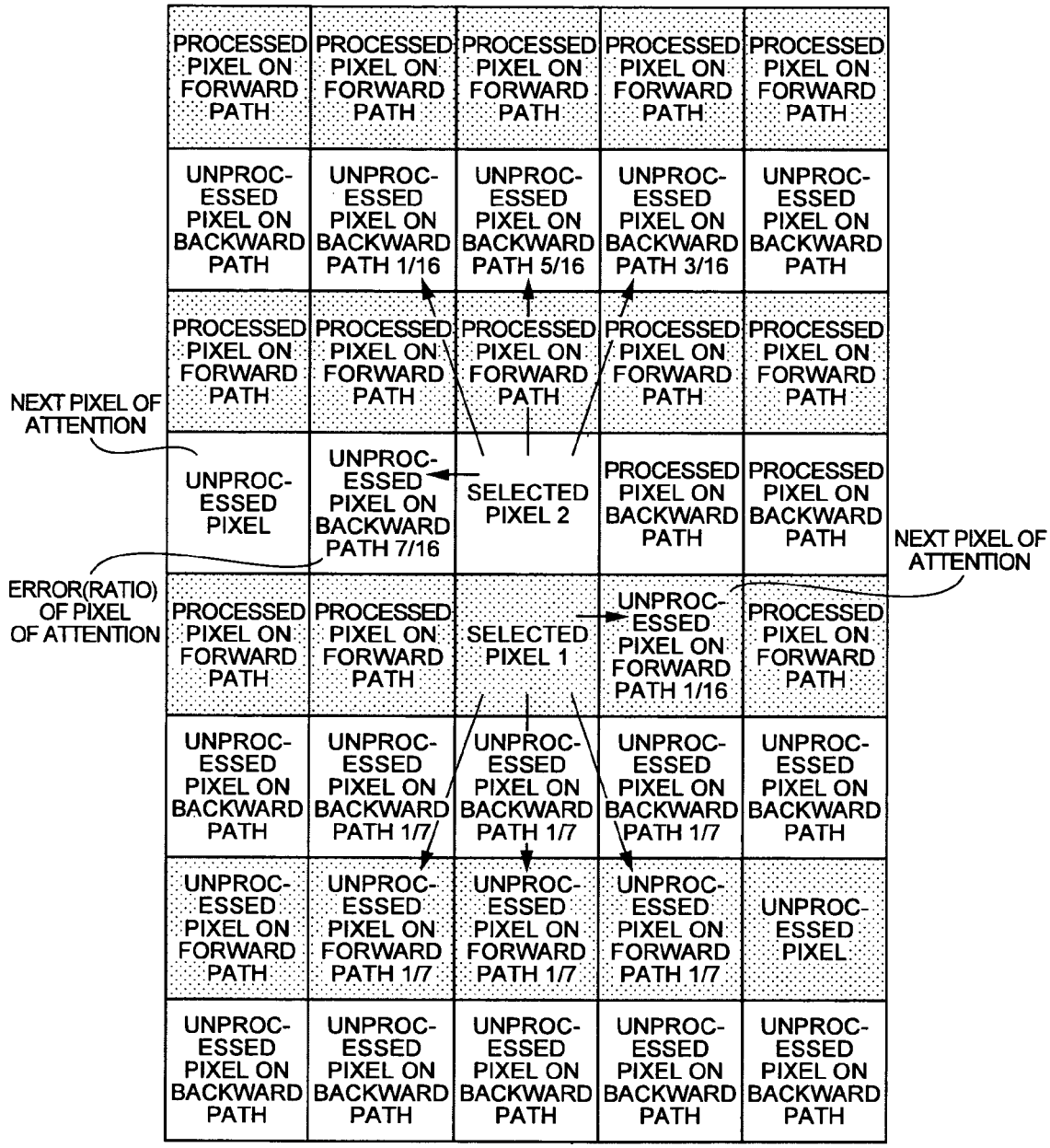
FIG. 13 is a diagram showing error diffusion processing using the error diffusion matrix 2.
Figure 16A:
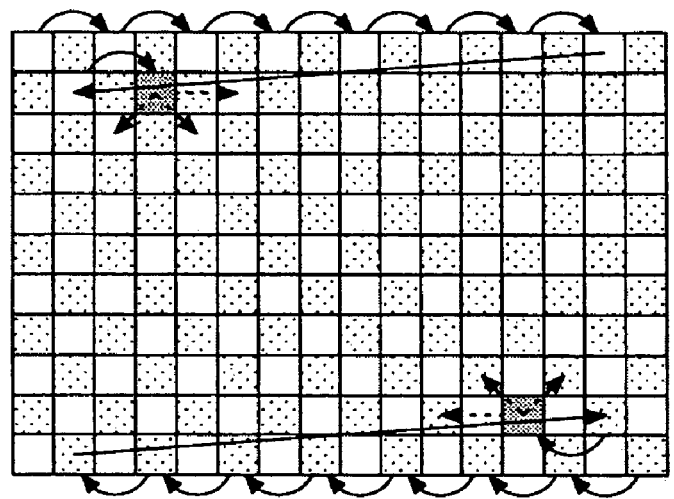
FIGS. 16A and 16B are diagrams showing a processing system for the error diffusion matrix 3 and the error diffusion matrix 4.
Figure 16B:
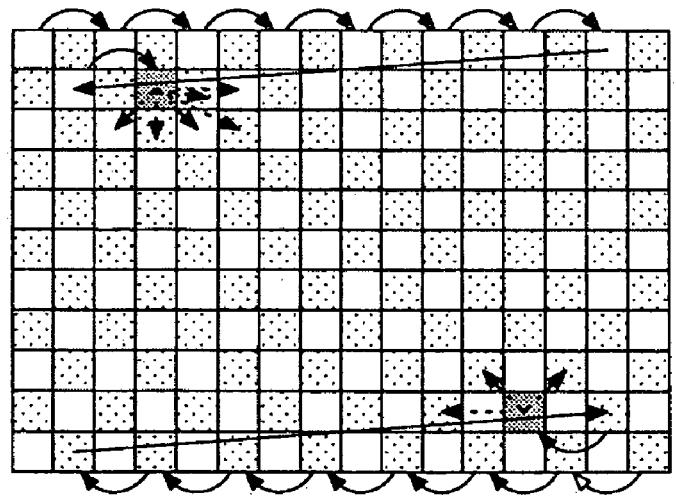
Figure 17:
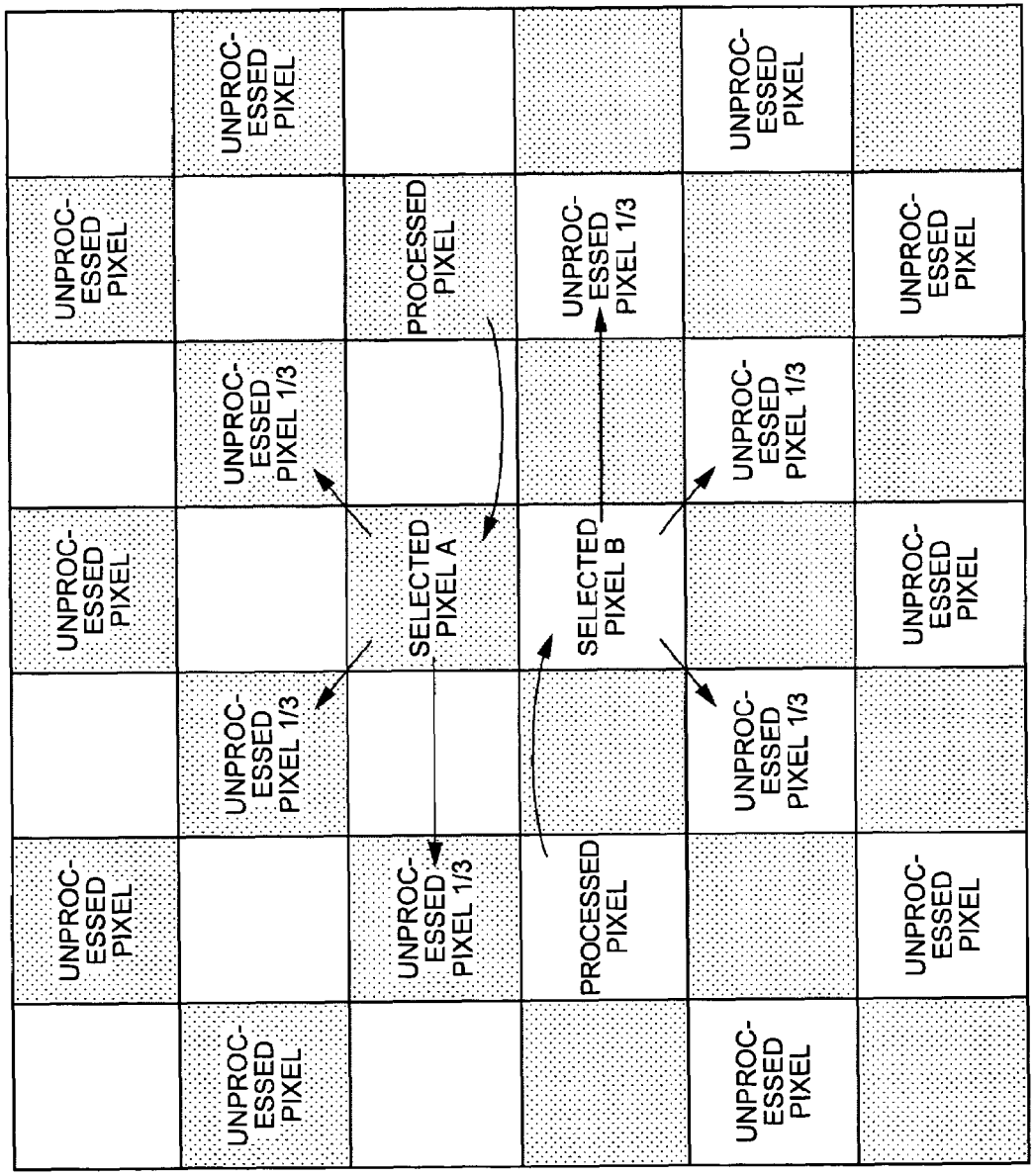
FIG. 17 is a diagram showing error diffusion processing using the error diffusion matrix 3.

Operations in this embodiment will be explained with reference to FIGS. 6 to 18. FIG. 6 is a table showing an example of grouping information and N-arization information corresponding to N-arization instruction information (number information). FIG. 7 is a diagram showing an example of information on N values and information on threshold values corresponding to the respective N values in the case in which print data is generated (in the case of a type 1). FIG. 8 is a diagram showing an example of a constitution of image data. FIGS. 9A and 9B are diagrams showing an example of a selection order for pixel data and an example in which image data areas by a unit of a row are grouped. FIGS. 10A to 10D are diagrams showing an error diffusion matrix 1 and an error diffusion matrix 2. FIGS. 11A and 11B are diagrams showing a processing system for the error diffusion matrix 1 and the error diffusion matrix 2. FIG. 12 is a diagram showing error diffusion processing using the error diffusion matrix 1. FIG. 13 is a diagram showing error diffusion processing using the error diffusion matrix 2. FIGS. 14A and 14B are diagrams showing an example of a selection order for pixel data and an example in which image data areas by a unit of one pixel are grouped. FIGS. 15A to 15D are diagrams showing an error diffusion matrix 3 and an error diffusion matrix 4. FIGS. 16A and 16B are diagrams showing a processing system for the error diffusion matrix 3and the error diffusion matrix 4. FIG. 17 is a diagram showing error diffusion processing using the error diffusion matrix 3. FIG. 18 is a diagram showing error diffusion processing using the error diffusion matrix 4.

First, the image processing apparatus 100 acquires N-arization instruction information of a user from an external apparatus or the like (step S100). The image processing apparatus 100 acquires M-ary image data corresponding to the N-arization instruction information from an external apparatus or the like that is a transmission source of the N-arization instruction information, transfers the image data acquired to the group generating unit 11 (step S102), and shifts to group generation processing (step S104) The M-ary image data in this embodiment is assumed to be image data formed of pixel data having a luminance value in a range of 0 to 255.

In this embodiment, the setting number information described above is included in the N-arization instruction information. As shown in FIG. 6, four setting numbers "10", "11", "20", and "21" and sets of four kinds of grouping information and N-arization information set in advance corresponding to each other.

The group generation processing and the N-arization processing in the image processing apparatus 100 will be hereinafter explained on the basis of the four setting numbers "10", "11", "20", and "21" and the grouping information and the N-arization information corresponding to the setting numbers shown in FIG. 6.

Note that, in this embodiment, an example in which generation of print data is performed as N-arized data will be explained. Therefore, in this embodiment, as shown in FIG. 6, a type of an N value, a threshold value, and a conversion value corresponding to the threshold value is "type 1" commonly for all the four setting numbers. As shown in FIG. 7, the "type 1" is a type for generating print data corresponding to a printing apparatus that can form eight kinds of dot sizes including no-dot on a print medium. Eight kinds of ranges are set for a luminance value (0 to 255) of pixel data. Eight kinds of dot sizes with dot numbers 0 to 7 corresponding to the ranges, respectively, are set.

First, image processing corresponding to the setting number 10 will be explained.

In the group generating unit 11, the image processing apparatus 100 acquires image data from the image data acquiring unit 10 (step S200). First, in the grouping processing unit 11a, the image processing apparatus 100 reads out grouping information corresponding to the setting number "10" included in the N-arization instruction information from the grouping information storing unit 11b (step S202). As described above, the grouping information includes two kinds of information, a division system and a grouping system. As shown in FIG. 6, a division system corresponding to the setting number "10" is "row unit" and a grouping system corresponding to the setting number "10" is "cross 1 (grouping into two)". The cross 1 is a grouping system at the time when image data is divided by a unit of a row. Image data areas by a unit of a row are grouped such that image data areas cross one another between the respective groups. The grouping into two indicates that image data areas are sectioned into two groups.

In the M-ary image data acquired from the image data acquiring unit 10, as shown in FIG. 8, plural pixel data are arranged in a matrix shape. A division system corresponding to the setting number "10" is "row unit" and a grouping system corresponding to the setting number "10" is "cross 1" and grouping into two. Therefore, the image processing apparatus 100 divides the image data into image data areas by a unit of a row (step S204) and sections the image data areas into two groups such that respective areas cross one another between the groups (step S206). In other words, when the image data has the constitution shown in FIG. 8, as shown in FIG. 9A, the image data is divided into eight image data areas (J=8) by a unit of a row, each row of which is formed of eight pixel data. The eight image data areas are sectioned into two groups (K=2) of gray (shaded) and white (plain) to generate grouped image data as shown in the figure. As it is seen from FIG. 9A, an image data area of gray (hereinafter referred to as group 1) and an image data area of white (hereinafter referred to as group 2) are arranged alternately to each other (in a crossed state).

When the grouped image data is formed in this way, in the group generating unit 11, the image processing apparatus 100 transmits the grouped image data generated to the N-arization processing unit 12 (step S208) and the process shifts to the N-arization processing (step S106).

In the N-arization processing unit 12, the image processing apparatus 100 acquires the grouped image data from the group generating unit 11 (step S300). First, in the pixel data selecting unit 12a, the image processing apparatus 100 reads out N-arization information corresponding to the setting number "10" included in the N-arization instruction information from the N-arization data storing unit 13 (step S302). As described above, the N-arization information includes information on a processing system for the N-arization processing, a selection method for pixel data for respective groups, a threshold value for the N-arization corresponding to a purpose (in this embodiment, generation of print data) and a numerical value after conversion corresponding to the threshold value, and a diffusion method for an error that occurs because of the N-arization. Since the setting number is "10", as shown in FIG. 6, the processing system for the N-arization is a parallel system and the selection method is a system for selecting pixel data one by one from two groups simultaneously.

The threshold value for N-arization corresponding to a purpose and the numerical value after conversion corresponding to the threshold value are the "type 1" for print data generation. The error diffusing method is diffusion processing using the error diffusion matrix 1.

For the group 1 (gray), a matrix shown in FIG. 10A corresponds to the error diffusion matrix 1. For the group 2 (white), a matrix shown in FIG. 10B corresponds to the error diffusion matrix 1.

As shown in FIG. 10A, an error that occurs in the pixel data in the group 1 is diffused to unprocessed pixel data on the right of selected pixel data at a ratio of 7/16. The error is diffused to three pixel data on the left obliquely below, right below, and on the right obliquely below the selected pixel in the group 1 across one image data area in the group 2 downward at ratios of 3/16, 5/16, and 1/16, respectively.

As shown in FIG. 10B, an error that occurs in the pixel data in the group 2 is diffused to unprocessed pixel data on the left of selected pixel data at a ratio of 7/16. The error is diffused to three pixel data on the left obliquely above, right above, and on the right obliquely above the selected pixel in the group 2 across one image data area in the group 1 upward at ratio of 1/16, 5/16, and 3/16, respectively.

In this embodiment, for the group 1, a selection start position for pixel data is pixel data at the top on the left of the image. For the group 2, a selection start position for pixel data is pixel data at the bottom on the right of the image data. As a progress direction of the N-arization and a diffusing direction of an error, as shown in FIG. 11A, for the group 1, respective rows are N-arized in order pixel by pixel from the left to the right. An error of the pixel data is diffused to unprocessed pixel data in four directions, on the right of the selected pixel data and on the left below, below, and on the right below across one image data area in the group 2 downward, in accordance with the error diffusion matrix 1 shown in FIG. 10A. On the other hand, for the group 2, respective rows are N-arized in order pixel by pixel from the right to the left. An error of the pixel data is diffused to unprocessed pixel data in four directions, on the left of the selected pixel data and on the left above, right above, and on the right above across one image data area in the group 1 upward, in accordance with the error diffusion matrix 2 shown in FIG. 10B. In other words, in the error diffusion matrix 1 shown in FIGS. 10A and 10B, diffusing directions of an error are set to be opposite to each other. As shown in FIG. 11A, as indicated by a processing order for the respective image data areas in the group 1 set as (1) to (6) and a processing order for the respective image data areas in the group 2 set as (1') to (6'), the N-arization and the error diffusion processing for the groups 1 and 2 are performed in parallel simultaneously. Numerical values in boxes corresponding to respective pixels shown in FIG. 9A are numbers indicating a selection order by a unit of pixel data. Numbers 1 to 32 correspond to the group 1 and numbers 1' to 32' correspond to the group 2. In other words, pixel data of the same numerical values such as the numbers 1 and 1', the numbers 2 and 2', and the numbers 32 and 32' are selected in an order of the numbers in the group 1 and the group 2 simultaneously.

Therefore, in the pixel data selecting unit 12a, the image processing apparatus 100 selects the pixel data in the group 1 and the group 2 simultaneously (step S304). In the N-arization unit 12b, the image processing apparatus 100 performs the N-arization of a selected pixel on the basis of the threshold value for the N-arization set as the "type 1" shown in FIG. 7 (steps S306 and S308).

The N-arization is performed for the respective dot sizes shown in FIG. 7 (identified by a dot number N (0 to 7)), by comparing a luminance value of the selected pixel data and threshold values of luminance values (a range of luminance values in this embodiment) corresponding to the respective dot sizes (step S306) and allocating dot numbers in the luminance range corresponding to the luminance values of the selected pixel data (step S308). Therefore, N values in this embodiment are eight values of the dot numbers 0 to 7.

As a relation between the respective dot numbers and the luminance values after conversion, as shown in FIG. 7, the dot numbers 0, 1, 2, 3, 4, 5, 6, and 7 correspond to "255", "219", "182", "146", "109", "73", "36", and "0", respectively. The threshold values (the range of luminance values) for allocating any one of the dot numbers 0 to 7 to a luminance value of the selected pixel data, as shown in FIG. 7, the dot numbers 0, 1, 2, 3, 4, 5, 6, and 7 correspond to "223 or more", "191 to 222", "159 to 190", "128 to 158", "96 to 127", "64 to 95", "32 to 63", and "32 or less", respectively.

In this embodiment, for example, when the dot number 5 is allocated to a luminance value of the selected pixel data, a luminance value of pixel data is converted to "73" and a value after N-arization of the selected pixel data is "5" that is the dot number. If the image data is ordinary image data, a luminance value corresponding to a threshold value directly becomes a value after the N-arization. However, since data generated by N-arizing image data is print data, a dot number corresponding to a conversion value for the conversion (i.e., information that the print processing unit of the printing apparatus is capable of interpreting) becomes a value after the N-arization (note that, when a dot is not formed, a value after the N-arization is the dot number "0").

Note that, in this embodiment, first, a luminance value of the selected pixel data and an intermediate value "128" of the threshold values are compared. When the value of the selected pixel data is larger than the intermediate value, only comparison with the threshold values corresponding to the dot numbers 0 to 3 is performed. On the other hand, when the value of the selected pixel data is smaller than the intermediate value, only comparison with the threshold values corresponding to the dot numbers 4 to 7 is performed. Consequently, the number of times of processing is reduced.

When the N-arization for the selected pixel data is performed in this way, in the error diffusion processing unit 12c, the image processing apparatus 100 selects pixel data not subjected to the N-arization, which is a diffusion destination of an error, in accordance with the error diffusion matrix 1 (step S310). The image processing apparatus 100 calculates a difference between a luminance value before conversion of the N-arized selected pixel data and a luminance value corresponding to a dot number after conversion as an error and diffuses the error calculated to the pixel data selected as the error diffusion destination at a ratio set by the error diffusion matrix 1 (step S308).

For example, when a luminance value of the selected pixel data is assumed to be "120", since the dot number 4 corresponds to the luminance value judging from the threshold value, the luminance value "120" is converted to "109" according to the N-arization. Therefore, a difference "11" obtained by subtracting "109" from "120" is calculated as an error. This error is diffused to the selected unprocessed pixel data at the ratio set by the error diffusion matrix 1. A value of the error after the N-arization of the selected pixel data at a diffusion source is "4", which is the dot number.

When the error diffusion processing is performed in accordance with the error diffusion matrix 1 in this way, as shown in FIG. 12, in a diffusing direction of an error of a selected pixel 1 in the group 1 in the figure and a diffusing direction of an error of a selected pixel 2 in the group 2 in the figure, locally, the errors are diffused to unprocessed pixels in almost all directions around the selected pixels, although the selected pixels are shifted by one row. Consequently, a diffusion property of errors is improved and it is possible to improve image quality after the N-arization processing compared with the techniques in the past in which an error is diffused substantially in one direction.

The M-ary image data acquired by the image data acquiring unit 10 is N-arized and print data is generated by applying the N-arization and the error diffusion processing to all the pixels in the groups 1 and 2. In the error diffusion processing unit 12c, the image processing apparatus 100 transmits the print data generated to the N-arized data storing unit 13 (step S316) and stores the print data in the N-arized data storing unit 13 (step S108).

Image processing corresponding to the setting number "11" will be explained. Since processing in the image data acquiring unit 10 and the group generating unit 11 is the same as the processing for the setting number "10", an explanation of the processing is omitted.

First, processing of the N-arization processing unit 12 will be hereinafter explained.

In the N-arization processing unit 12, the image processing apparatus 100 acquires grouped image data from the group generating unit 11 (step S300). First, in the pixel data selecting unit 12a, the image processing apparatus 100 reads out N-arization information corresponding to the setting number "11" included in N-arization instruction information from the N-arization data storing unit 13 (step S302). Since the setting number is "11", as shown in FIG. 6, the processing system for the N-arization is a special 1 system and the selection method is a system for selecting pixel data one by one from one of two groups and, when all pixel data in the group have been selected, pixel data in the next group are selected in order one by one.

The threshold value for N-arization corresponding to a purpose and the numerical value after conversion corresponding to the threshold value are the "type 1" for print data generation. The error diffusing method is diffusion processing using the error diffusion matrix 2.

For the group 1 (gray), a matrix shown in FIG. 10C corresponds to the error diffusion matrix 2. For the group 2 (white), a matrix shown in FIG. 10D corresponds to the error diffusion matrix 2.

As shown in FIG. 10C, an error that occurs in the pixel data in the group 1 is diffused to unprocessed pixel data on the right of selected pixel data at a ratio of 1/7. The error is diffused to three pixel data on the left obliquely below, right below, and on the right obliquely below a selected pixel in an image data area in the group 2 below an image data area of selected pixel data at a ratio of 1/7, respectively. The error is diffused to three pixel data on the left obliquely below, right below, and on the right obliquely below a selected pixel in the group 1 across one image data area in the group 2 downward at a ratio of 1/7, respectively.

As shown in FIG. 10C, an error that occurs in the pixel data in the group 2 is diffused to unprocessed pixel data on the left of selected pixel data at a ratio of 7/16. The error is diffused to three unprocessed pixel data on the left obliquely above, right above, and on the right obliquely above a selected pixel in the group 2 across one image data area in the group 1 upward at ratios of 1/16, 5/16, and 3/16, respectively.

As a progress direction of the N-arization and a diffusing direction of an error, as shown in FIG. 11B, for the group 1, respective rows are N-arized in order pixel by pixel from the left to the right. An error of the pixel data is diffused to seven unprocessed pixel data, on the right of the selected pixel data, on the left obliquely below, right blow, and on the right obliquely below a selected pixel in the image data area in the group 2 below the image data area of the selected pixel data, and on the left below, right below, and on the right below a selected pixel in the group 1 across one image data area downward in the group 2. On the other hand, for the group 2, after the N-arization and the error diffusion processing ends for all the pixels in the group 1, respective rows are N-arized in order pixel by pixel from the right to the left. An error of the pixel data is diffused to unprocessed pixel data in four directions, on the left of the selected pixel data and on the left above, right above, and on the right above across one image data area in the group 1 upward, in accordance with the error diffusion matrix 2 shown in FIG. 10D. In other words, in the error diffusion matrix 2 shown in FIGS. 10C and 10D, diffusing directions of an error are set to be opposite to each other. In addition, an error from the group 1 is set to be diffused to unprocessed pixels in the group 2. Therefore, as shown in FIG. 11B, as indicated by a processing order for the respective image data areas in the group 1 set as (1) to (6) and a processing order for the respective image data areas in the group 2 set as (7) to (12), the N-arization and the error diffusion processing for the group 2 are performed after the N-arization and the error diffusion processing for the group 1 ends. Numerical values in boxes corresponding to respective pixels shown in FIG. 9B are numbers indicating a selection order by a unit of pixel data. Numbers 1 to 32 correspond to the group 1 and numbers 33 to 64 correspond to the group 2. In other words, pixel data of the numbers 1 to 32 of the group 1 are selected in an order of the numbers and, then, pixel data of the numbers 33 to 64 of the group 2 are selected in an order of the numbers.

Therefore, in the pixel data selecting unit 12a, first, the image processing apparatus 100 selects the pixel data in the group 1 (step S304). In the N-arization unit 12b, the image processing apparatus 100 performs the N-arization of a selected pixel on the basis of the threshold value for the N-arization set as the "type 1" shown in FIG. 7 (steps S306 and S308).

When the N-arization for the selected pixel data is performed in this way, in the error diffusion processing unit 12c, the image processing apparatus 100 selects pixel data not subjected to the N-arization, which is a diffusion destination of an error, in accordance with the error diffusion matrix 2 (step S310). The image processing apparatus 100 calculates a difference between a luminance value before conversion of the N-arized selected pixel data and a luminance value corresponding to a dot number after conversion as an error and diffuses the error calculated to the pixel data selected as the error diffusion destination at a ratio set by the error diffusion matrix 2 (step S308). Since the N-arization is the same processing as that in the setting number "10", a detailed explanation of the N-arization is omitted.

When the N-arization and the error diffusion processing end for all the pixels in the group 1, pixel data in the group 2 is selected. In the N-arization unit 12b, the N-arization and the error diffusion processing for a selected pixel is performed as described above.

When the error diffusion processing is performed in accordance with the error diffusion matrix 2 in this way, as shown in FIG. 13, in a diffusing direction of an error of a selected pixel 1 in the group 1 in the figure and a diffusing direction of an error of a selected pixel 2 in the group 2 in the figure, locally, the errors are diffused to unprocessed pixels in almost all directions around the selected pixels, although the selected pixels are shifted by one row. In addition, the error of the selected pixel in the group 1 is also diffused to pixel data in the group 2 right below the selected pixel. Thus, a diffusion property of errors is further increased. Consequently, it is possible to improve a diffusion property of errors compared with the processing in the setting value "10". Thus, it is possible to further improve an image quality after the N-arization processing.

Note that, in FIG. 13, the N-arization and the error diffusion processing for the group 1 moves from an upper row to a lower row by a unit of a row and the N-arization and the error diffusion processing for the group 2 moves from a lower row to an upper row by a unit of a row. Thus, the group 1 is set as a forward path and the group 2 is set as a backward path.

The M-ary image data acquired by the image data acquiring unit 10 is N-arized and print data is generated by applying the N-arization and the error diffusion processing to all the pixels in the groups 1 and 2. In the error diffusion processing unit 12c, the image processing apparatus 100 transmits the print data generated to the N-arized data storing unit 13 (step S316) and stores the print data in the N-arized data storing unit 13 (step S108).

Image processing corresponding to the setting number "20" will be explained.

In the group generating unit 11, the image processing apparatus 100 acquires image data from the image data acquiring unit 10 (step S200). First, in the grouping processing unit 11a, the image processing apparatus 100 reads out grouping information corresponding to the setting number "20" included in the N-arization instruction information from the grouping information storing unit 11b (step S202). As shown in FIG. 6, a division system corresponding to the setting number "20" is "one pixel unit" and a grouping system corresponding to the setting number "20" is "cross 2 (grouping into two)". The cross 2 is a grouping system at the time when image data is divided by a unit of one pixel. Image data areas by a unit of one pixel are grouped such that image data areas cross one another between the respective groups.

A division system corresponding to the setting number "20" is "one pixel unit" and a grouping system corresponding to the setting number "20" is "cross 2" and grouping into two. Therefore, as shown in FIG. 14A, the image processing apparatus 100 divides the image data shown in FIG. 8 into image data areas by a unit of one pixel (step S204) and sections the image data areas into two groups such that respective areas cross one another between the groups (step S206). In other words, as shown in FIG. 14A, the respective pixel data (image data areas) in the respective groups are sectioned into two groups of gray (shaded) and white (plain) to generate grouped image data. As it is seen from FIG. 14A, an image data area of gray (hereinafter referred to as group A) and an image data area of white (hereinafter referred to as group B) are in a state in which a lattice is formed (in a crossed state).

When the grouped image data is formed in this way, in the group generating unit 11, the image processing apparatus 100 transmits the grouped image data generated to the N-arization processing unit 12 (step S208) and shifts to the N-arization processing (step S106).

In the N-arization processing unit 12, the image processing apparatus 100 acquires the grouped image data from the group generating unit 11 (step S300). First, in the pixel data selecting unit 12a, the image processing apparatus 100 reads out N-arization information corresponding to the setting number "20" included in the N-arization instruction information from the N-arization data storing unit 13 (step S302). Since the setting number is "20", as shown in FIG. 6, the processing system for the N-arization is a parallel system and the selection method is a system for selecting pixel data one by one from two groups simultaneously. Numerical values in boxes corresponding to respective pixels shown in FIG. 14A are numbers indicating a selection order by a unit of pixel data. Numbers 1 to 32 correspond to the group A and numbers 1' to 32' correspond to the group B. In other words, pixel data of the same numerical values such as the numbers 1 and 1', the numbers 2 and 2', and the numbers 32 and 32' are selected in an order of the numbers in the group 1 and the group 2 simultaneously.

The threshold value for N-arization and the numerical value after conversion corresponding to the threshold value are the "type 1" for print data generation. The error diffusing method is diffusion processing using the error diffusion matrix 3.

For the group A (gray), a matrix shown in FIG. 15A corresponds to the error diffusion matrix 3. For the group B (white), a matrix shown in FIG. 15B corresponds to the error diffusion matrix 3.

As shown in FIG. 15A, an error that occurs in the pixel data in the group A is diffused to unprocessed pixel data in a place one pixel data ahead of selected pixel data in the group B on the right ahead of the selected pixel data at a ratio of 1/3. The error is diffused to two unprocessed pixel data on the left obliquely below and on the right obliquely below the selected pixel at a ratio of 1/3, respectively.

As shown in FIG. 15B, an error that occurs in the pixel data in the group B is diffused to unprocessed pixel data in a place one pixel data ahead of selected data in the group A on the left of the selected pixel data at a ratio of 1/3. The error is diffused to two unprocessed pixel data on the left obliquely above and on the right obliquely above the selected pixel in the group 2 at a ratio of 1/3, respectively.

As a progress direction of the N-arization and a diffusing direction of an error, as shown in FIG. 16A, for the group A, respective pixels are N-arized in order pixel by pixel from the left to the right for each row of the group A while pixels in the group B are skipped. An error of the pixel data is diffused to three unprocessed pixel data, that is, unprocessed pixel data in a place one pixel data ahead of the selected pixel data in the group B on the right of the selected pixel data and unprocessed pixel data on the left obliquely below and on the right obliquely below the selected pixel data, in accordance with the error diffusion matrix 3 shown in FIG. 15A. On the other hand, for the group B, respective pixels are N-arized in order pixel by pixel from the right to the left for each row of the group B while pixels in the group A are skipped. An error of the pixel data is diffused to three unprocessed pixel data, that is, unprocessed pixel data in a place one pixel data ahead of the selected pixel data in the group A on the left of the selected pixel data and unprocessed pixel data on the left obliquely above and on the right obliquely above the selected pixel data, in accordance with the error diffusion matrix 3 shown in FIG. 15B.

In the error diffusion matrix 3 shown in FIGS. 15A and 15B, diffusing directions of an error are set to be opposite to each other.

In the groups A and B, since an error is diffused to only pixel data in the own groups, the N-arization and the error diffusion processing are performed in parallel simultaneously.

Therefore, in the pixel data selecting unit 12a, the image processing apparatus 100 selects the pixel data in the group A and the group B simultaneously (step S304). In the N-arization unit 12b, the image processing apparatus 100 performs the N-arization of a selected pixel on the basis of the threshold value for the N-arization set as the "type 1" shown in FIG. 7 (steps S306 and S308).

When the N-arization for the selected pixel data is performed in this way, in the error diffusion processing unit 12c, the image processing apparatus 100 selects pixel data not subjected to the N-arization, which is a diffusion destination of an error, in accordance with the error diffusion matrix 3 (step S310). The image processing apparatus 100 calculates an error between a luminance value before conversion of the N-arized selected pixel data and a luminance value corresponding to a dot number after conversion and diffuses the error calculated to the pixel data selected as the error diffusion destination at a ratio set by the error diffusion matrix 3 (step S308). The N-arization is the same processing as that in the setting number "10", a detailed explanation of the N-arization is omitted.

When the error diffusion processing is performed in accordance with the error diffusion matrix 3 in this way, as shown in FIG. 17, in a diffusing direction of an error of a selected pixel A in the group A in the figure and a diffusing direction of an error of a selected pixel B in the group B in the figure, locally, the errors are diffused to unprocessed pixels in almost all directions around the selected pixels. Consequently, a diffusion property of errors is improved and it is possible to improve image quality after the N-arization processing compared with the techniques in the past in which an error is diffused substantially in one direction.

The M-ary image data acquired by the image data acquiring unit 10 is N-arized and print data is generated by applying the N-arization and the error diffusion processing to all the pixels in the groups A and B. In the error diffusion processing unit 12c, the image processing apparatus 100 transmits the print data generated to the N-arized data storing unit 13 (step S316) and stores the print data in the N-arized data storing unit 13 (step S108).

Image processing corresponding to the setting number "21" will be explained. Since processing in the image data acquiring unit 10 and the group generating unit 11 is the same as the processing for the setting number "20", an explanation of the processing is omitted.

First, processing of the N-arization processing unit 12 will be hereinafter explained.

In the N-arization processing unit 12, the image processing apparatus 100 acquires grouped image data from the group generating unit 11 (step S300). First, in the pixel data selecting unit 12a, the image processing apparatus 100 reads out N-arization information corresponding to the setting number "21" included in N-arization instruction information from the N-arization data storing unit 13 (step S302). Since the setting number is "21", as shown in FIG. 6, the processing system for the N-arization is a special 1 system and the selection method is a system for selecting pixel data one by one from one of two groups and, when all pixel data in the group have been selected, pixel data in the next group are selected in order one by one. Numerical values in boxes corresponding to respective pixels shown in FIG. 14B are numbers indicating a selection order by a unit of pixel data. Numbers 1 to 32 correspond to the group A and numbers 33 to 64 correspond to the group B. In other words, pixel data of the numbers 1 to 32 of the group A are selected in an order of the numbers and, then, pixel data of the numbers 33 to 64 of the group B are selected in an order of the numbers.

The threshold value for N-arization corresponding to a purpose and the numerical value after conversion corresponding to the threshold value are the "type 1" for print data generation. The error diffusing method is diffusion processing using the error diffusion matrix 4.

For the group A (gray), a matrix shown in FIG. 15C corresponds to the error diffusion matrix 4. For the group B (white), a matrix shown in FIG. 15D corresponds to the error diffusion matrix 4.

As shown in FIG. 15C, an error that occurs in the pixel data in the group A is diffused to unprocessed pixel data in the group B on the right of selected pixel data at a ratio of 1/6. The error is diffused to unprocessed pixel data in a place one pixel data ahead of the selected pixel data in the group B on the right of the selected pixel data at a ratio of 1/6. The error is diffused to two pixel data on the left obliquely below and on the right obliquely below a selected pixel in an image data area in the group A below an image data area in the selected pixel data at a ratio of 1/6, respectively. The error is diffused to two unprocessed pixel data in the group B right below and on the right below the selected pixel data at a ratio of 1/6, respectively.

As shown in FIG. 15D, an error that occurs in the pixel data in the group B is diffused to unprocessed pixel data in a place one pixel data ahead of the selected pixel data in the group A on the left of the selected pixel data at a ratio of 1/3. The error is diffused to two unprocessed pixel data on the left obliquely above and on the right obliquely above the selected pixel data at a ratio of 1/3, respectively.

As a progress direction of the N-arization and a diffusing direction of an error, as shown in FIG. 16B, for the group A, respective pixels are N-arized in order pixel by pixel from the left to the right for each row of the group A while pixels in the group B are skipped. An error of the pixel data is diffused to six unprocessed pixel data, that is, an unprocessed pixel in the group B on the right of the elected pixel data, an unprocessed pixel in a place one pixel data ahead of the selected pixel data in the group B on the right of the selected pixel data, two unprocessed pixels on the left obliquely below and on the right obliquely below a selected pixel in the image data area in the group A below the image data area of the selected pixel data, and two unprocessed pixels right below and on the right below the selected pixel data in accordance with the error diffusion matrix 4 shown in FIG. 15C.

On the other hand, for the group B, respective pixels are N-arized in order pixel by pixel from the right to the left for each row of the group B while pixels in the group A are skipped. An error of the pixel data is diffused to three unprocessed pixel data, that is, unprocessed pixel data in a place one pixel data ahead of the selected pixel data in the group A on the left of the selected pixel data and two unprocessed pixel data in the group B on the left obliquely above and on the right obliquely above the selected pixel data in accordance with the error diffusion matrix 3 shown in FIG. 15B.

In other words, in the error diffusion matrix 4 shown in FIGS. 15C and 15D, diffusing directions of an error are set to be opposite to each other. In addition, an error from the group A is set to be diffused to unprocessed pixels in the group B. Therefore, the N-arization and the error diffusion processing for the group B are performed after the N-arization and the error diffusion processing for the group A ends.

Therefore, in the pixel data selecting unit 12*a*, first, the image processing apparatus 100 selects the pixel data in the group A (step S304). In the N-arization unit 12*b*, the image processing apparatus 100 performs the N-arization of a selected pixel on the basis of the threshold value for the N-arization set as the "type 1" shown in FIG. 7 (steps S306 and S308).

When the N-arization for the selected pixel data is performed in this way, in the error diffusion processing unit 12*c*, the image processing apparatus 100 selects pixel data not subjected to the N-arization, which is a diffusion destination of an error, in accordance with the error diffusion matrix 4 (step S310). The image processing apparatus 100 calculates an error between a luminance value before conversion of the N-arized selected pixel data and a luminance value corresponding to a dot number after conversion and diffuses the error calculated to the pixel data selected as the error diffusion destination at a ratio set by the error diffusion matrix 4 (step S308). Since the N-arization is the same processing as that in the setting number "10", a detailed explanation of the N-arization is omitted.

When the N-arization and the error diffusion processing end for all the pixels in the group A, pixel data in the group B is selected. In the N-arization unit 12*b*, the N-arization and the error diffusion processing for a selected pixel is performed as described above.

When the error diffusion processing is performed in accordance with the error diffusion matrix 4 in this way, as shown in FIG. 18, in a diffusing direction of an error of a selected pixel A in the group A in the figure and a diffusing direction of an error of a selected pixel B in the group B in the figure, locally, the errors are diffused to unprocessed pixels in almost all directions around the selected pixels, although the selected pixels are shifted by one row. In addition, the error of the selected pixel in the group A is also diffused to pixel data in the group B near the selected pixel. Thus, a diffusion property of errors is further increased. Consequently, a diffusion property of errors is improved compared with the techniques in the past in which an error is diffused substantially in one direction. Moreover, it is possible to improve a diffusion property of errors compared with the processing in the setting value "20". Thus, it is possible to further improve an image quality after the N-arization processing.

Note that, in FIG. 18, the N-arization and the error diffusion processing for the group A moves from the left to the right every other pixel by a unit of a pixel and from an upper row to a lower row by a unit of a row and the N-arization and the error diffusion processing for the group B moves from the right to the left every other pixel by a unit of a pixel and from a lower row to an upper row by a unit of a row. Thus, the group A is set as a forward path and the group B is set as a backward path.

The M-ary image data acquired by the image data acquiring unit 10 is N-arized and print data is generated by applying the N-arization and the error diffusion processing to all the pixels in the groups A and B. In the error diffusion processing unit 12*c*, the image processing apparatus 100 transmits the print data generated to the N-arized data storing unit 13 (step S316) and stores the print data in the N-arized data storing unit 13 (step S108).

In the embodiment described above, the image data acquiring unit 10 corresponds to the image data acquiring unit according to some aspects of the invention. The group generating unit 11 corresponds to the grouping unit according to some aspects of the invention. The pixel data selecting unit 12*a* corresponds to the pixel data selecting unit according to some aspects of the invention. The N-arization unit 12*b* corresponds to the N-arization processing unit according to some aspects of the invention. The error diffusion processing unit 12*c* corresponds to the error diffusing unit according to some aspects of the invention. The generation processing for the print data in the N-arization unit 12*b* and the error diffusion processing unit 12*c* corresponds to the print data generating unit according to some aspects of the invention.

In the embodiment described above, steps S100 and S102 correspond to the image data acquiring step of the invention. Step S104 corresponds to the grouping step according to some aspects of the invention. Step S304 corresponds to the pixel data selecting step according to some aspects of the invention. Steps S306 and S308 correspond to the N-arization processing step of the invention. Steps S310 and S312 correspond to the error diffusing step of the invention.

Figure 19:
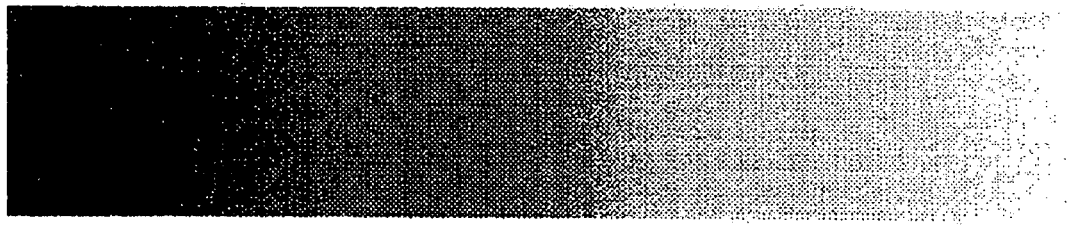
FIG. 19 is a gradation image used in an example of the invention.
Figure 20:
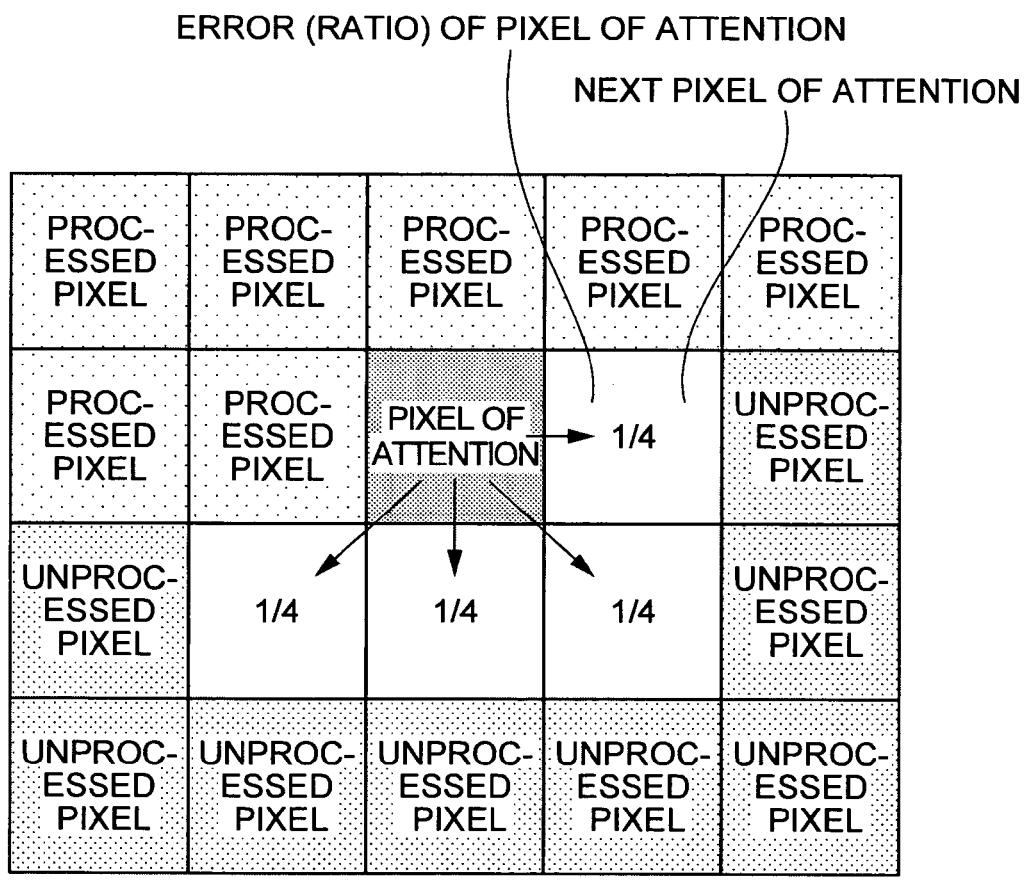
FIG. 20 is an error diffusion matrix in an error diffusing method in the past.
Figure 21:
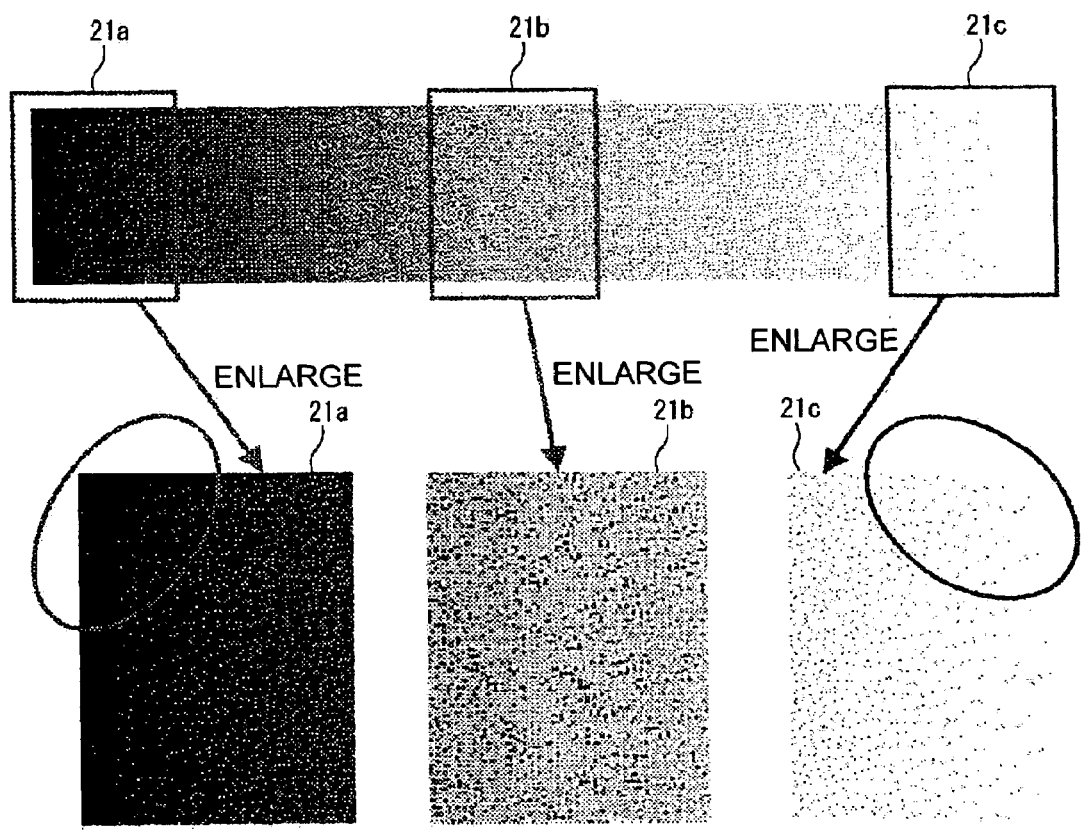
FIG. 21 is a diagram showing a result obtained by quaternarizing the gradation image in FIG. 19 using the error diffusion matrix in the method in the past shown in FIG. 20.
Figure 22A:
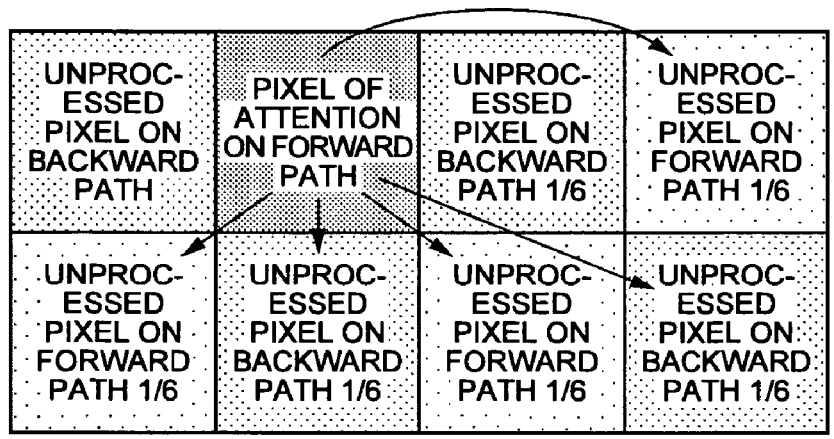
FIGS. 22A and 22B are error diffusion matrixes in an error diffusing method according to an aspect of the invention.
Figure 22B:
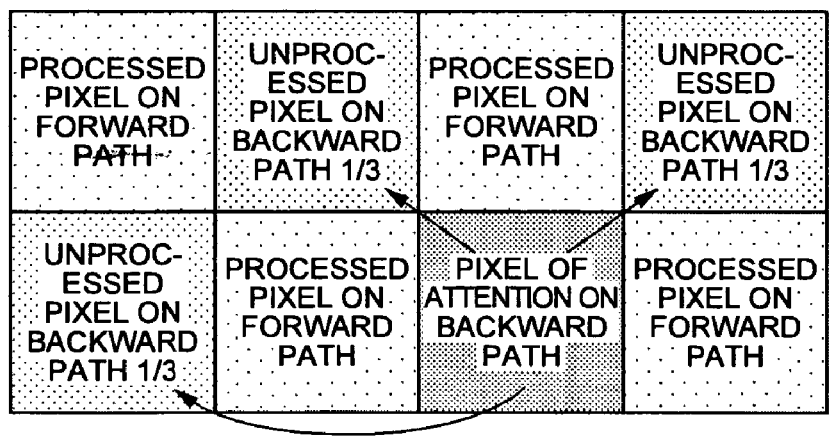
Figure 23:
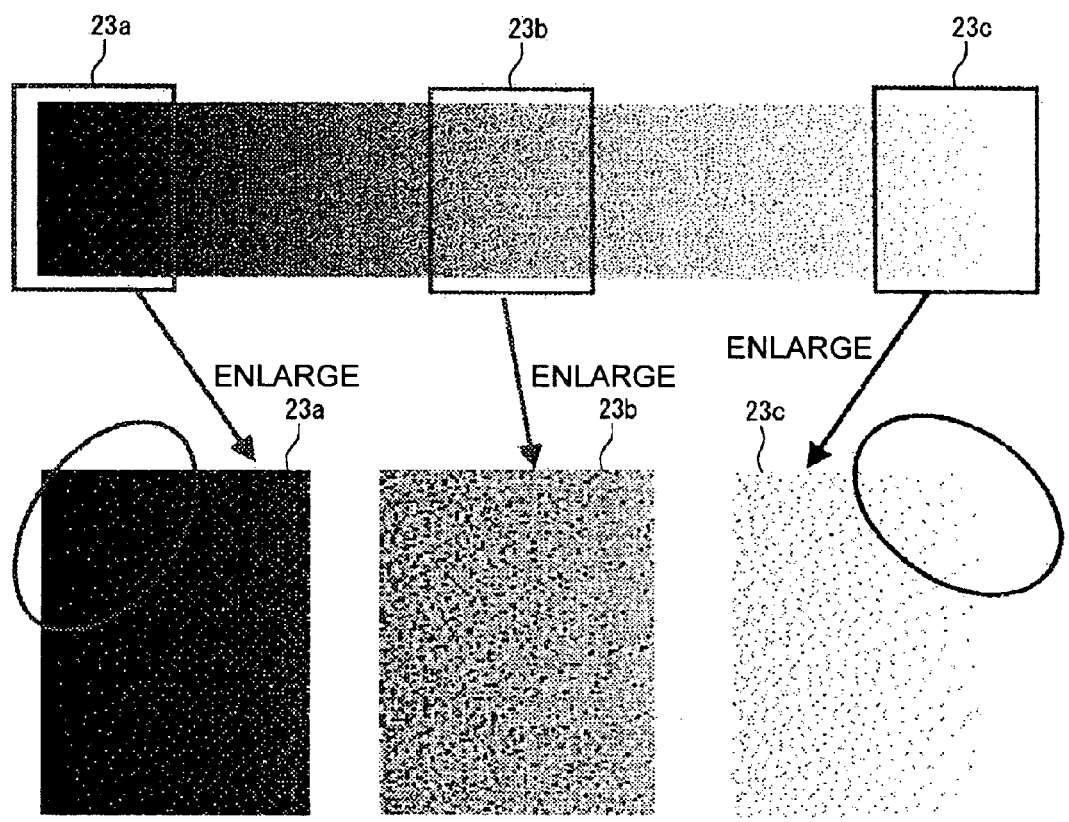
FIG. 23 is a diagram showing a result obtained by quaternarizing the gradation image in FIG. 19 using the error diffusion matrix according to the aspect of the invention shown in FIG. 22.

An example of the invention will be further explained with reference to FIGS. 19 and 23. FIG. 19 is a gradation image used in this example. FIG. 20 is an error diffusion matrix in an error diffusing method in the past. FIG. 21 is a diagram showing a result obtained by quaternarizing the gradation image in FIG. 19 using the error diffusion matrix in the method in the past shown in FIG. 20. FIGS. 22A and 22B are error diffusion matrixes in an error diffusing method according to an aspect of the invention. FIG. 23 is a diagram showing a result obtained by quaternarizing the gradation image in FIG. 19 using the error diffusion matrix according to the aspect of the invention shown in FIG. 22.

First, the error diffusing method in the past will be explained.

In the error diffusing method in the past, when pixels data are selected in order from the left to the right of respective rows in image data, as shown in FIG. 20, an error is diffused to four pixel data, that is, unprocessed pixel data on the right of a selected pixel and unprocessed pixel data on the left below, right below, and on the right below the selected pixel. In other words, in the error diffusing method in the past, an error is diffused mostly in downward directions of the selected pixel image. An image after quaternarization of a gradation image by this method is shown in FIG. 21. Looking at image portions 21*a* to 21*c* in the gradation image after quaternarization shown in FIG. 21, in the image portion 21*a*, since an error diffusion matrix used for the quaternarization has a characteristic that an error is mostly diffused in downward direction, types of dots at the time of printing (dots have plural kinds of sizes) cannot be switched smoothly to cause switching delay of a dot type. Thus, in a circled portion, dots are formed to flow into a lower right direction. In an image portion 21*b* (a halftone portion), because of the same reason as the image portion 21*a*, since plural kinds of dots forming this portion are not uniformly mixed, deterioration in an image quality occurs. In an image portion 21*c*, because of the same reason as the image portions 21*a* and 21*b*, in particular, in a circled portion, a so-called dot tailing phenomenon in which dots flow into a lower right direction occurs.

All the phenomena that occur in the enlarged image portions 21*a* to 21*c* deteriorate an image quality of the gradation image.

On the other hand, in the error diffusing method according to an aspect of the invention, as in the embodiment described above, the gradation image in FIG. 19 is divided by a unit of one pixel and image data areas are sectioned into two groups (a group 1 and a group 2) in a lattice shape such that image data cross one another between the groups. An error diffusion matrix is set such that diffusion directions of errors are opposite between the groups. In other words, as in the setting number "21" in the embodiment, the quaternarization and the error diffusion processing are applied to pixel data in the group 1 using an error diffusion matrix shown in FIG. 22A. In that case, an error that occurs in the pixel data in the group 1 is also diffused to pixel data in the group 2. When the quaternarization and the error diffusion processing for the group 1 end, the quaternarization and the error diffusion processing are applied to the pixel data in the group 2 using an error diffusion matrix shown in FIG. 22B. In other words, the error diffusion matrix is set such that diffusing directions of errors are opposite between the groups and pixel data cross one another between the groups. Thus, locally, the diffusing directions of errors are all directions around a selected pixel. Therefore, a result of the quaternarization is as shown in FIG. 23. Looking at image portions 23*a* to 23*c* in a gradation image after quaternarization shown in FIG. 23, in an image portion 23*a*, switching delay of dot types is improved compared with the method in the past. A diffusion property of dot types of a shadow portion is improved. An image quality is also improved compared with the image portion 21*a* in FIG. 21. In an image portion 23*b*, plural kinds of dots are mixed more uniformly than the method in the past. An image quality is improved compared with the image portion 21*b* in FIG. 21. In an image portion 23*c*, the dot tailing phenomenon in a highlight portion is improved compared with the method in the past. An image quality is improved compared with the image portion 21*c* in FIG. 21.

Note that, in the embodiment described above, as explained in the examples in the setting numbers "20" and "21", image data is divided into plural image data areas by a unit of one pixel and groups are sections in a lattice shape such that the respective pixel data cross one another between the groups. Pixel data in respective rows are selected from the left to the right with respect to the respective rows in the group A and from the right to the left with respect to the respective rows in the group B. However, the invention is not limited to this. A sectioning method for groups and a selection pattern for pixel data may be set as described in (1) to (6) below.

Figure 24A:
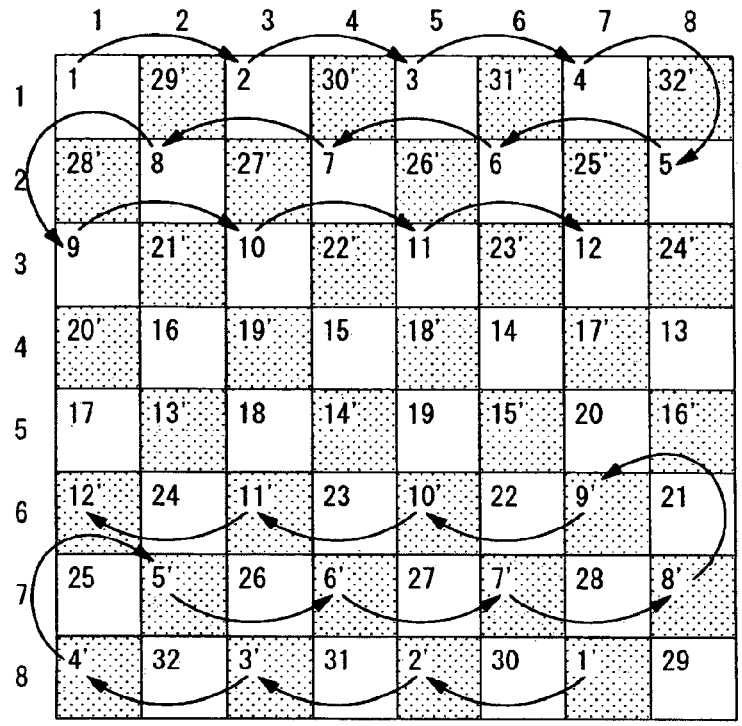
FIG. 24A is a diagram showing an example of a selection pattern for switching a selecting direction of pixel data by a unit of a row in image data grouped in a lattice shape.

(1) In a pattern 1, as shown in FIG. 24A, in the same manner as the examples in the setting numbers "20" and "21", image data is divided into plural image data areas by a unit of one pixel and the image data areas are sectioned into two groups. In the sectioned image data, in one group in which pixel data are selected from an upper row to a lower row, pixel data in the same group are selected from the left to the right in odd number rows of the image data (pixel data of numbers 1 to 4, 9 to 12, 17 to 20, and 25 to 28 shown in FIG. 24A correspond to the pixel data) and pixel data in the same group are selected from the right to the left in even number rows (pixel data of numbers 5 to 8, 13 to 16, 21 to 14, and 29 to 32 shown in FIG. 24A correspond to the pixel data). On the other hand, in the other group in which pixel data are selected from a lower row to an upper row, pixel data in the same group are selected from the right to the left in odd number rows of the image data (pixel data of numbers 1' to 4', 9' to 12', 17' to 20', and 25' to 28' shown in FIG. 24A correspond to the pixel data) and pixel data in the same group are selected from the left to the right in even number rows (pixel data of numbers 5' to 8', 13' to 16', 21' to 24', and 29' to 32' shown in FIG. 24A correspond to the pixel data). In this way, in both the groups, a selecting direction of pixel data may be switched in a last selected pixel data in the respective rows such that a selecting direction is reversed for each of the rows.

Figure 24B:
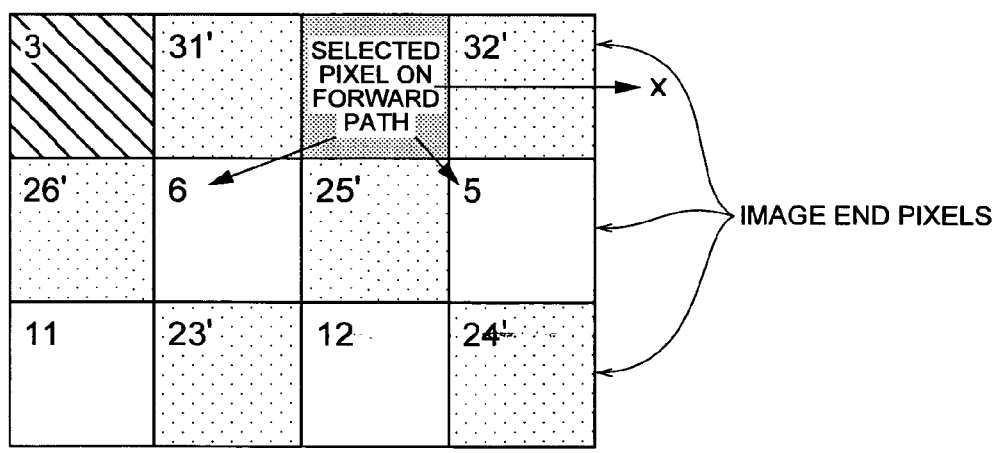
FIG. 24B is a diagram showing an example of error diffusion processing in the selection pattern in FIG. 24A.

In the selection pattern, in an error diffusing method, as shown in FIG. 24B, for pixels near ends of the respective rows where a selecting direction is reversed, an error is diffused to pixel data near pixel data in which switching of the selecting direction occurs and an error of pixel data at ends is not discarded.

Figure 25:
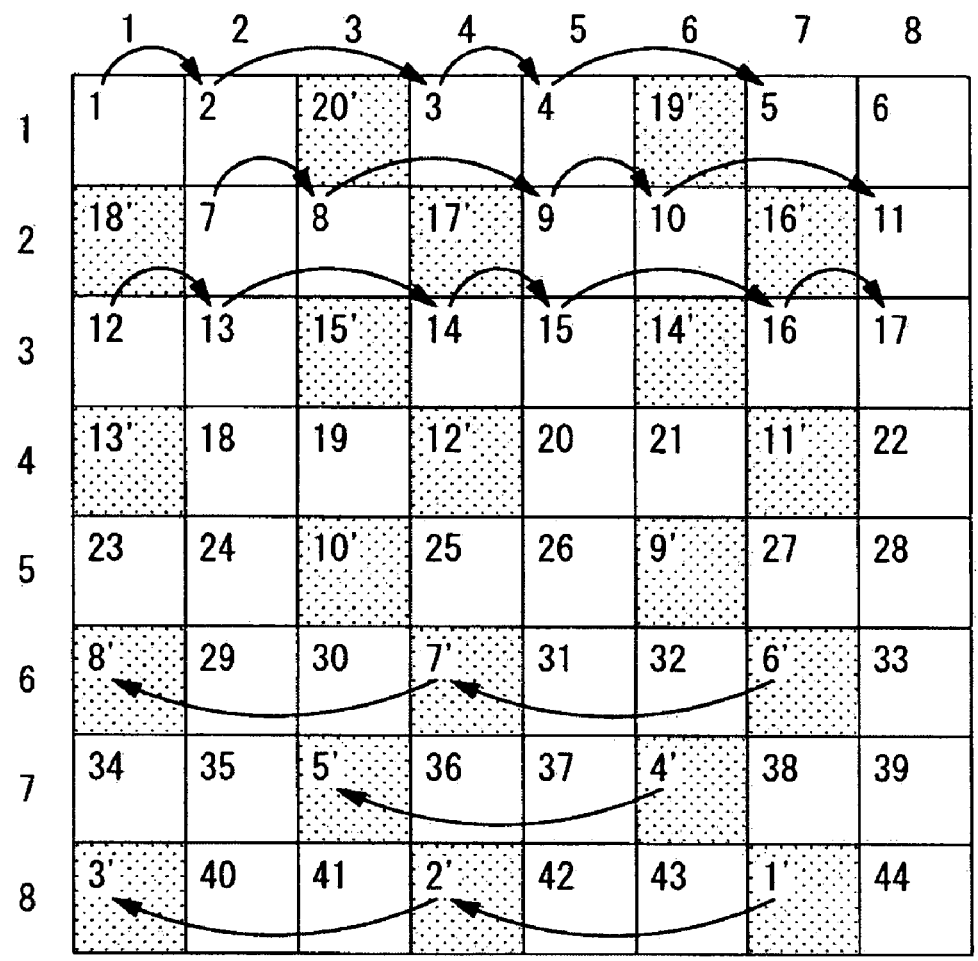
FIG. 25 is a diagram showing an example of a selection pattern for pixel data in image data grouped in a lattice shape into a group by a unit of one pixel and a group by a unit of two pixels.

(2) In a pattern 2, as shown in FIG. 25, image data is divided into plural image data areas by a unit of one pixel and plural image data areas by a unit of two pixels. The image data areas are sectioned into two groups, that is, a group including the image data areas by a unit of one pixel and a group including the image data areas by a unit of two pixels, in a lattice shape such that the respective image data areas cross one another between the groups. In the group including the image data areas by a unit of two pixels, pixel data in the same group are selected in order from an upper row to a lower row and from the left to the right in the respective rows (numbers 1 to 44 shown in FIG. 25 correspond to a selection order for the pixel data). On the other hand, in the group including the image data areas by a unit of one pixel, pixel data in the same group are selected in order from a lower row to an upper row and from the right to the left in the respective rows (numbers 1' to 20' shown in FIG. 25 correspond to a selection order for the pixel data). In other words, in the group including the image data areas by a unit of two pixels, in the respective rows, adjacent two pixels in the same group are continuously selected and, then, one pixel in the group including the image data areas by a unit of one pixel is skipped and the next two pixels are selected. In this way, pixel data are selected from the left to the right for each of the rows in an order of selection of two pixels, skip of one pixel, selection of two pixels, and the like. On the other hand, in the group including the image data areas by a unit of one pixel, in the respective rows, opposite to the group including the image data areas by a unit of two pixels, pixel data in the same group are selected in order from the right to the left for each of the rows in an order of selection of one pixel, skip of two pixels, selection of one pixel, and the like.

Figure 26A:
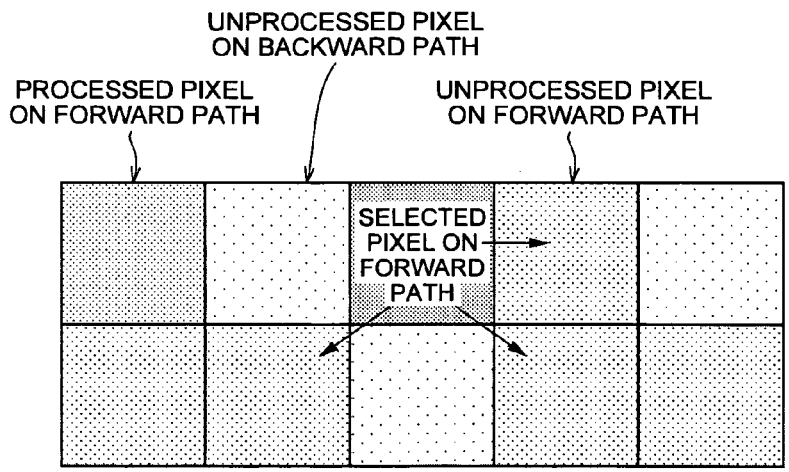
FIGS. 26A to 26C are diagrams showing an example of an error diffusing method applicable to the selection pattern in FIG. 25.
Figure 26B:
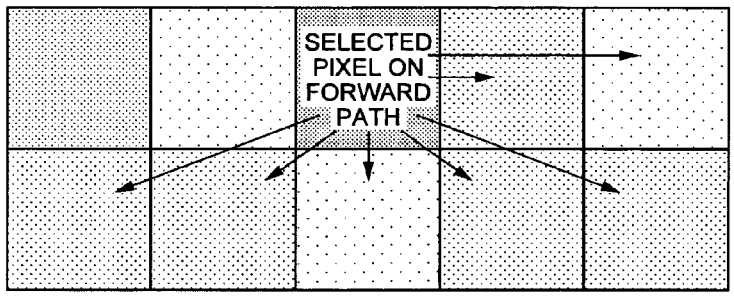
Figure 26C:
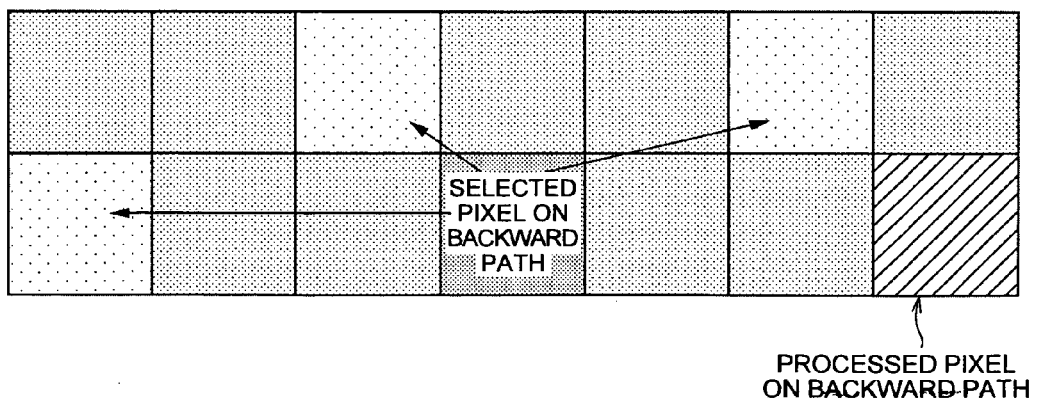

In the selection pattern, as an error diffusing method, there are the following two systems for the group including the image data areas by a unit of two pixels. In one system, as shown in FIG. 26A, with the group as a forward path, an error is diffused to only three unprocessed pixel data in the same group on the right of, on the left below, and on the right below selected pixel data. In the other system, as in an error diffusion matrix shown in FIG. 26B, with the group as a forward path, an error is diffused to three unprocessed pixel data in the same group on the right of, on the left below, and on the right below selected pixel data and three unprocessed pixel data of other groups on the right of pixel data on the right of the selected pixel data, on the right of pixel data right below the selected pixel data, and right below the selected pixel data. On the other hand, there is the following system for the group including the image data areas by a unit of one pixel. In the system, as in an error diffusion matrix shown in FIG. 26C, with the group as a backward path, an error is diffused to three unprocessed pixel data in the same group in a place two pixel data ahead of selected pixel data in the group including the image data areas by a unit of two pixels on the left of the selected pixel data, on the left above the selected pixel data, and on the right of pixel data of the group including the image data areas by a unit of two pixels on the right above the selected pixel data.

Figure 27:
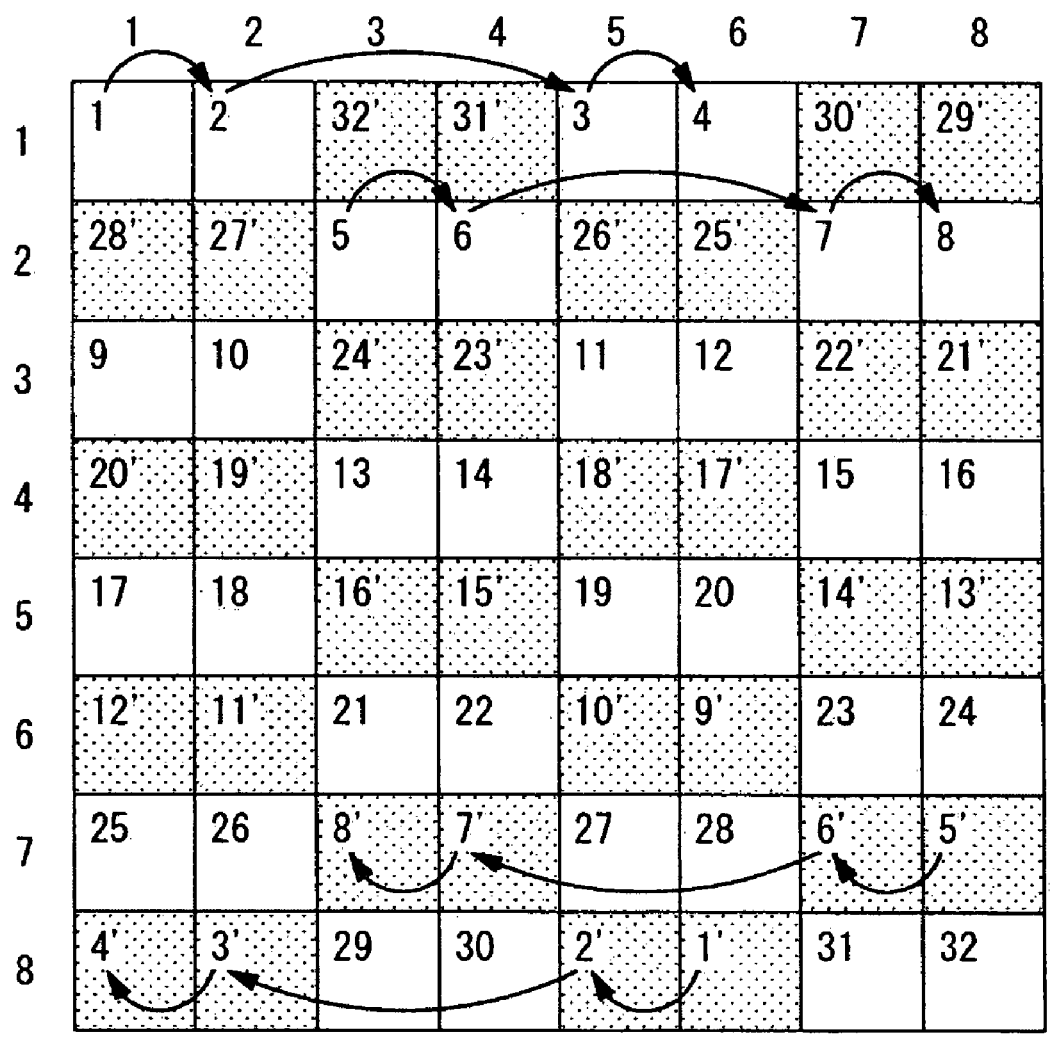
FIG. 27 is a diagram showing an example of a selection pattern for pixel data in image data grouped in a lattice shape into two groups by a unit of two pixels.

(3) In a pattern 3, as shown in FIG. 27, image data is divided into plural image data areas by a unit of two pixels and the image data areas are sectioned into two groups in a lattice shape such that the respective image data areas cross one another between the groups. In one group, pixel data in the same group are selected in order from an upper row to a lower row and from the left to the right in the respective rows (numbers 1 to 32 shown in FIG. 27 correspond to a selection order for the pixel data). On the other hand, in the other group, pixel data in the same group are selected in order from a lower row to an upper row and from the right to the left in the respective rows (numbers 1' to 32' shown in FIG. 27 correspond to a selection order for the pixel data). In other words, in both the groups, two pixels continuous in a row direction in the same group are selected and, then, two pixels continuous in a row direction of the other group are skipped and the next two pixels are selected. In this way, pixel data in the same group are selected in order from the left to the right or from the right to the left for each of the rows in an order of selection of two pixels, skip of two pixels, selection of two pixels, and the like.

Figure 28A:
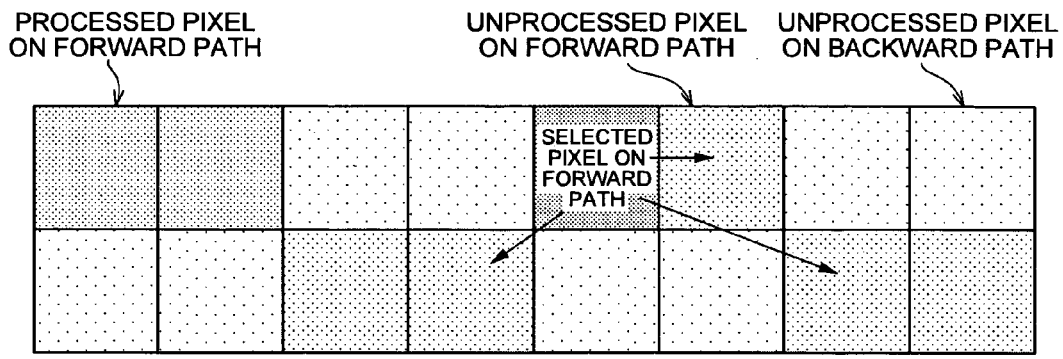
FIGS. 28A to 28C are diagrams showing an example of an error diffusing method applicable to the selection pattern in FIG. 27.
Figure 28B:
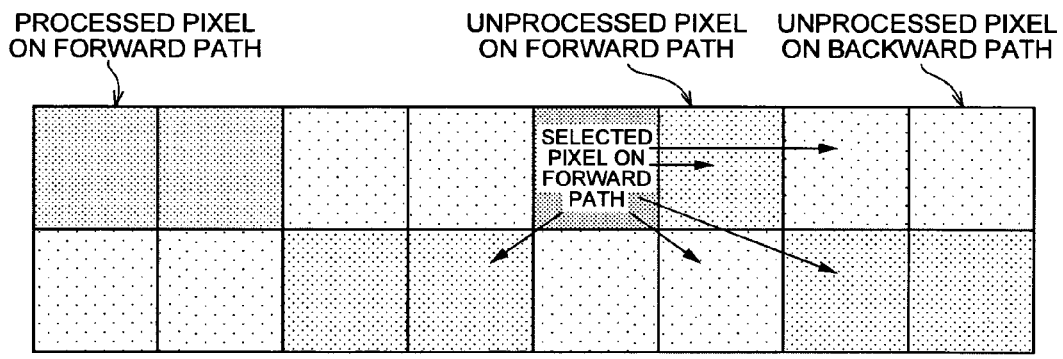
Figure 28C:
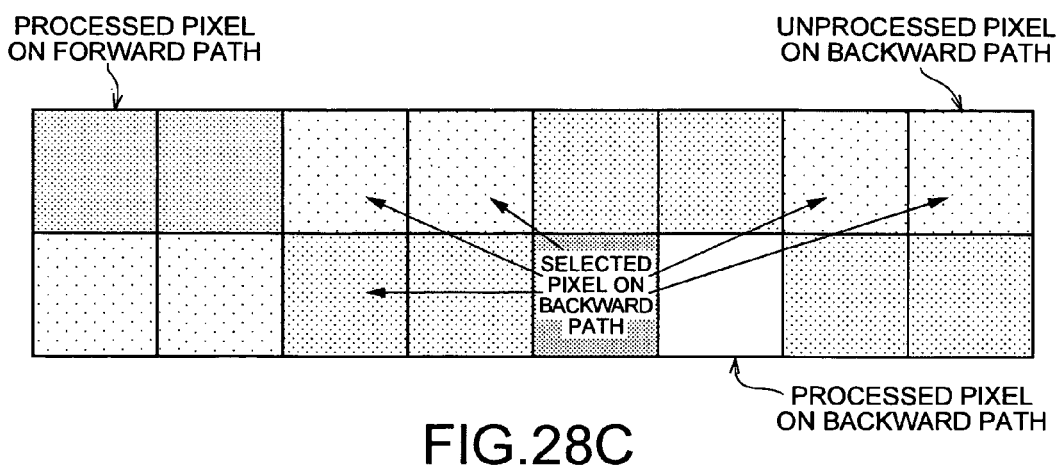

In the selection pattern, as an error diffusing method, there are the following two systems for one group. In one system, as shown in FIG. 28A, with the group as a forward path, an error is diffused to three unprocessed pixel data in the same group on the right of and on the left below selected pixel data and on the right of pixel data of the other group on the right below the selected pixel data. In the other system, as in an error diffusion matrix shown in FIG. 28B, with the group as a forward path, an error is diffused to three unprocessed pixel data in the same group on the right of and on the left below selected pixel data and on the right of pixel data in the other group on the right below the selected pixel data and three unprocessed pixel data in other groups right below and on the right below the selected pixel data. On the other hand, there is the following system for the other group. In the system, as in an error diffusion matrix shown in FIG. 28C, an error is diffused to five pixel data in the same group in a place two pixel data ahead of selected pixel data in the other group on the left of the selected pixel data, on the left above and on the left of the selected pixel data, on the right of pixel data of the other group on the right obliquely above the selected pixel data, and on the right of the pixel data.

Figures 29, 30:
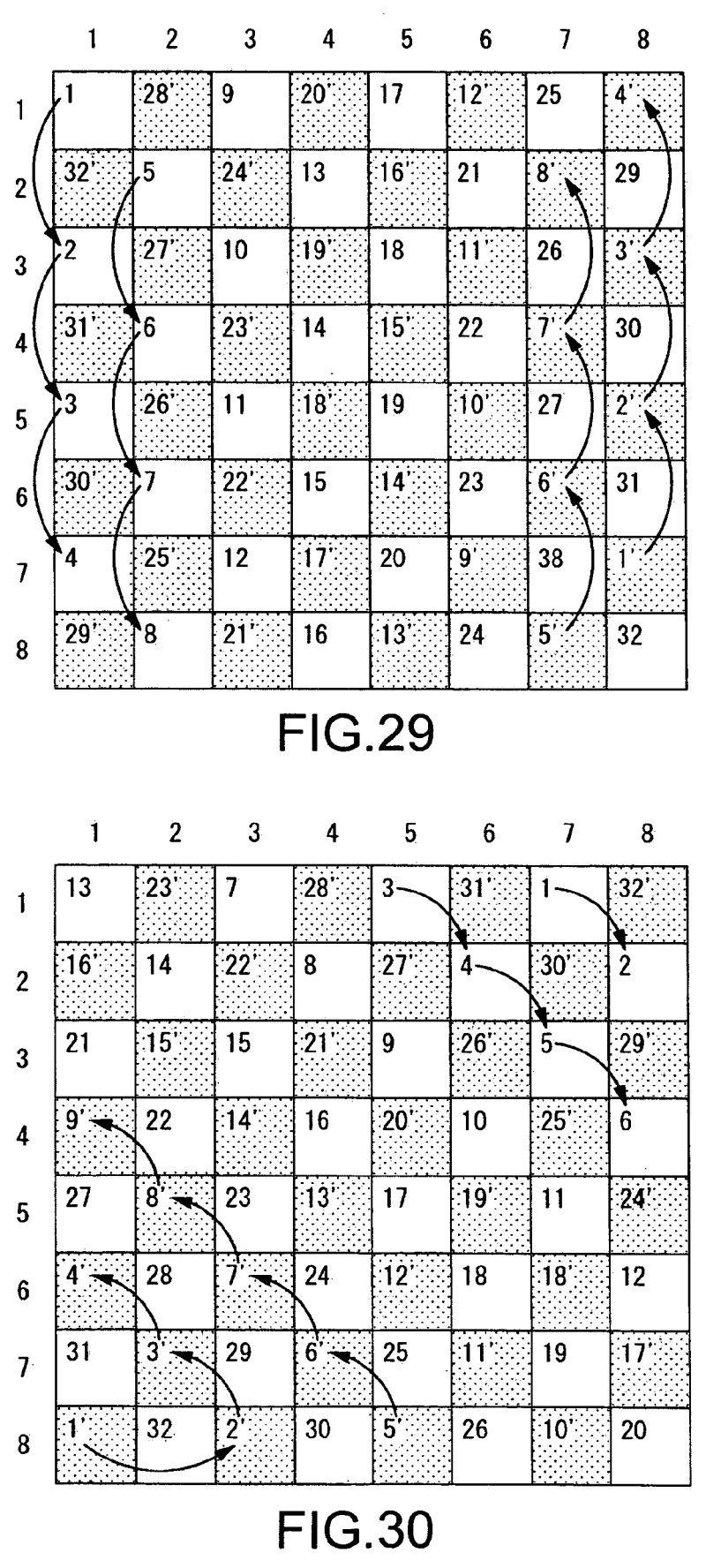

(4) In a pattern 4, as shown in FIG. 29, in the same manner as the examples in the setting numbers "20" and "21", image data is divided into plural image data areas by a unit of one pixel and the image data areas are sectioned into two groups in a lattice shape. In the sectioned image data, in one group, pixel data in the same group are selected in order from a left row to a right row and upper pixel data to lower pixel data in the respective rows (numbers 1 to 32 shown in FIG. 29 correspond to a selection order for the pixel data). On the other hand, in the other group, pixel data in the same group are selected in order from a left row to a right row and from lower pixel data to upper pixel data in the respective rows (numbers 1' to 32' shown in FIG. 29 correspond to a selection order for the pixel data). In other words, in both the groups, one pixel data in the same group is selected and, then, one pixel data in the other group adjacent to the pixel data in the same row is skipped downward or upward and the next one pixel in the same group is selected. In this way, pixel data in the same group are selected in order from upper one to lower one or from lower one to upper one in an order of selection of one pixel, skip of one pixel, selection of one pixel, and the like.

In the selection pattern, as an error diffusing method, it is possible to diffuse an error using the same error diffusion matrix as the examples in the setting numbers "20" and "21" in the embodiment described above.

(5) In a pattern 5, as shown in FIG. 30, in the same manner as the examples in the setting numbers "20" and "21", image data is divided into plural image data areas by a unit of one pixel and the image data areas are sectioned into two groups in a lattice shape. In the image data sectioned, a row (horizontal) direction thereof is associated with an x coordinate and a column (vertical) direction thereof is associated with a y coordinate. Numbers 1 to 8 are allocated to respective rows and respective columns such that coordinates of pixel data on the upper left is set as (x,y)=(1,1) and coordinates of pixel data on the lower right is set as (x,y)=(8,8). In one group, pixel data are selected in an oblique direction from the upper left to the lower right, with pixel data in coordinates (7,1) as a start point, in an order of coordinates (8,2), (5,1), (6,2), (7,3), (8,4), (3,1), . . . , (2,8) in accordance with an order of numbers 1 to 32 shown in FIG. 30 corresponding to a selection order of the pixel data in the group. On the other hand, in the other group, pixel data are selected in an oblique direction from the lower right to the upper left, with pixel data in coordinates (1,8) as a start point, in an order of coordinates (3,8), (2,7), (1,6), (5,8), (4,7), (3,6), . . . , (8,1) in accordance with an order of numbers 1' to 32' shown in FIG. 30 corresponding to a selection order of the pixel data in the group.

Figure 32:
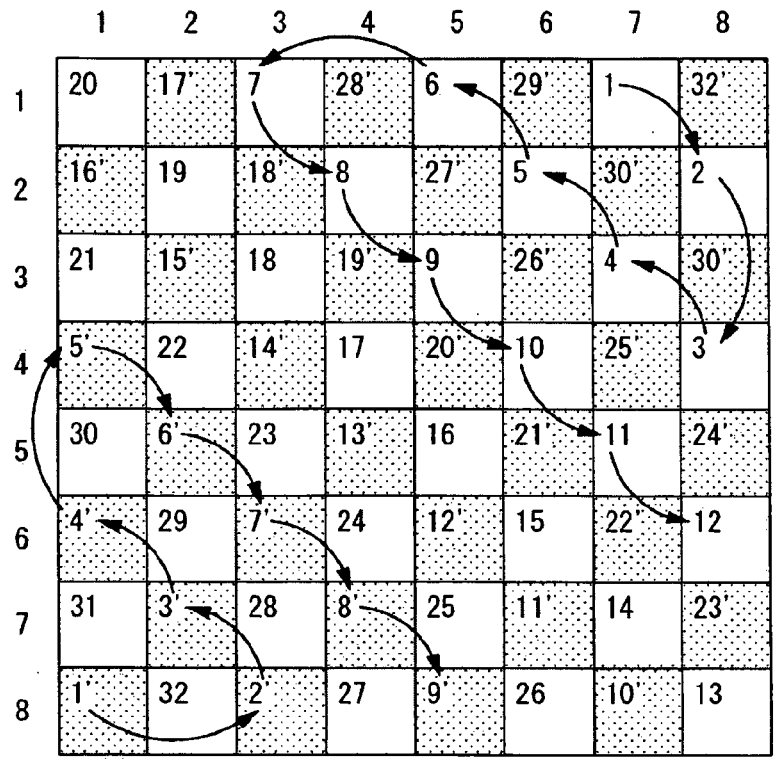
FIG. 32 is a diagram showing an example of a selection pattern for selecting pixel data of each group in an oblique direction and also performing switching of a selecting direction in image data grouped in a lattice shape.

A selection pattern of pixel data is not limited to the order described above. It is also possible to select pixel data in the following manner. As shown in FIG. 32, in one group, first, pixel data are selected in an oblique direction from the upper left to the lower right, with pixel data in coordinates (7,1) as a start point, in an order of coordinates (8,2), (8,4), (7,3), (6,2), (5,1), (3,1), . . . , (2,8) in accordance with an order of numbers 1 to 32 shown in FIG. 32 corresponding to a selection order of the pixel data in the group. After that, when pixel data to be selected last in each of selecting directions is selected, the selecting direction is switched to the opposite direction from the next pixel data. For example, when pixel data at the right bottom is selected, turning from the next pixel data in the same group in a place one pixel ahead of selected pixel data in the other group in the downward direction, pixel data are selected in order from the lower right to the upper left and, when pixel data at the left top is selected, turning from the next pixel in the same group in a place one pixel ahead of selected pixel data in the other group in the left direction, pixel data are selected in order from the lower right to the upper left. Similarly, in the other group, first, pixel data are selected in an oblique direction from the lower right to the upper left, with pixel data in coordinates (1,8) as a start point, in an order of coordinates (3,8), (2,7), (1,6), (1,4), (2,5), (3,6), . . . , (8,1) in accordance with an order of numbers 1' to 32' shown in FIG. 32 corresponding to a selection order of the pixel data in the group. After that, when pixel data to be selected last in each of selecting directions is selected, the selecting direction is switched to the opposite direction from the next pixel data. For example, when pixel data at the left top is selected, turning from the next pixel data in the same group in a place one pixel ahead of selected pixel data in the other group in the upward direction, pixel data are selected in order from the upper left to the lower right and, when pixel data at the right bottom is selected, turning from the next pixel in the same grouping in a place one pixel ahead of selected pixel data in the other group in the right direction, pixel data are selected in order from the lower right to the upper left.

Figure 31A:
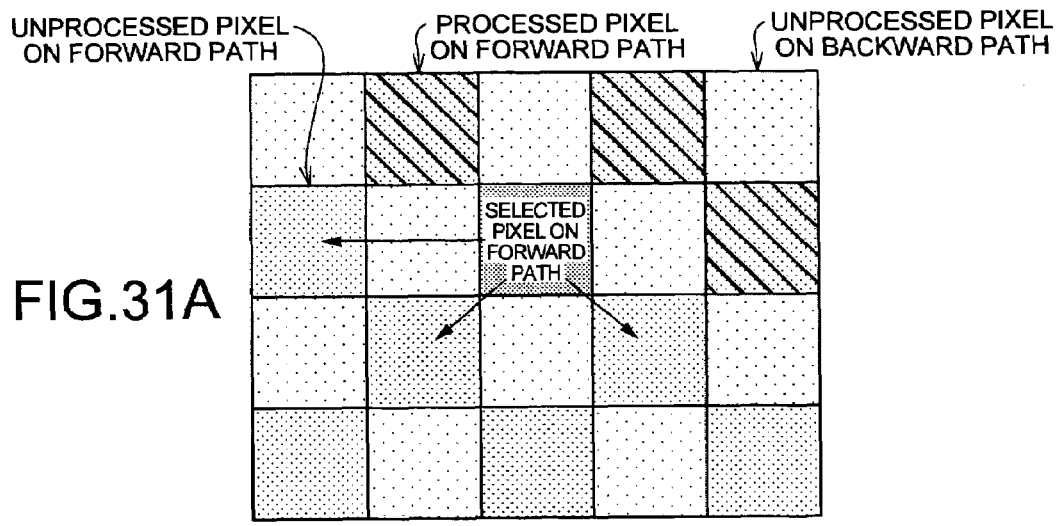
FIGS. 31A to 31C are diagrams showing an example of an error diffusing method applicable to selection patterns in FIGS. 30 and 32.
Figure 31B:
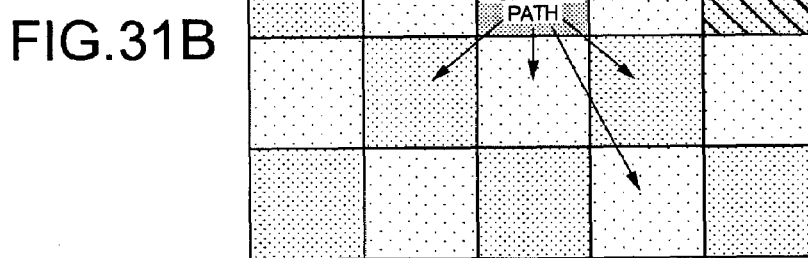
Figure 31C:
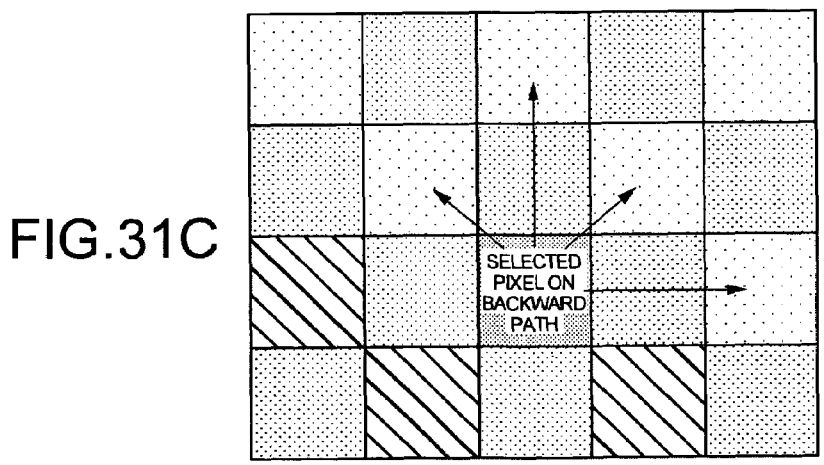

In the selection pattern, as an error diffusing method, there are the following two systems for one group. In one system, as shown in FIG. 31A, an error is diffused to three unprocessed pixel data in the same group on the left of pixel data of the other group on the left of selected pixel data and on the left below and the right below the selected pixel data. In the other system, as shown in FIG. 30B, an error is diffused to three unprocessed pixel data in the same group on the left of pixel data in the other group on the left of selected pixel data and on the left below and the right below the selected pixel data and three unprocessed pixel data in other groups on the left of and right below the selected pixel data and right below pixel data in the same group on the right below the selected pixel data. On the other hand, there is the following system for the other group. In the system, as shown in FIG. 31C, an error is diffused to four pixel data in the same group on the right of pixel data in one group on the right of selected pixel data, on the right above and the left above the selected pixel data, and right above pixel data in one group right above the selected pixel data.

In the respective patterns in (2) to (4), as in the pattern in (1), a selecting direction for pixel data may be switched for each of the rows or each of the columns.

In the embodiment described above, the processing is explained with the error diffusion matrixes 1 to 4 as examples. However, the invention is not limited to this. A diffusing direction, a diffusing ratio, a diffusing range, and the like of errors in an error diffusion matrix may be changed to different ones according to an application of image data, print data, or the like.

In the embodiment, N-arized image data and print data are generated as N-arized data. However, the invention is not limited to this. N-arized data for other applications may be generated or the image processing apparatus 100 may be built in a printing apparatus such as an ink-jet printer as a machine exclusively used for generating print data.

In the example explained in the embodiment, image data is divided by a unit of a row and a unit of one pixel. However, the invention is not limited to this. Image data may be divided by other unit such as a unit of a column, a unit of two pixels, and a unit of four pixels.

In the embodiment, image data is divided and grouped such that image data areas are arranged in two kinds of shapes, that is, a shape in which the image data areas cross alternately to one another by a unit of a row and a shape in which the image data areas cross one another in a lattice shape by a unit of a pixel. However, the invention is not limited to this. Image data may be divided and grouped such that image data areas are arranged in other shapes. For example, image data is divided and grouped in two swirl shapes of a right hand wind and a left hand wind.

In the example explained in the embodiment, two or more image data areas are sectioned into two groups. However, the invention is not limited to this. Two or more image data areas may be sectioned into three or more groups.

Consequently, when print data for a high-resolution printer is generated, it is possible to set a diffusing direction of errors in multiple directions. Thus, a higher image quality is obtained as a result of printing of an image that is a result of error diffusion processing.

Figure 33:
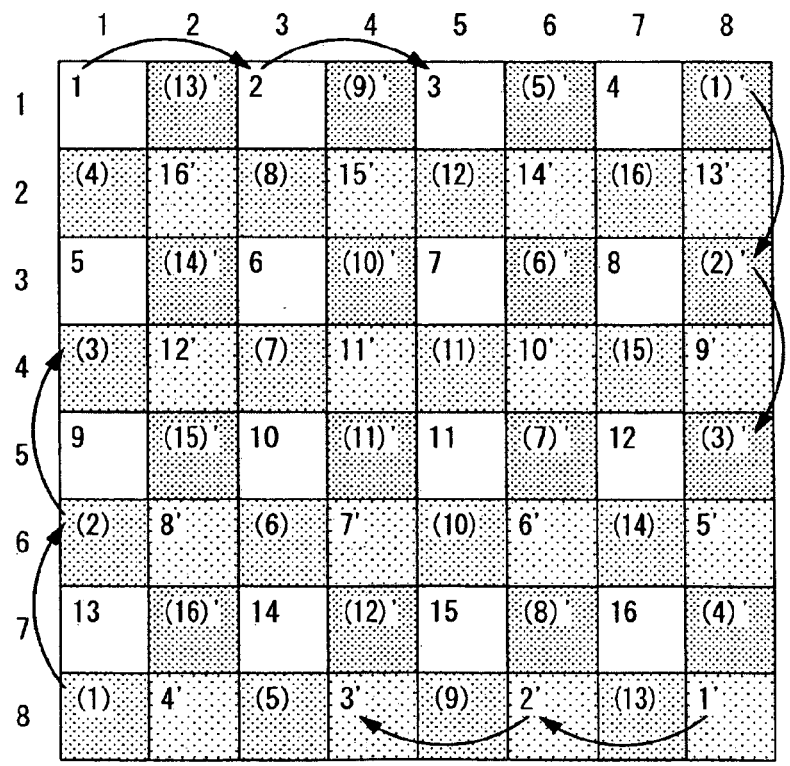
FIG. 33 is a diagram showing an example of a selection pattern for pixel data in image data grouped into four groups in a lattice shape.

For example, as shown in FIG. 33, image data is divided into plural image data areas by a unit of one pixel and the image data areas are sectioned into four groups (groups 1 to 4) in a lattice shape. A selection order for the pixel data in the group 1 is set in an order of numbers 1 to 16 shown in FIG. 33. A selection order for the pixel data in the group 2 is set in an order of numbers 1' to 16' shown in FIG. 33. A selection order for the pixel data in the group 3 is set in an order of numbers (1) to (16) shown in FIG. 33. A selection order for the pixel data in the group 4 is set in an order of numbers (1)' to (16)' shown in FIG. 33.

Figure 34A:
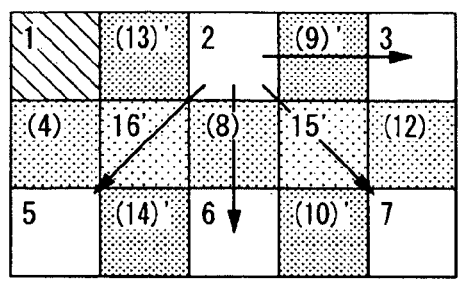
FIGS. 34A to 34D are diagrams showing an example of an error diffusing method in the case in which an error is diffused to only unprocessed pixel data in the same group.

In this example in FIG. 33, as a method of diffusing an error only to the same group, for the group 1, as shown in FIG. 34A, there is a system for diffusing an error to four unprocessed pixel data in the same group on the right of the pixel data in the group 4 on the right of selected pixel data, on the right below the pixel data in the group 2 on the right below the selected pixel data, right below the pixel data in the group 3 right below the selected pixel data, and on the left below the pixel data in the group 2 on the left below the selected pixel data.

Figure 34B:
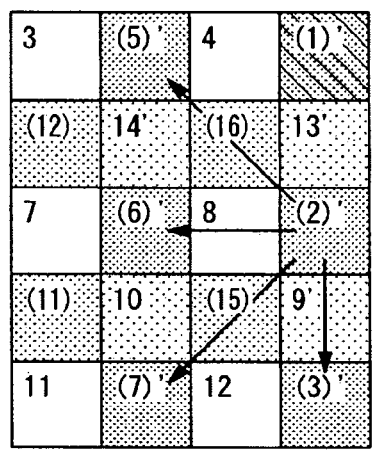
Figure 34C:
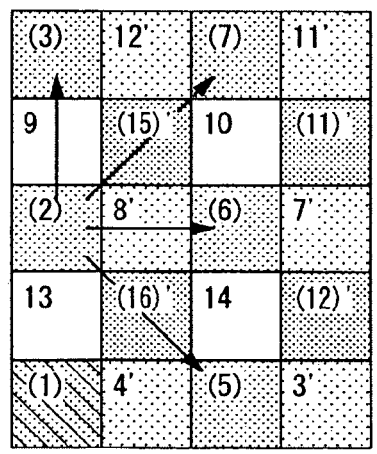
Figure 34D:
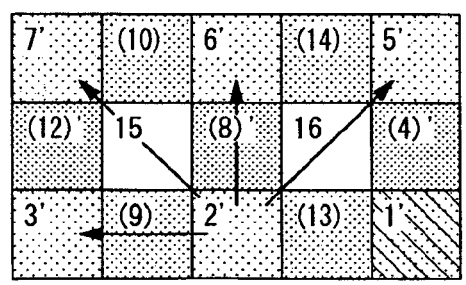

As a method of diffusing an error only to the same group, for the group 2, as shown in FIG. 34D, there is a system for diffusing an error to four unprocessed pixel data in the same group on the left of the pixel data in the group 3 on the left of selected pixel data, on the left above the pixel data in the group 1 on the left above the selected pixel data, right above the pixel data in the group 3 right above the selected pixel data, and on the right above the pixel data in the group 1 on the right above the selected pixel data.

As a method of diffusing an error only to the same group, for the group 3, as shown in FIG. 34C, there is a system for diffusing an error to four unprocessed pixel data in the same group right above the pixel data in the group 1 right above selected pixel data, on the right above the pixel data in the group 4 on the right above the selected pixel data, on the right of the pixel data in the group 2 on the right of the selected pixel data, and on the right below the pixel data in the group 4 on the right below the selected pixel data.

As a method of diffusing an error only to the same group, for the group 4, as shown in FIG. 34B, there is a system for diffusing an error to four unprocessed pixel data in the same group right below the pixel data in the group 1 right below selected pixel data, on the left below the pixel data in the group 3 on the left below the selected pixel data, on the left of the pixel data in the group 1 on the left of the selected pixel data, and on the left above the pixel data in the group 3 on the left above the selected pixel data.

Figure 35A:
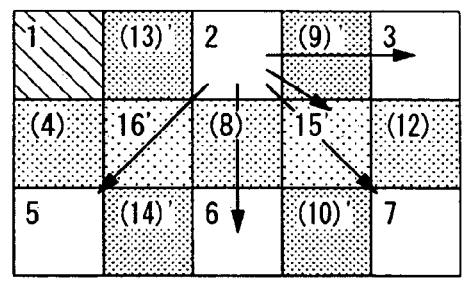
FIGS. 35A to 35D are diagrams showing an example of an error diffusing method in the case in which an error is also diffused to unprocessed pixel data in other groups.
Figure 35B:
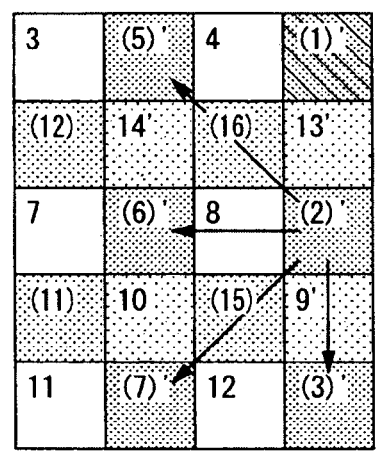

On the other hand, in the example in FIG. 33, as a method of diffusing an error to the other groups as well, for the group 1, as shown in FIG. 35A, there is a system for diffusing an error to four unprocessed pixel data in the same group on the right of the pixel data in the group 4 on the right of selected pixel data, on the right below the pixel data in the group 2 on the right below the selected pixel data, right below the pixel data in the group 3 right below the selected pixel data, and the left below the pixel data in the group 2 on the left below the selected pixel data and two unprocessed pixel data in the other groups on the right below and the left below the selected pixel data.

Figure 35C:
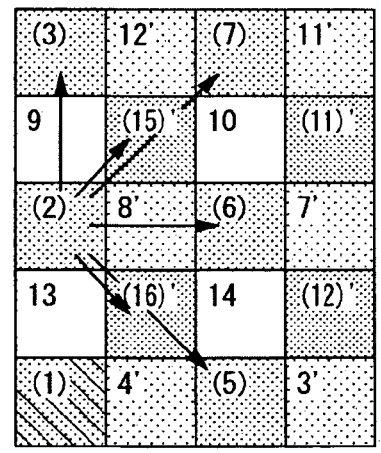
Figure 35D:
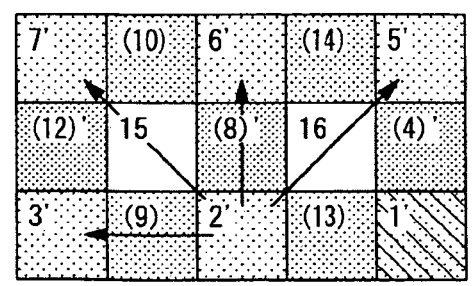

As a method of diffusing an error to the other groups as well, for the group 3, as shown in FIG. 35C, there is a system for diffusing an error to four unprocessed pixel data in the same group right above the pixel data in the group 1 right above selected pixel data, on the right above the pixel data in the group 4 on the right above the selected pixel data, on the right of the pixel data in the group 2 on the right of the selected pixel data, and on the right below the pixel data in the group 4 on the right below the selected pixel data and two unprocessed pixel data in the other groups on the right above and the right below the selected pixel data.

In the method of diffusing an error to the other groups as well, an error diffusion matrix for the groups 2 and 4 is the same as that in the method of diffusing an error only to the same group.

When an error is diffused from both the groups 1 and 3 to the other groups, as an order of processing for the respective groups, processing for the group 2 is performed after processing for the group 1. Processing for the group 4 is performed after processing for the group 3. It is also possible to perform processing for the groups 1 and 3 simultaneously and, then, perform processing for the groups 2 and 4 simultaneously.

Figure 36:
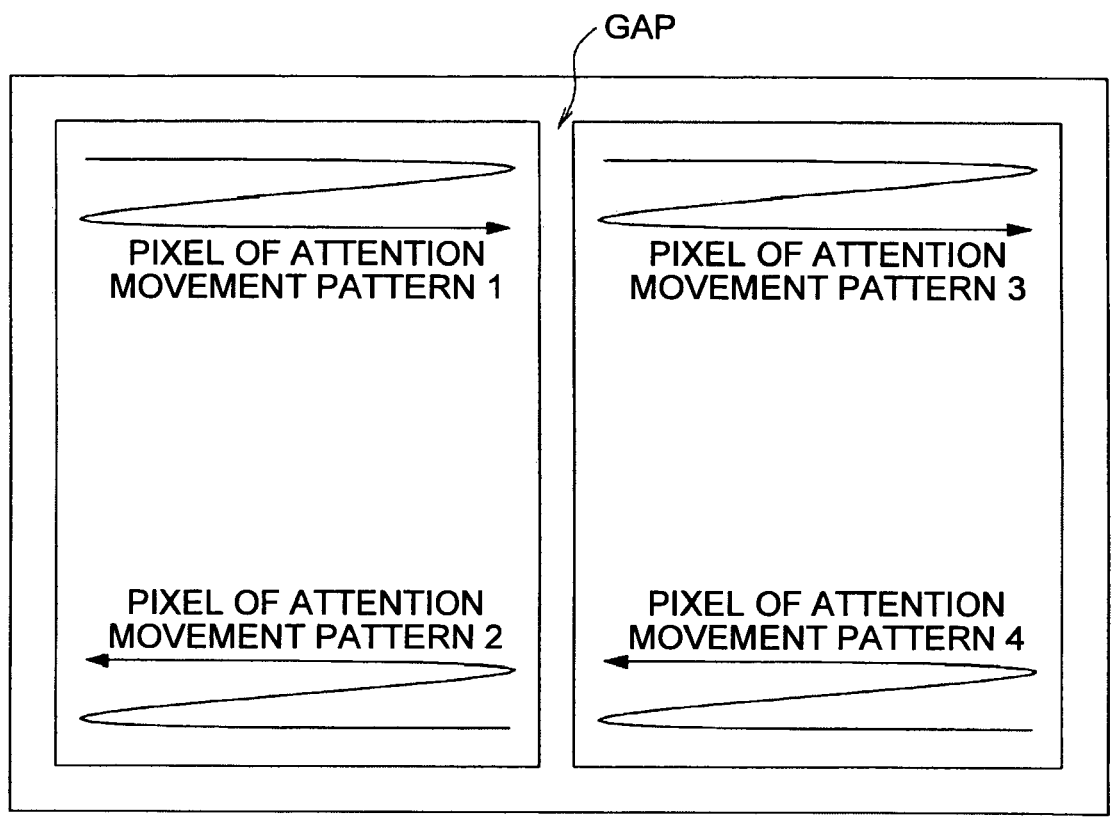
FIG. 36 is a diagram showing an example of a selection pattern for pixel data at the time when print data for two-up printing is generated.

In the example explained in the embodiment described above, an image of image data is treated as one kind of an image. However, the invention is not limited to this. As shown in FIG. 36, when two kinds of images are included in one image data, for example, when data for two-up printing (two-division printing) is generated, it is also possible that division and grouping for areas are performed for each of the images and the N-arization and the error diffusion processing are applied to the areas in parallel. Consequently, it is possible to increase processing speed to be two to four times as high according to a combination of selection patterns for pixel data. As the selection pattern for pixel data, it is possible to apply the same pattern as the embodiment. It is unnecessary to apply the N-arization and the error diffusion processing to a gap between images.

Figure 37:
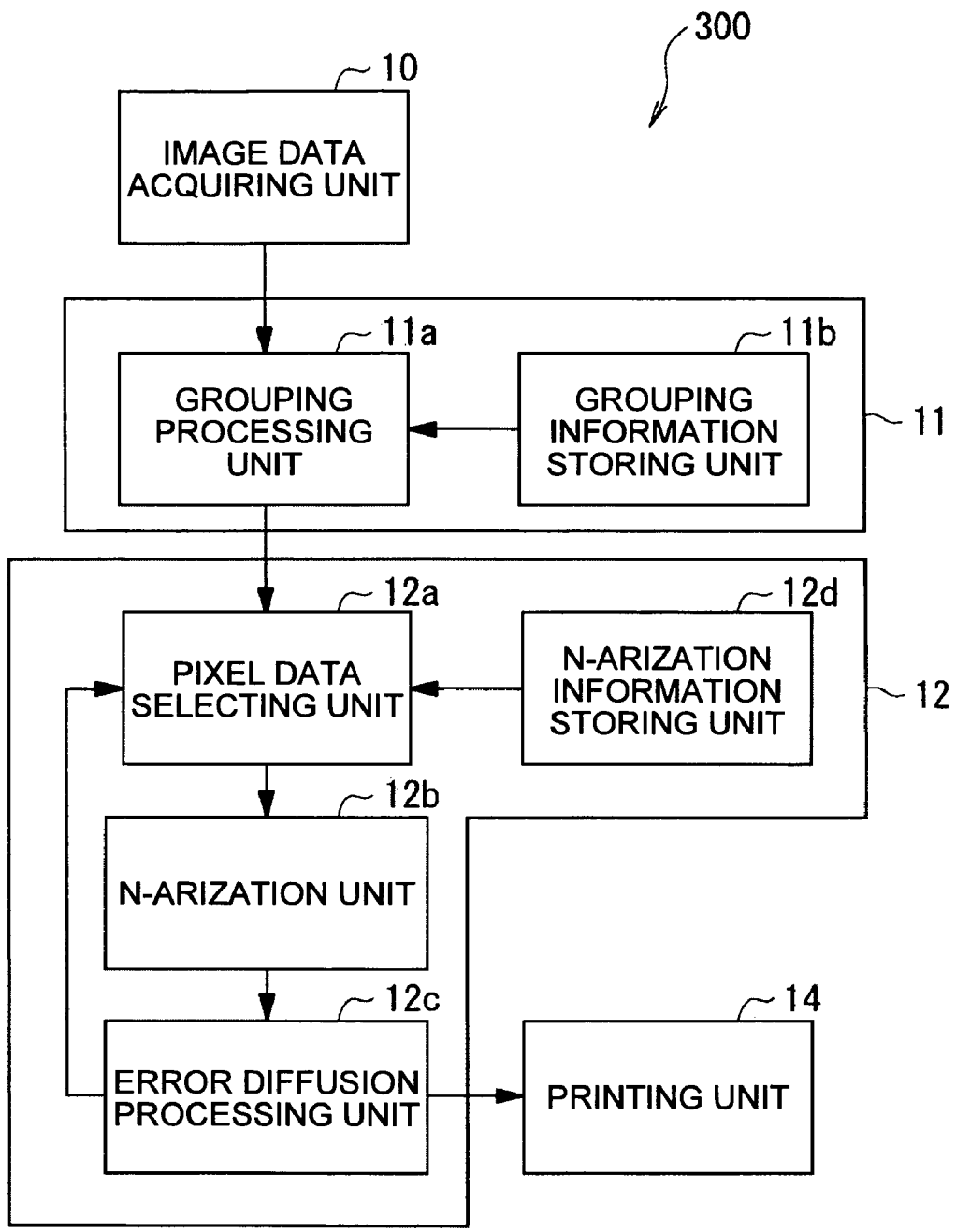
FIG. 37 is a diagram showing a functional constitution of a printing apparatus 300 according to an aspect of the invention.

In the invention, as shown in FIG. 37, it is also possible to add, for example, a printing unit 14 having a printing function provided in an existing ink-jet printer or the like to the image data acquiring unit 10, the group generating unit 11, and the N-arization processing unit 12 constituting the image processing apparatus 100 in the embodiment to constitute a printing apparatus 300. In this case, the N-arization unit 12b and the error diffusion processing unit 12c also have a function as a print data generating unit that generates print data as in the embodiment and output the print data generated to the printing unit 14. The printing unit 14 controls, for example, a print head having a nozzle capable forming a dot on a medium used for printing such as a print sheet, a print head moving mechanism that reciprocatingly moves the print head in a width direction thereof on the medium (in the case of a multi-path type), a sheet feeding mechanism for moving the medium, and a print control mechanism that controls jetting of ink by the print head. The printing unit 14 prints an image on the medium.

In this case, the image data acquiring unit 10 corresponds to the image data acquiring unit according to some aspects of the invention. The group generating unit 11 corresponds to the grouping unit according to some aspects of the invention. The pixel data selecting unit 12a corresponds to the pixel data selecting unit according to some aspects of the invention. The N-arization unit 12b corresponds to the N-arization processing unit according to some aspects of the invention. The effort diffusion processing unit 12c corresponds to the error diffusing unit according to some aspects of the invention. The generation processing for print data in the N-arization unit 12b and the error diffusion processing unit 12c corresponds to the print data generating unit according to some aspects of the invention. The printing unit 14 corresponding to the printing unit according to some aspects of the invention.

In this case, processing is the same as the processing indicated by the flowcharts in FIGS. 3 to 5 in the embodiment except that a printing step is added. Thus, steps S100 and S102 correspond to the image data acquiring step according to some aspects of the invention. Step S104 corresponds to the grouping step according to some aspects of the invention. Step S304 corresponds to the pixel data selecting step according to some aspects of the invention. Steps S306 and S308 correspond to the N-arization processing step according to some aspects of the invention. Steps S310 and 312 correspond to the error diffusing step according to some aspects of the invention.

Figure 38:
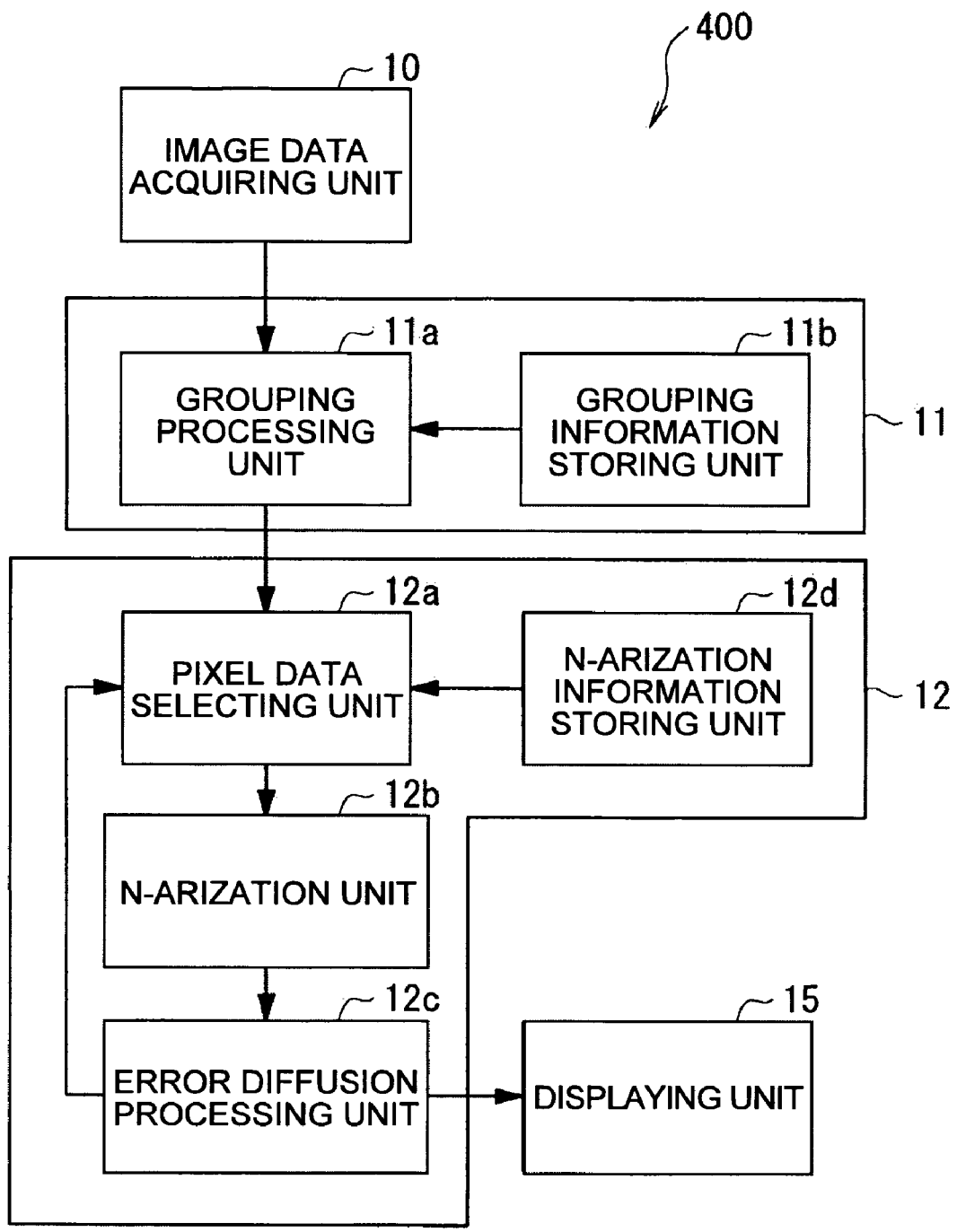
FIG. 38 is a diagram showing a functional constitution of a display apparatus 400 according to an aspect of the invention.
Figure 39A:
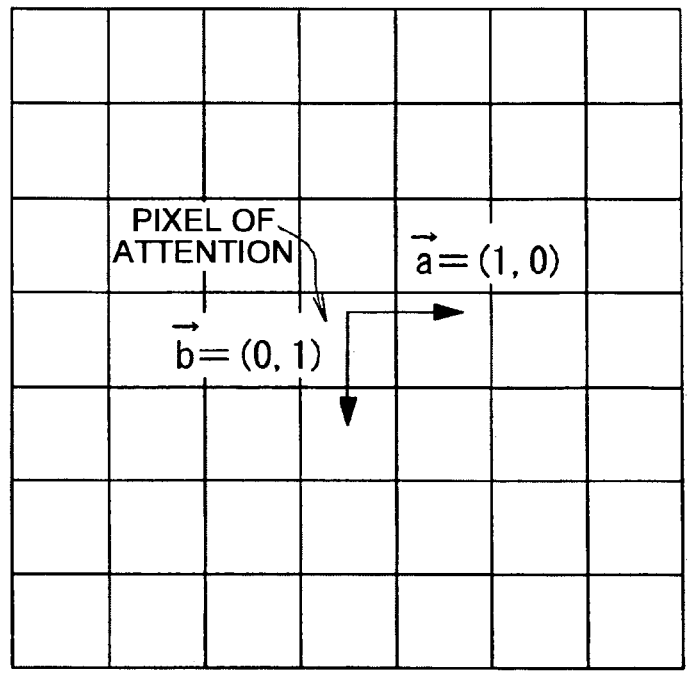
FIGS. 39A to 39C are diagrams for explaining weight vectors.
Figure 39B:
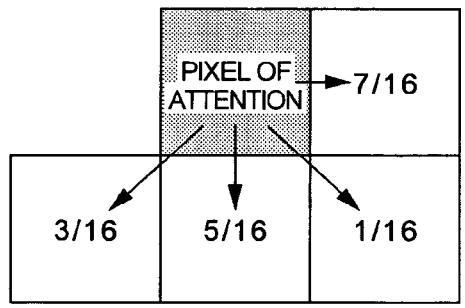
Figure 39C:
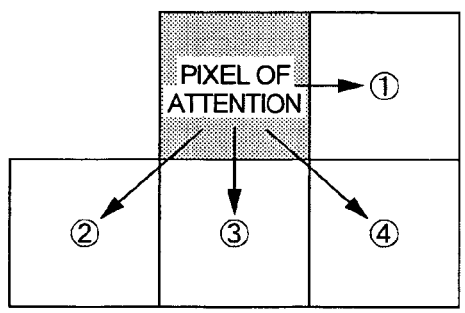

In the invention, as shown in FIG. 38, it is also possible to add a displaying unit 15 having a function of displaying an image on a display unit such as a CRT display or a liquid crystal display, for example, an existing graphics card mounted on a Personal Computer (PC) or the like, to the image data acquiring unit 10, the group generating unit 11, and the N-arization processing unit 12 constituting the image processing apparatus 100 in the embodiment to constitute a display apparatus 400 (which may include the display unit). In this case, the N-arization unit 12*b* and the error diffusion processing unit 12*c* output N-arized data having a value, which is obtained by, on the basis of a threshold value and a conversion value set in advance, converting a luminance value of image data into the conversion value corresponding to the threshold value, as a value after the N-arization to the displaying unit 15. The displaying unit 15 displays an image on the display unit on the basis of this N-arized data.

In this case, the image data acquiring unit 10 corresponds to the image data acquiring unit according to some aspects of the invention. The group generating unit 11 corresponds to the grouping unit according to some aspects of the invention. The pixel data selecting unit 12*a* corresponds to the pixel data selecting unit according to some aspects of the invention. The N-arization unit 12*b* corresponds to the N-arization processing unit according to some aspects of the invention. The error diffusion processing unit 12*c* corresponds to the error diffusing unit according to some aspects of the invention. The displaying unit 15 corresponds to the displaying unit according to some aspects of the invention.

In this case, processing is the same as the processing indicated by the flowcharts in FIGS. 3 to 5 in the embodiment except that a display step is added. Thus, steps S100 and S102 correspond to the image data acquiring step according to some aspects of the invention. Step S104 corresponds to the grouping step according to some aspects of the invention. Step S304 corresponds to the pixel data selecting step according to some aspects of the invention. Steps S306 and S308 correspond to the N-arization processing step according to some aspects of the invention. Steps S310 and 312 correspond to the error diffusing step according to some aspects of the invention.

What is claimed is:

1. An image processing apparatus comprising:
   an image data acquiring unit that acquires image data formed of plural pixel data having an M-ary (M≧3) gradation value;
   a grouping unit that divides the image data acquired into J (J≧2) image data areas and sections the J image data areas into two groups;
   a pixel data selecting unit that selects, for each of the image data areas forming the respective groups, predetermined pixel data out of pixel data included in the image data area;
   an N-arization processing unit that applies N-arization (M>N≧2) processing to the pixel data selected based on a predetermined threshold value; and
   an error diffusing unit that diffuses a difference between a value of the selected pixel data and a value after the N-arization processing for the selected pixel data to pixel data not subjected to the N-arization processing,
   wherein the predetermined pixel data selected for a first group is selected from among pixels near a first margin of the image and the predetermined pixel data selected for the second group is selected from among pixels located near the opposite margin of the image and
   diffusion errors associated with pixels in one group are not propagated to pixels in the other group and
   the error diffusing directions are opposite to one another in the two groups.

2. An image processing apparatus according to claim 1, wherein the grouping unit sections the J image data areas into the two groups such that images in the respective image data areas forming the two groups cross one another in the respective groups.

3. An image processing apparatus according to claim 2, wherein the grouping unit divides the image data into at least four image data areas and sections the at least four image data areas into the two groups such that images in the image data areas forming the two groups, respectively, cross one another in a lattice shape in the two groups.

4. An image processing apparatus according to claim 1, wherein the error diffusing unit diffuses the difference that occurs in the predetermined pixel data to pixel data not subjected to the N-arization processing in the predetermined pixel data and pixel data not subjected to the N-arization processing in another group different from the predetermined pixel data.

5. An image processing apparatus according to claim 1, wherein processing for selecting the pixel data in the pixel data selecting unit, the N-arization processing in the N-arization unit, and processing for diffusing the error in the error diffusing unit are applied to the two groups in parallel to one another.

6. An image processing method comprising:
   acquiring image data formed of plural pixel data having an M-ary (M≧3) gradation value;
   dividing the image data acquired into J (J≧2) image data areas and sectioning the J image data areas into two groups;
   selecting, for each of the image data areas forming the respective groups, predetermined pixel data out of pixel data included in the image data area;
   applying N-arization (M>N≧2) processing to the pixel data selected based on a predetermined threshold value; and
   diffusing a difference between a value of the selected pixel data and a value after the N-arization processing for the selected pixel data to pixel data not subjected to the N-arization processing,
   wherein, in the selecting step, the predetermined pixel data selected for a first group is selected from among pixels near a first margin of the image and the predetermined pixel data selected for the second group is selected from among pixels located near the opposite margin of the image and
   in the error diffusing step, the difference associated with pixels in one group is not diffused to pixels in the other group and
   the difference is diffused in opposite directions in the two groups.

7. A printing apparatus that is adapted to print an image on a medium used for printing using a print head having a nozzle capable of forming a dot, the printing apparatus comprising:
   an image data acquiring unit that acquires image data formed of plural pixel data having an M-ary (M≧3) gradation value;
   a grouping unit that divides the image data acquired into J (J≧2) image data areas and sections the J image data areas into two groups;
   a pixel data selecting unit that selects, for each of the image data areas forming the respective groups, predetermined pixel data out of pixel data included in the image data area;
   an N-arization processing unit that applies N-arization (M>N≧2) processing to the pixel data selected based on a predetermined threshold value;

an error diffusing unit that diffuses a difference between a value of the selected pixel data and a value after the N-arization processing for the selected pixel data to pixel data not subjected to the N-arization processing;

a print data generating unit that generates print data defining information on a content of dot formation of the nozzle corresponding to the image data after the error diffusion processing; and a printing unit that prints the image on the medium using the print head based on the print data, wherein the predetermined pixel data selected for a first group is selected from among pixels near a first margin of the image and the predetermined pixel data selected for the second group is selected from among pixels located near the opposite margin of the image and diffusion errors associated with pixels in one group are not propagated to pixels in the other group and the error diffusing directions are opposite to one another in the two groups.

8. A printing apparatus control method that is used to control a printing apparatus adapted to print an image on a medium used for printing using a print head having a nozzle capable of forming a dot, the printing apparatus control method comprising:

acquiring image data formed of plural pixel data having an M-ary (M≧3) gradation value;

dividing the image data acquired into J (J≧2) image data areas and sectioning the J image data areas into two groups;

selecting, for each of the image data areas forming the respective groups, predetermined pixel data out of pixel data included in the image data area;

applying N-arization (M>N≧2) processing to the pixel data selected based on a predetermined threshold value;

diffusing a difference between a value of the selected pixel data and a value after the N-arization processing for the selected pixel data to pixel data not subjected to the N-arization processing;

generating print data defining information on a content of dot formation of the nozzle corresponding to the image data after the error diffusion processing; and printing the image on the medium using the print head based on the print data, wherein, in the selecting step, the predetermined pixel data selected for a first group is selected from among pixels near a first margin of the image and the predetermined pixel data selected for the second group is selected from among pixels located near the opposite margin of the image and in the error diffusing step, the difference associated with pixels in one group is not diffused to pixels in the other group and the difference is diffused in opposite directions in the two groups.

9. A print data generating apparatus that generates print data used in a printing apparatus adapted to print an image on a medium used for printing using a print head having a nozzle capable of forming a dot, the print data generating apparatus comprising:

an image data acquiring unit that acquires image data formed of plural pixel data having an M-ary (M≧3) gradation value;

a grouping unit that divides the image data acquired into J (J≧2) image data areas and sections the J image data areas into two groups;

a pixel data selecting unit that selects, for each of the image data areas forming the respective groups, predetermined pixel data out of pixel data included in the image data area;

an N-arization processing unit that applies N-arization (M>N≧2) processing to the pixel data selected based on a predetermined threshold value;

an error diffusing unit that diffuses a difference between a value of the selected pixel data and a value after the N-arization processing for the selected pixel data to pixel data not subjected to the N-arization processing;

a print data generating unit that generates print data defining information on a content of dot formation of the nozzle corresponding to the image data after the error diffusion processing; and a printing unit that prints the image on the medium using the print head based on the print data, wherein the predetermined pixel data selected for a first group is selected from among pixels near a first margin of the image and the predetermined pixel data selected for the second group is selected from among pixels located near the opposite margin of the image and diffusion errors associated with pixels in one group are not propagated to pixels in the other group and the error diffusing directions are opposite to one another in the two groups.

10. A print data generating method that is used to generate print data used in a printing apparatus adapted to print an image on a medium used for printing using a print head having a nozzle capable of forming a dot, the print data generating method comprising:

acquiring image data formed of plural pixel data having an M-ary (M≧3) gradation value;

dividing the image data acquired into J (J≧2) image data areas and sectioning the J image data areas into two groups;

selecting, for each of the image data areas forming the respective groups, predetermined pixel data out of pixel data included in the image data area;

applying N-arization (M>N≧2) processing to the pixel data selected based on a predetermined threshold value;

diffusing a difference between a value of the selected pixel data and a value after the N-arization processing for the selected pixel data to pixel data not subjected to the N-arization processing;

generating print data defining information on a content of dot formation of the nozzle corresponding to the image data after the error diffusion processing; and printing the image on the medium using the print head based on the print data, wherein, in the selecting step, the predetermined pixel data selected for a first group is selected from among pixels near a first margin of the image and the predetermined pixel data selected for the second group is selected from among pixels located near the opposite margin of the image and in the error diffusing step, the difference associated with pixels in one group is not diffused to pixels in the other group and the difference is diffused in opposite directions in the two groups.

11. A display apparatus that displays an image on a display unit based on image data, the display apparatus comprising:

an image data acquiring unit that acquires the image data formed of plural pixel data having an M-ary (M≧3) gradation value;

a grouping unit that divides the image data acquired into J (J≧2) image data areas and sections the J image data areas into two groups;

a pixel data selecting unit that selects, for each of the image data areas forming the respective groups, predetermined pixel data out of pixel data included in the image data area;

an N-arization processing unit that applies N-arization (M>N≧2) processing to the pixel data selected based on a predetermined threshold value;

an error diffusing unit that diffuses a difference between a value of the selected pixel data and a value after the N-arization processing for the selected pixel data to pixel data not subjected to the N-arization processing; and a displaying unit that displays the image on the display unit based on image data after the error diffusion processing, wherein the predetermined pixel data selected for a first group is selected from among pixels near a first margin of the image and the predetermined pixel data selected for the second group is selected from among pixels located near the opposite margin of the image and diffusion errors associated with pixels in one group are not propagated to pixels in the other group and the error diffusing directions are opposite to one another in the two groups.

12. A display apparatus control method that is used to control a display apparatus that displays an image on a display unit on the basis of image data, the display apparatus control method comprising:

acquiring the image data formed of plural pixel data having an M-ary (M≧3) gradation value;

dividing the image data acquired into J (J≧2) image data areas and sectioning the J image data areas into two groups;

selecting, for each of the image data areas forming the respective groups, predetermined pixel data out of pixel data included in the image data area;

applying N-arization (M>N≧2) processing to the pixel data selected on the basis of a predetermined threshold value;

diffusing a difference between a value of the selected pixel data and a value after the N-arization processing for the selected pixel data to pixel data not subjected to the N-arization processing; and displaying the image on the display unit on the basis of image data after the error diffusion processing, wherein, in the selecting step, the predetermined pixel data selected for a first group is selected from among pixels near a first margin of the image and the predetermined pixel data selected for the second group is selected from among pixels located near the opposite margin of the image and in the error diffusing step, the difference associated with pixels in one group is not diffused to pixels in the other group and the difference is diffused in opposite directions in the two groups.

\* \* \* \* \*